United States Patent [19]
Seltzer et al.

[11] Patent Number: 4,833,651
[45] Date of Patent: May 23, 1989

[54] HIGH-SPEED, ASYNCHRONOUS, NO-FALL-THROUGH, FIRST-IN-FIRST OUT MEMORY WITH HIGH DATA INTEGRITY

[75] Inventors: Jeffrey H. Seltzer, San Jose; Hassan M. Hanjani, Sunnyvale, both of Calif.

[73] Assignee: National Semiconductor Corporation, Santa Clara, Calif.

[21] Appl. No.: 889,824

[22] Filed: Jul. 24, 1986

[51] Int. Cl.[4] .......................... G11C 7/00; G11C 8/00
[52] U.S. Cl. ............................. 365/189.07; 365/221; 365/230.05
[58] Field of Search ................ 365/221, 189, 78, 230, 365/233

[56] References Cited

U.S. PATENT DOCUMENTS

| | | | |
|---|---|---|---|
| 4,151,609 | 4/1979 | Moss | 365/221 |
| 4,419,796 | 12/1983 | Hunter et al. | 365/230 |
| 4,507,760 | 3/1985 | Fraser | 365/221 |
| 4,694,426 | 9/1987 | Mason | 365/78 |
| 4,714,994 | 12/1987 | Oklobdzija et al. | 364/200 |

OTHER PUBLICATIONS

United Technologies Mostek Preliminary Data Sheet, "512×9 BiPort ™ Parallel In-Out FIFO MK4501/MK68345 N-12, 15, 20", printed Jul., 1983.

Primary Examiner—Stuart M. Hecker
Assistant Examiner—Glenn A. Gossage
Attorney, Agent, or Firm—Limbach, Limbach & Sutton

[57] ABSTRACT

A No-Fall-Through, FIFO memory includes a memory section comprising a plurality of locations for storing data words. Data words are written into the storage locations in response to a write clock input signal. Data words are read from the storage locations, in the same sequence as previously written, in response to a read clock signal. A write pointer maintains a write pointer value indicative of the number of data words which have been written. A read pointer maintains a read pointer value indicative of the number of data words which have been read. A comparator monitors the write pointer and read pointer values and detects differences between the two. The characteristics of the differences are utilized to control internal operations of the FIFO.

13 Claims, 53 Drawing Sheets

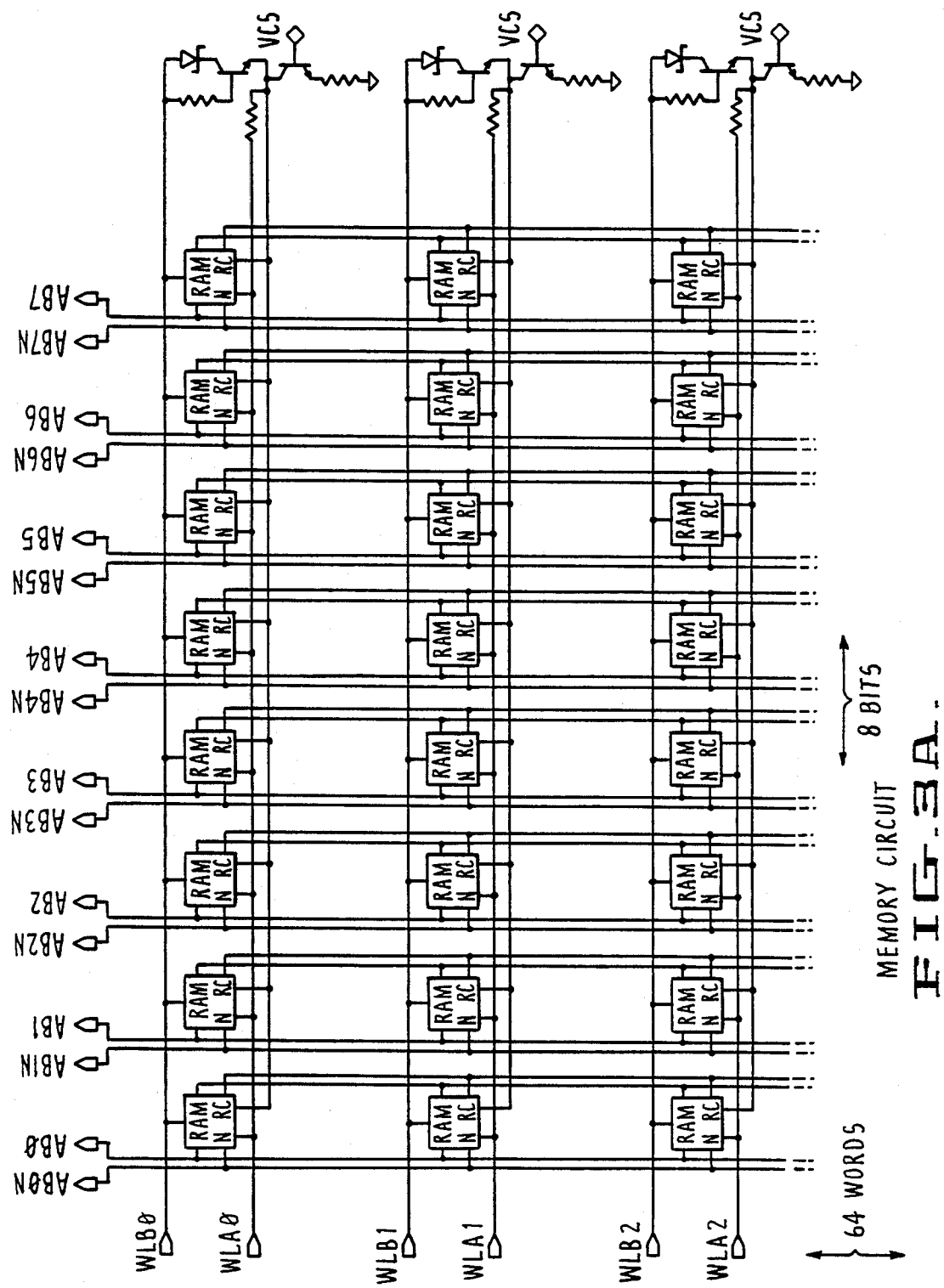

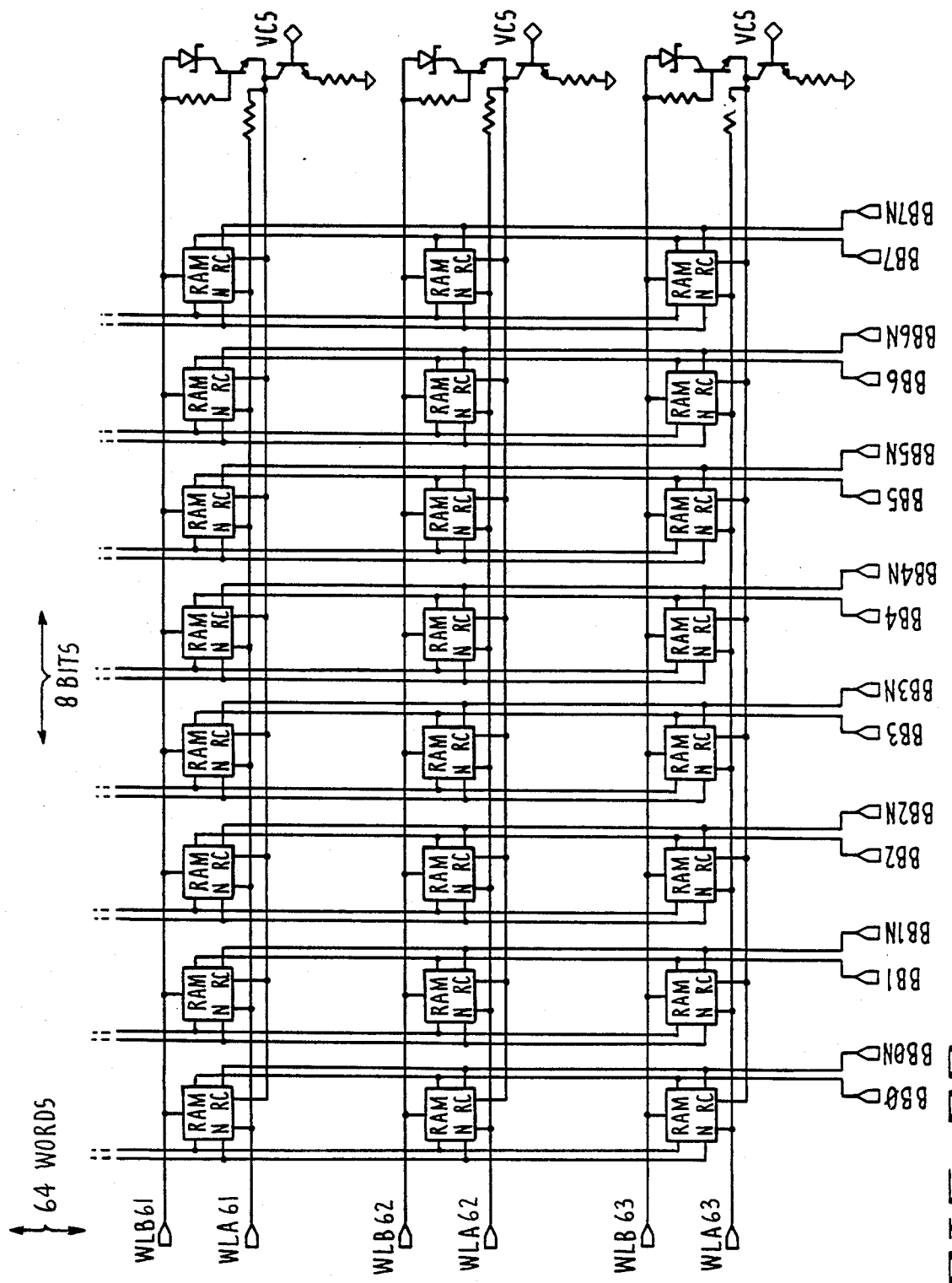

DATA INPUT TRANSLATOR AND WRITE CIRCUIT

SENSE-AMP CIRCUIT

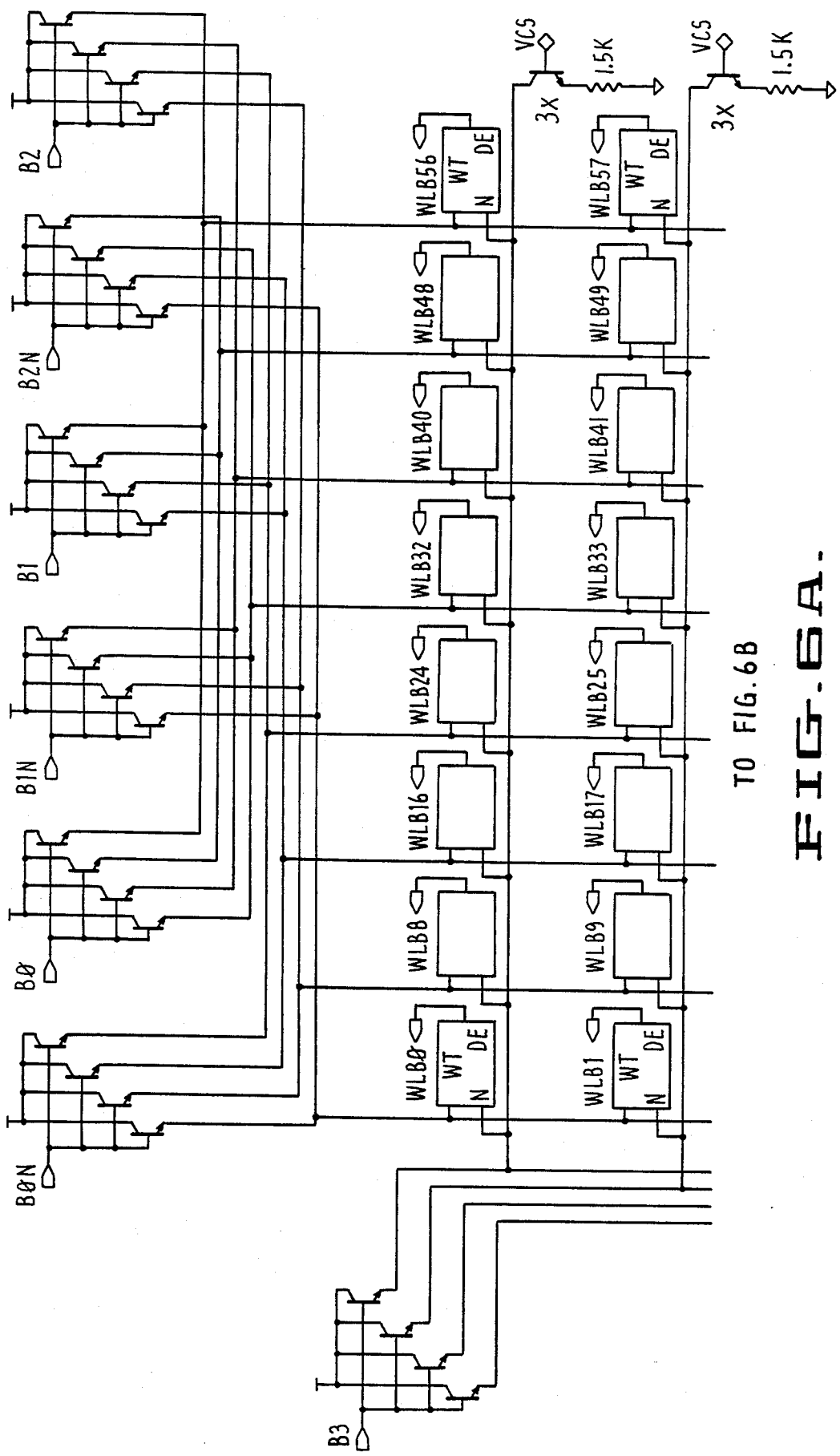

READ-DECODER CIRCUIT

-TO FIG. 7B-

BIAS DRIVER CIRCUIT

WRITE ADDRESS POINTER LOGIC

READ ADDRESS POINTER LOGIC

COMPARATOR SUBTRACTOR LOGIC

WRITE CYCLE CONTROL LOGIC

READ CYCLE CONTROL LOGIC

MASTER RESET AND FLAG CONTROL LOGIC

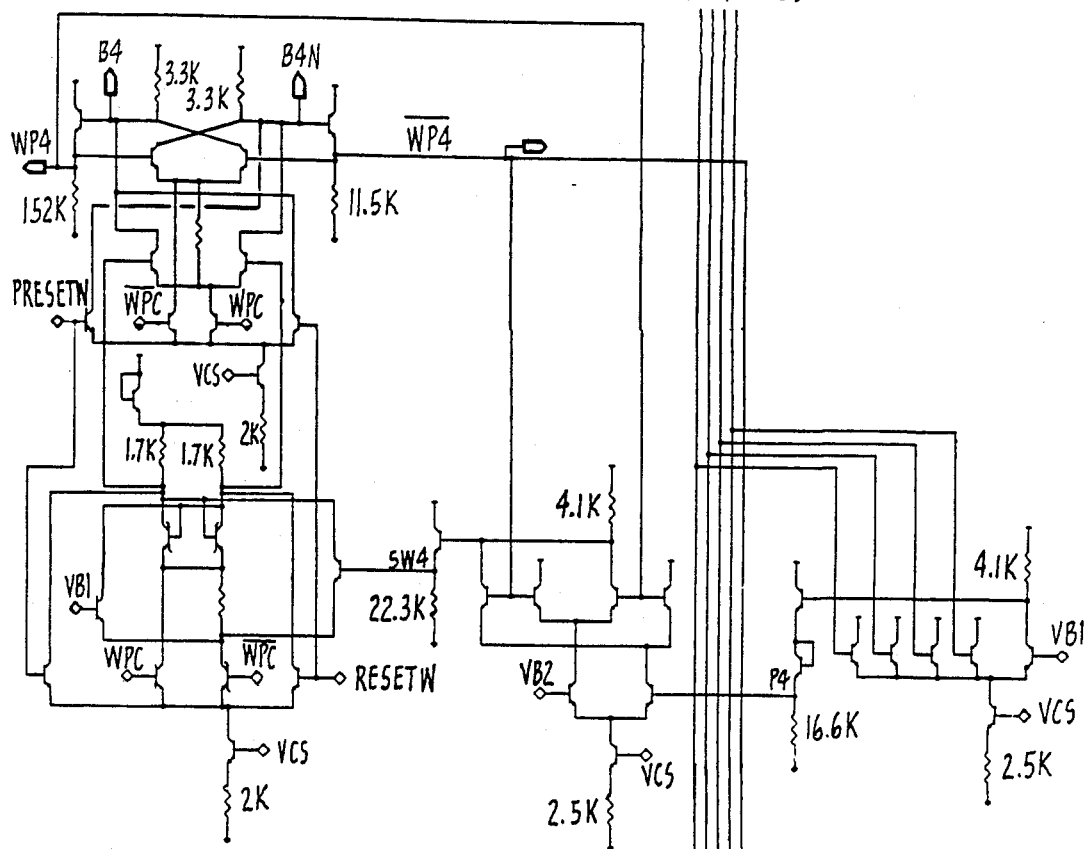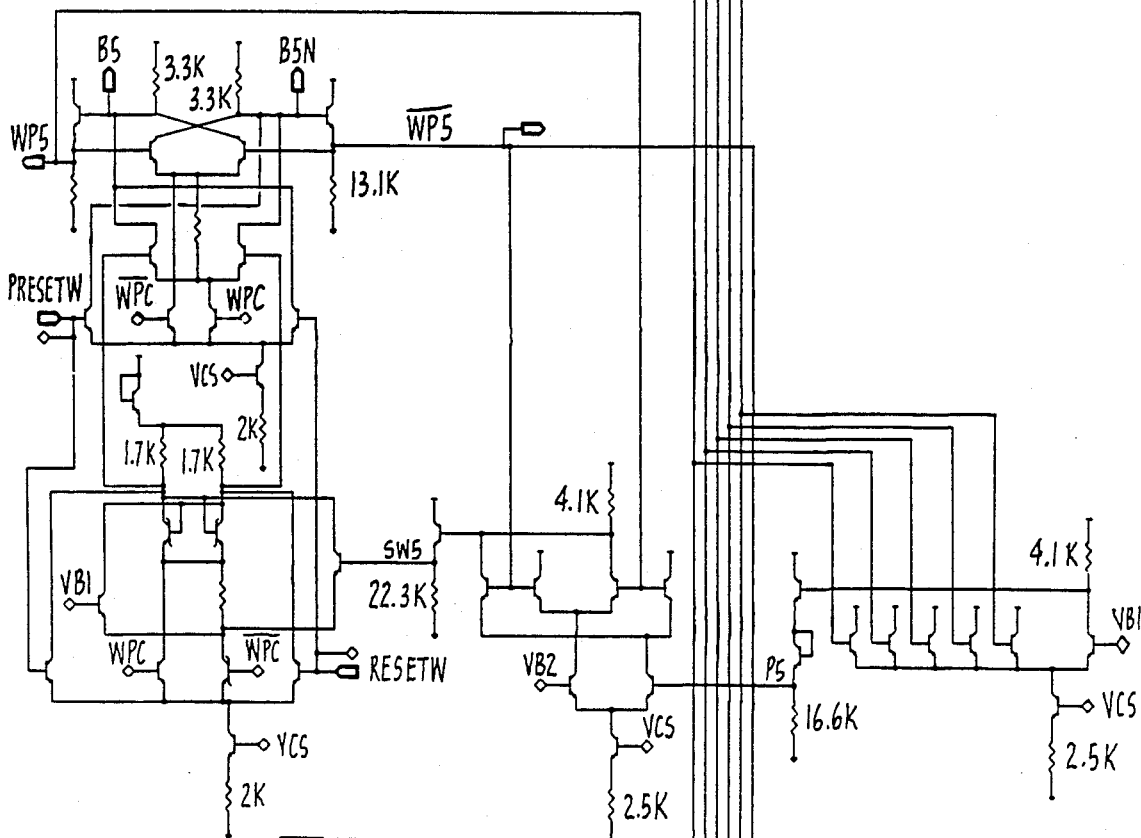
FIG.16C

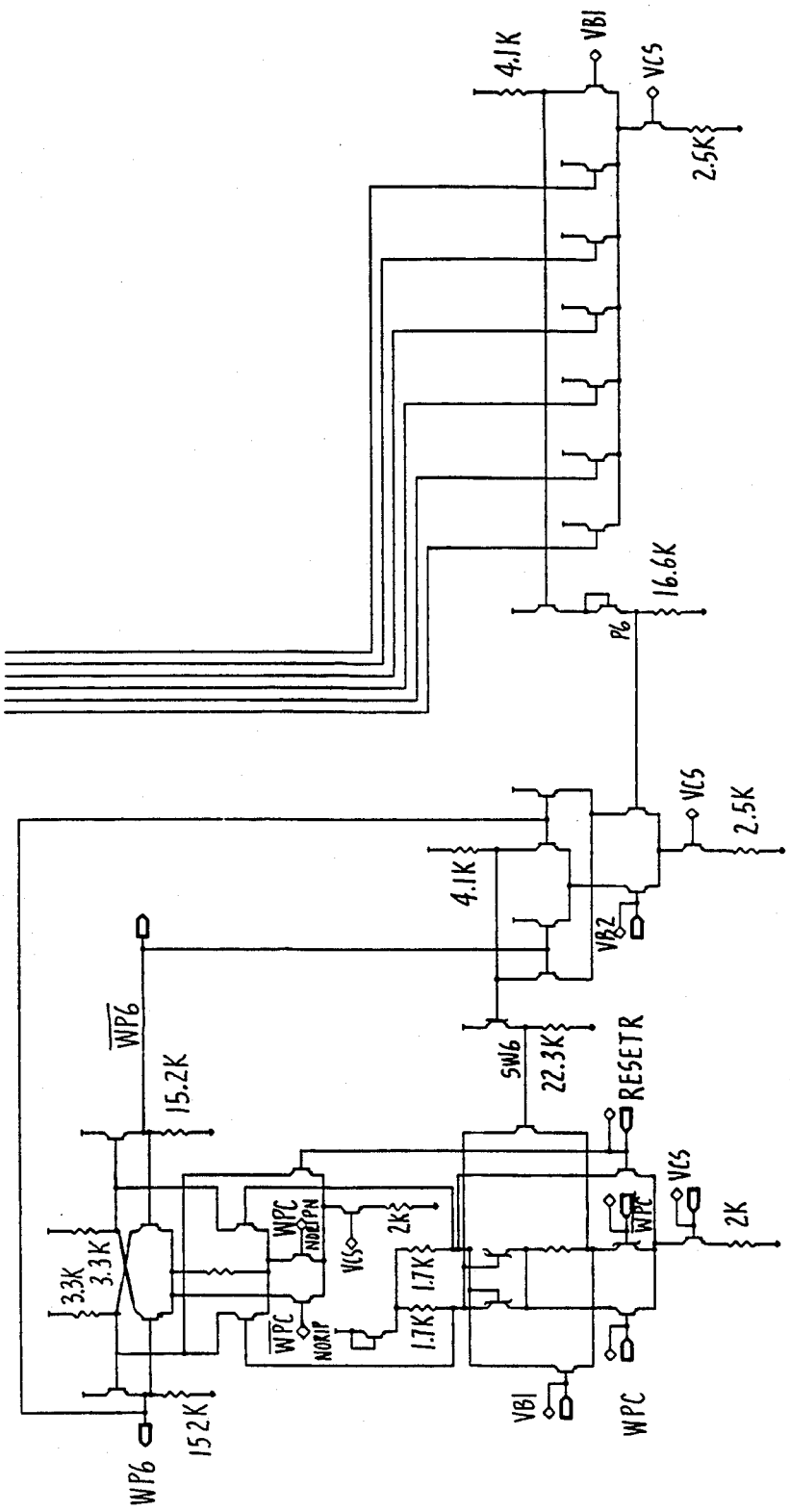

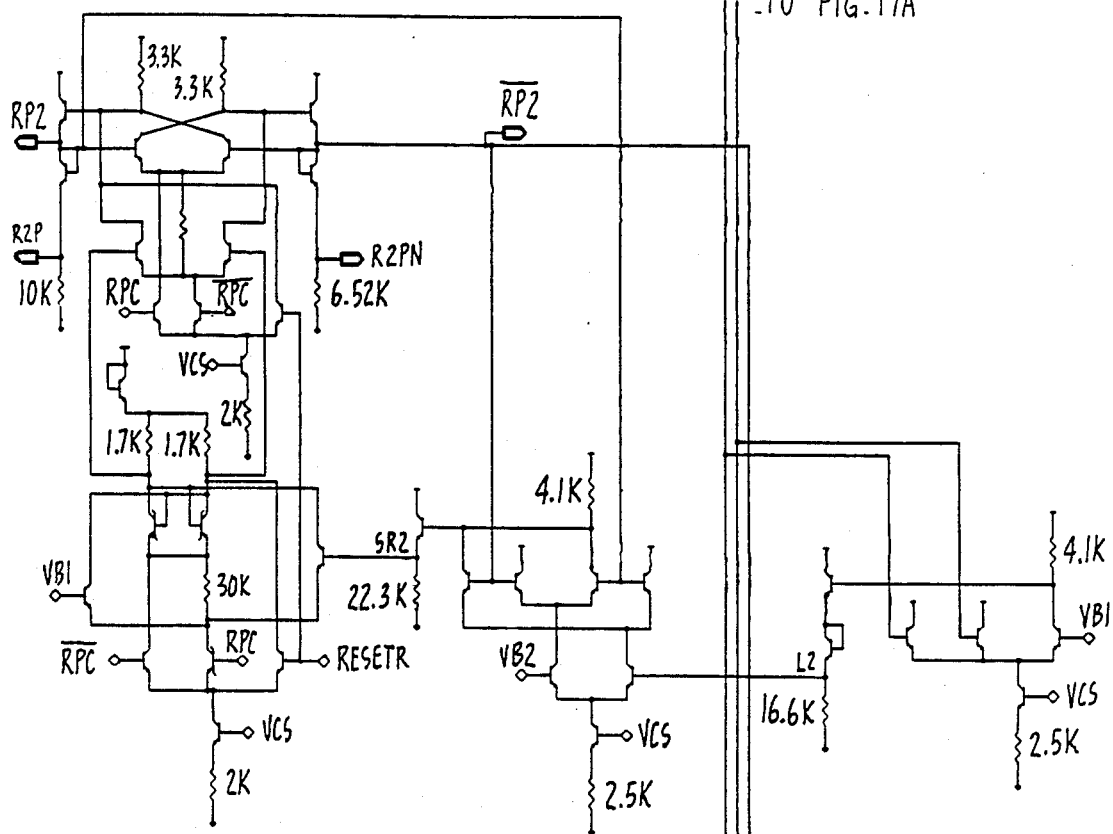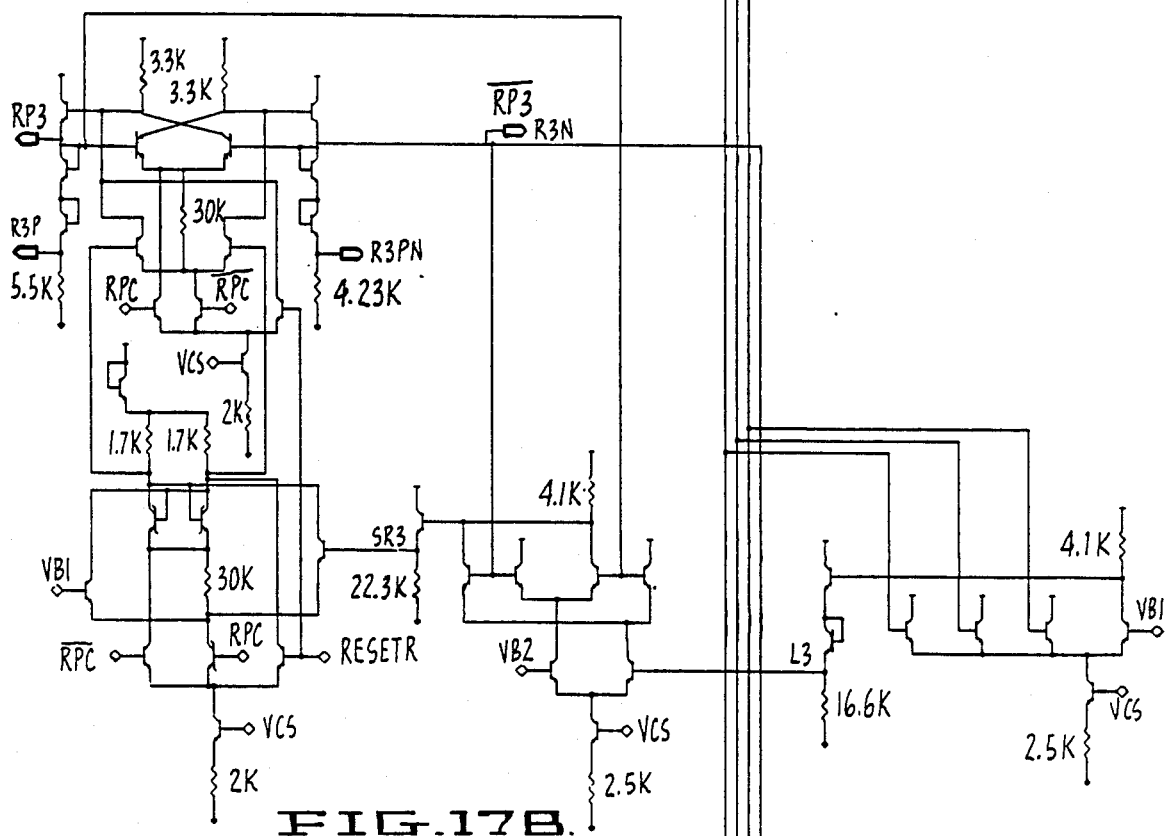
FIG.17B.

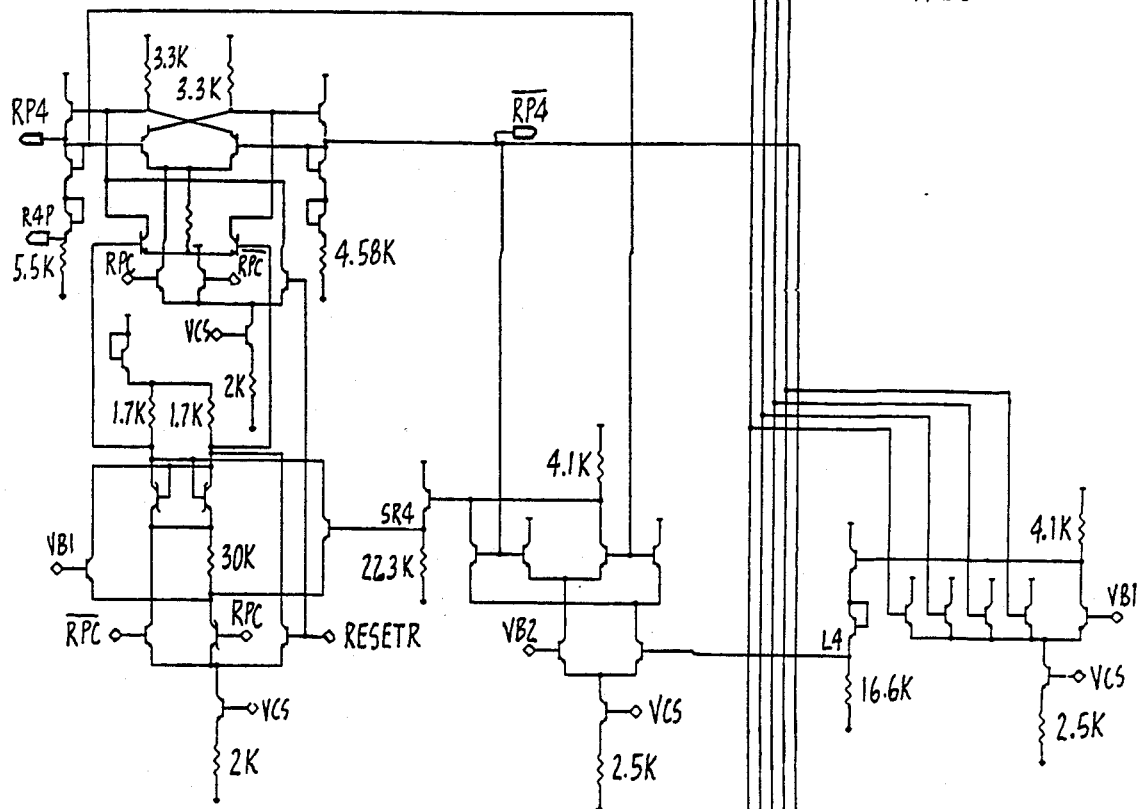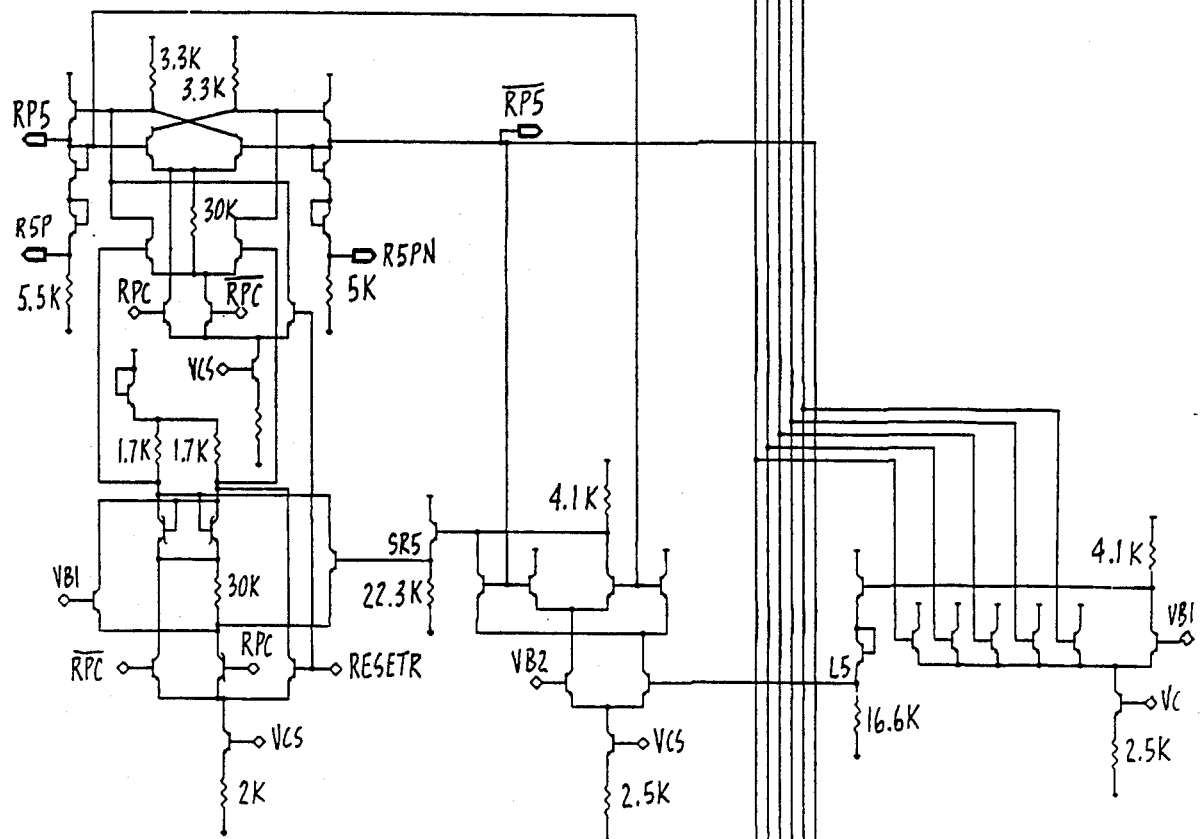
FIG.17C.

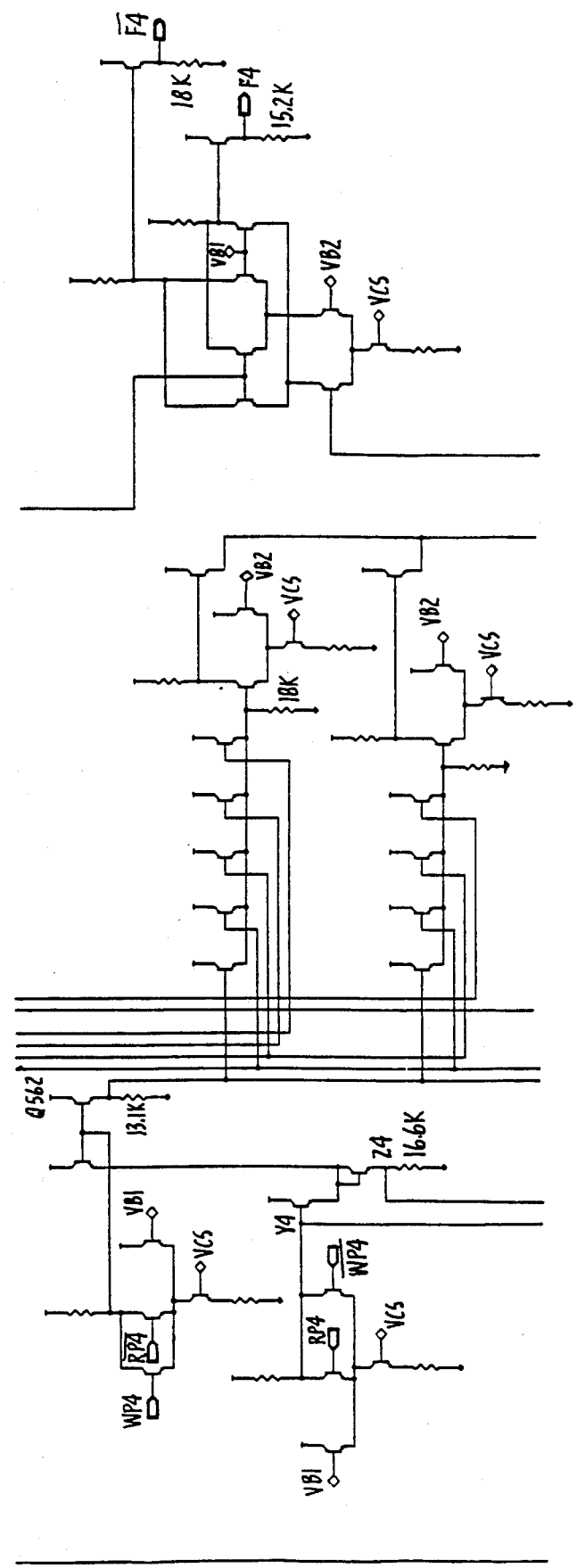

DECODER OF THE COMPARATOR

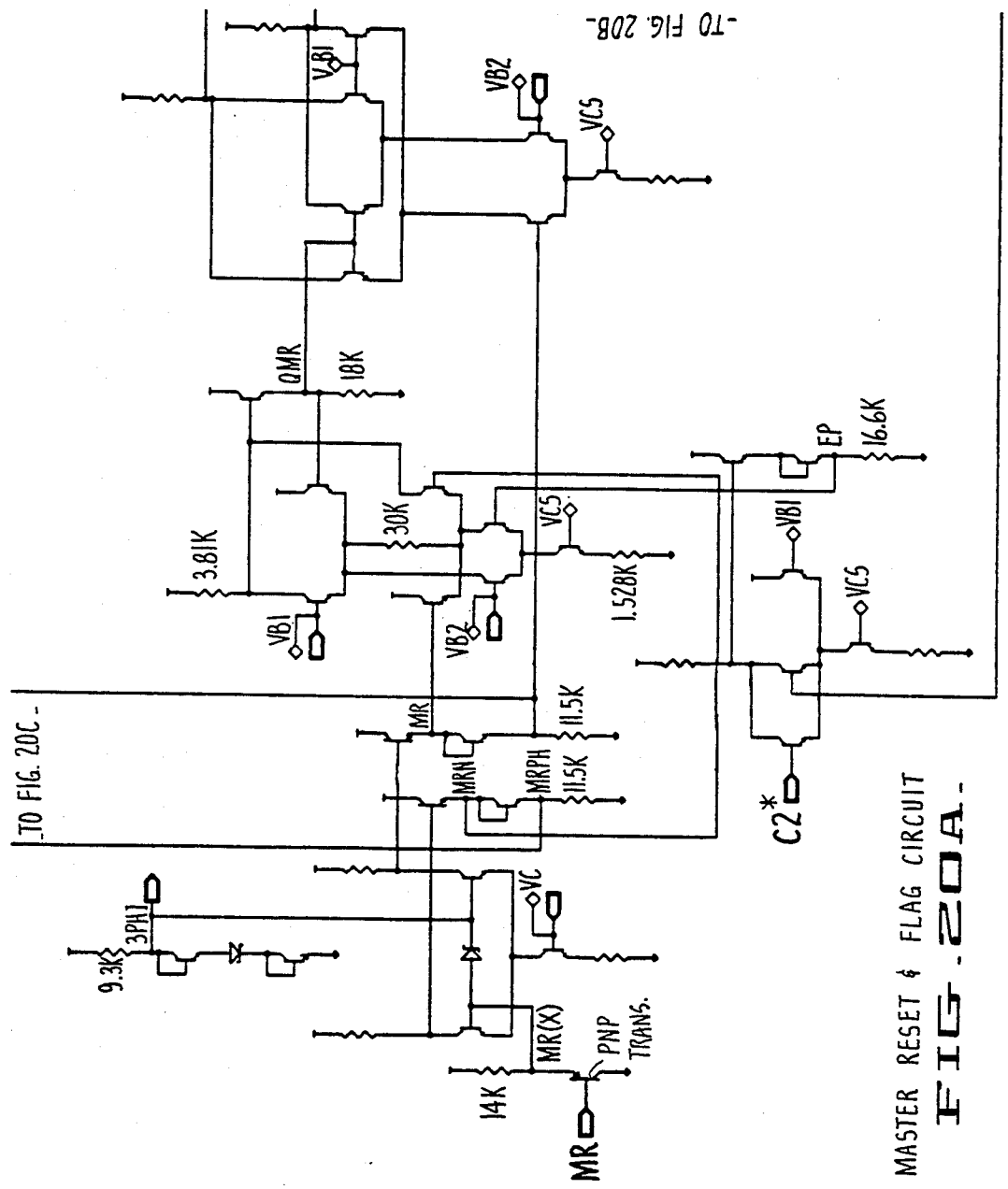

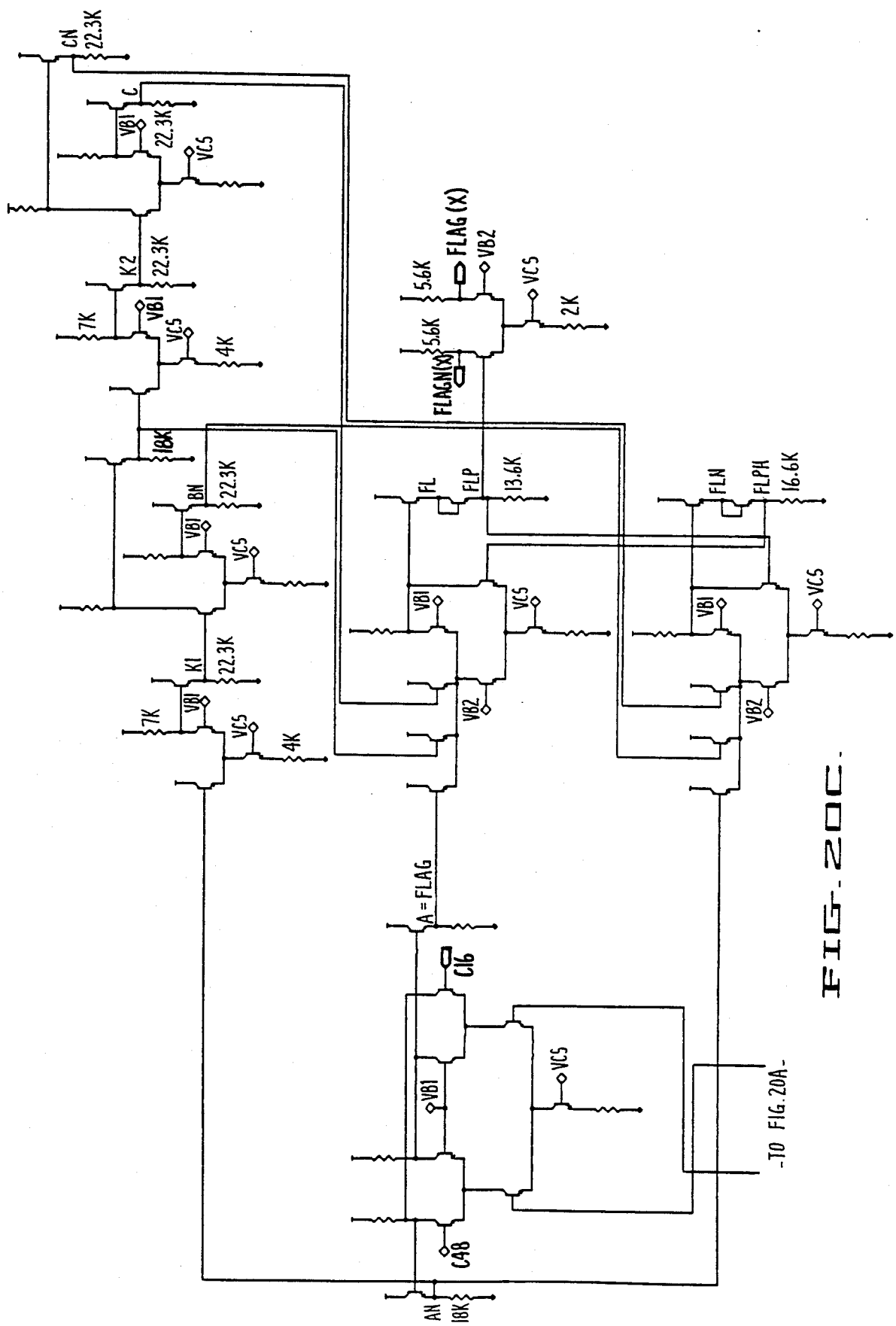

WRITE CONTROL

READ CONTROL

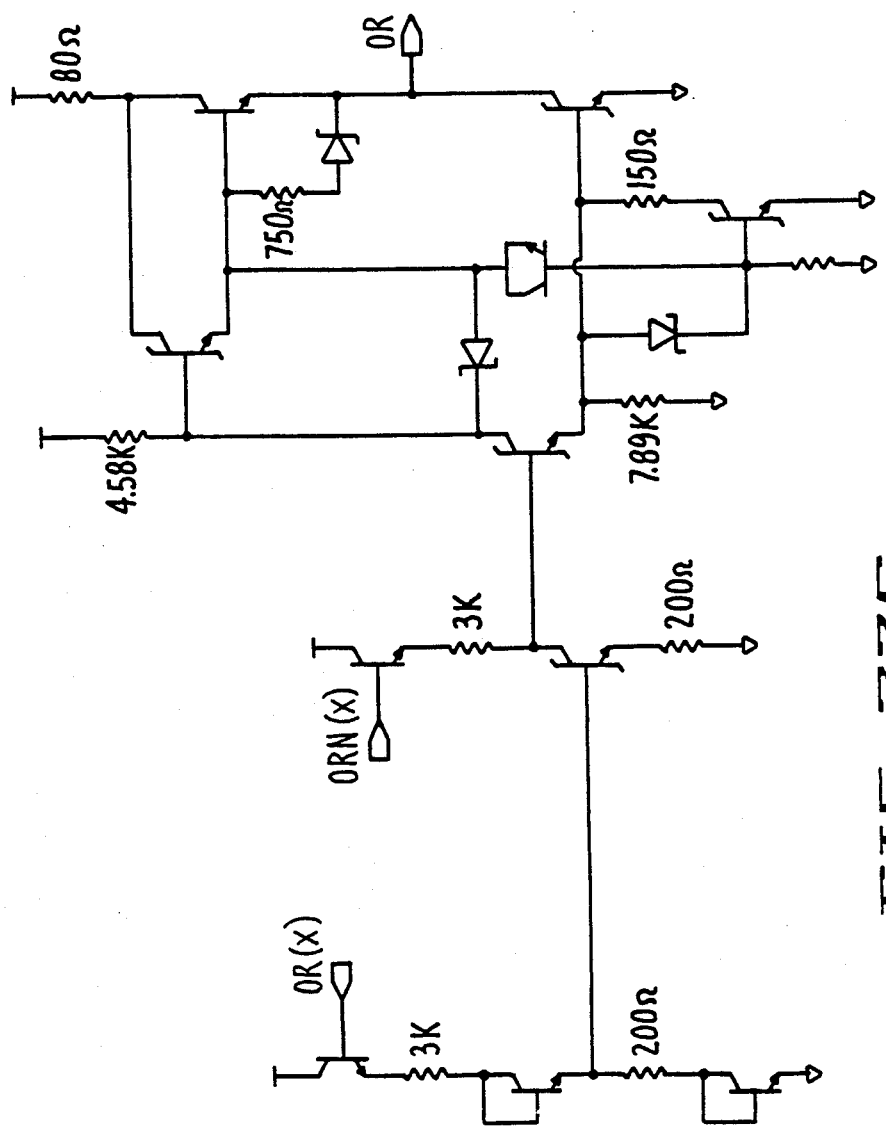

MASTER RESET TIMING WAVEFORM

FLAG OUTPUT TIMING WAVEFORM

WRITE CYCLE TIMING WAVEFORM

* IR GOES LOW FOLLOWING THE FIRST OF THESE TWO EVENTS

READ CYCLE TIMING WAVEFORM

CASCADING DEVICES
(190 × 16 BIT FIFO)

WRITE CYCLE WAVEFORM FOR TWO DEVICES CASCADED SERIALLY

READ CYCLE WAVEFORM FOR TWO DEVICES CASCADED SERIALLY

HIGH-SPEED, ASYNCHRONOUS, NO-FALL-THROUGH, FIRST-IN-FIRST OUT MEMORY WITH HIGH DATA INTEGRITY

BACKGROUND OF THE INVENTION

1. Field of the Invention.

This invention relates to memory systems and, in particular, to a No-Fall-Through, First-In-First-Out memory device having high-speed throughout and which is protected against erroneous states and loss of data.

2. Discussion of the Prior Art.

First-In-First-Out (FIFO) memories are a special class of digital electronic read/write memory in which data words are written and read in sequential manner. Because their write and read operations may occur at different rates, FIFO memories find particular application as buffers between systems. Data words written into a FIFO device are later read once from a separate data bus, using a separate clock, in the same sequence a previously written.

A FIFO is said to be "empty" when any data words which have been written into the device have also been read; a FIFO is said to be "full" when the number of data words written into the device exceeds the number of data words which have been read by the "depth" of the device.

FIFO memories are typically cascadable. That is, multiple FIFO devices can be interconnected in series to operate as a FIFO memory system several times deeper than an individual FIFO device; similarly, multiple FIFO devices can be interconnected in parallel to operate as a FIFO memory system several times wider than an individual device.

A bipolar FIFO memory is disclosed in U.S. Pat. No. 4,151,609, issued Apr. 24, 1979, to Moss. The FIFO memory disclosed therein comprises a memory register which stores data words, an input control section, a register control section, and an output control section. The input control section allows data to be written into the FIFO register. The register control section shifts the data hhrough the register, with data queuing up sequentially at the register locations closest to the register output. The output control section allows data to be read from the FIFO register at a rate different than the rate at which data is written into the register by the input control section. In addition to shifting data through the register, the register control section also monitors both the succeeding location and the previous location of data words in the register to determine when data may be shifted.

Use of the Moss FIFO device is limited by the fact that it is a "fall-through" device. A substantial period of time is required to cycle a data word through the register from its first input block to the output block. That is, a number of cycle times equal to the depth of the register are required to allow a data word to "fall through" the Moss FIFO register from the first input block so that it is available for output.

FIFO memory devices are available which are of the "no-fall-through" type. In a "no-fall-through" FIFO memory, newly input data words become quickly available for output.

A No-Fall-Through FIFO memory is described in a United Technologies Mostek Preliminary Data Sheet, "512×9 BiPORT ™ PARALLEL IN-OUT FIFO MK4501 N-12, 15, 20" February 1983. The MK4501 utilizes a two port memory cell, asynchronous read/write operations, and full and empty status flags. The full and empty flags are used to prevent data underflow and overflow. The time required for retrieval of newly input data is about one write cycle. Because write and read operations are internally sequential, no address information is required.

The Mostek device is a relatively slow device, operating at about 7–15 MHz at 4.5–5.5 volts. It also requires additional pins for operation in the cascaded mode. Its read and write cycles must be in a proper state before the device may be reset. Therefore, it is limited in its application.

SUMMARY OF THE INVENTION

It is an object of the invention to provide a No-Fall-Through FIFO memory having improved memory design and control logic to provide read and write clock input frequencies which are faster than prior art devices.

It is an object of the present invention to provide a No-Fall-Through FIFO memory wherein data being written into the device propagates to the device outputs before the conclusion of the write cycle.

It is a further object of the present invention to provide a No-Fall-Through FIFO memory which incorporates protection against erroneous states and loss or corruption of data in the device due to asynchronous input events.

It is also an object of the invention to provide "glitch" suppression on the status outputs of a No-Fall-Through FIFO memory to facilitate the use of these output signals for clock inputs on other devices.

It is an object of the invention to provide a No-Fall-Through FIFO memory wherein the delay from a clock input transition to any status output transition is minimized by predicting potential status transitions one cycle in advance.

It is a further object of the invention to provide a No-Fall-Through FIFO memory which generates a user selectable "one-quarter full" or "three-quarters full" intermediate status flag, in addition to full and empty status flags.

It is a further object of the invention to provide a No-Fall-Through FIFO memory which implements multipurpose use of control inputs such that different information is derived from the logic level of the input than is derived from its transitions It is also an object of the invention to provide a No-Fall-Through FIFO memory having an interlocking "handshaking" signal waveform which is utilized to ensure the integrity of serially cascaded devices.

It is a further object of the invention to provide a No-Fall-Through FIFO memory with a uniquely combined write decoder, read decoder and dual port memory circuitry which supports faster and cleaner memory addressing throug improved signal definition.

These and other objects of the invention are accomplished by providing a No-Fall-Through, First-In-First-Out memory which includes a dual port random access memory having a storage section comprising a plurality of locations for storing data words. The RAM includes a write port which receives data words from an external source and writes data words into the RAM's storage section in response to a write clock input signal WC. The RAM also includes a read port which reads data words from the RAM's storage section, in the same sequence as previously written, in response to a read clock input signal RC and delivers the data words to an external destination. A rrite pointer connected to the RAM's write port maintains a write pointer value WP which is indicative of the number of data words which have been written into the RAM's storage section. A read pointer connected to the read port maintains a read pointer value RP which is indicative of the number of data words which have been read from the RAM's storage section. The subtractor section of the device's comparator monitors the write pointer value and the read pointer value and generates an output which represents the difference between the write pointer value and the read pointer value. The decoder section of the comparator detects characteristics of the subtractor output which are used to control the internal operation of the device and to generate outputs signals. The FIFO's control section receives three input signals: write clock WC, read clock RC, and a master reset and flag select MR. The control section generates three output signals: an input ready signal IR, an output ready signal OR and an intermediate status flag signal FLAG. The output of the FIFO's comparator is provided as a further input to the control section.

DESCRIPTION OF THE DRAWINGS

FIGS. 3A and 3B combine to provide a schematic circuit diagram illustrating a dual-port random access memory of the type used in the FIFO of the present invention;

FIGS. 6A-6C combine to provide a schematic circuit diagram illustrating a write decoder of the type used in the FIFO memory shown in FIG. 1;

FIG. 6D is a schematic circuit diagram illustrating in detail a write decode box as shown in FIGS. 6A-6C;

FIGS. 16A-16D combine to provide a schematic diagram illustrating the circuit detail of the write address pointer logic shown in FIG. 9 and 9A;

FIGS. 17A-17D combine to provide a schematic diagram illustrating the circuit detail of the read address pointer logic shown in FIG. 10;

FIGS. 18A-18F combine to provide a schematic diagram illustrating the circuit detail of the subtractor section of the comparator logic shown in FIG. 11;

FIGS. 20A-20D combine to provide a schematic diagram illustrating the circuit detail of the master reset and flag control logic shown in FIG. 13;

FIGS. 21A-21D combine to provide a schematic diagram illustaating the circuit detail of the write control logic shown in FIG. 14;

FIGS. 22A-22C combine to provide a schematic diagram illustrating the circuit detail of the read control logic shown in FIG. 15;

DETAILED DESCRIPTION OF THE PREFERRED EMBODIMENT

Figure 1:
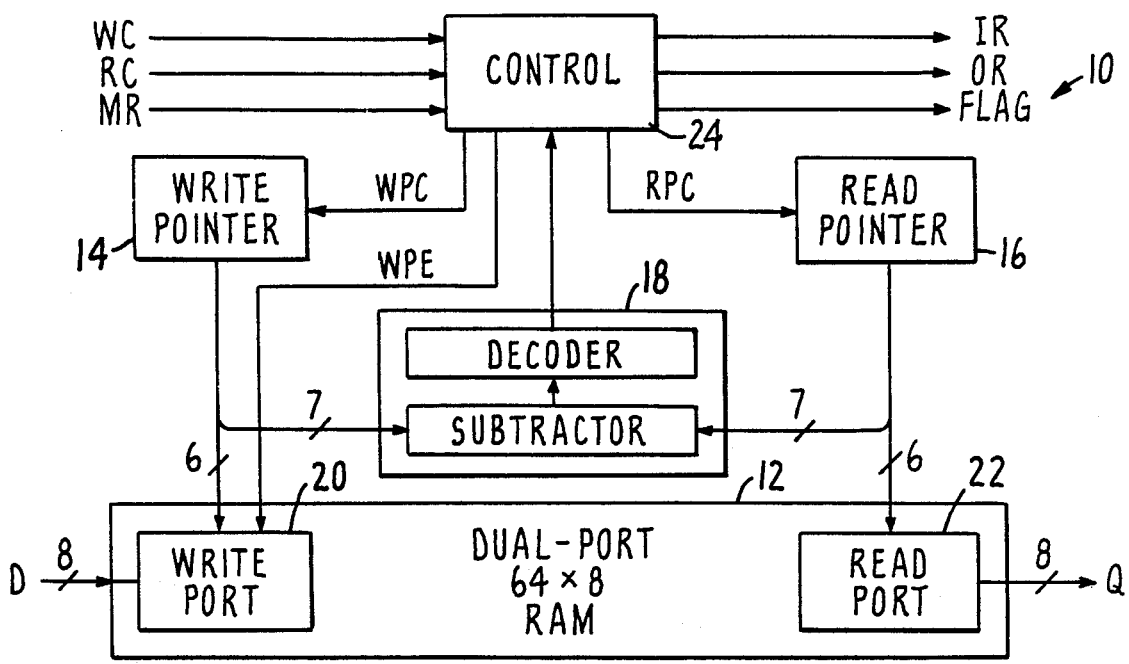
FIG. 1 is a schematic block diagram illustrating the No-Fall-Through FIFO of the present invention.

As shown in FIG. 1, the No-Fall-Through, First-In-First-Out (FIFO) memory 10 of the present invention comprises a 64-word by 8-bit dual-port random access memory (RAM) 12 having a storage section which includes multiple locations for storing data words. The RAM includes a write port 20 which receives data words from an external source via inputs D and writes them into the RAM's storage section in response to a write clock input signal WC provided by control logic 24. The RAM 12 also includes a read port 22 which reads data words from the RAM's storage section, in the same sequence as previously written, in response to a read clock input signal RC and delivers to an external destination via outputs Q. A write pointer 14 connected to address inputs of the RAM write port 20 maintains a write pointer value WP which is indicative of the number of data words which have been written into the RAM's storage section. A read pointer 16 connected to address inputs of the read port 22 maintains a read pointer value RP which is indicative of the number of data words which have been read from the RAM's storage section. A comparator 18 includes a subtractor section and a decoder section. The subtractor section of comparator 18 monitors the write pointer value WP and the read pointer value RP and generates an output which represents the difference between the write pointer value and the read pointer value (WP-RP). As discussed in greater detail below, the decoder section of comparator 18 detects certain specific characteristics of the subtractor output which are used to control the internal operations of the FIFO 10 and to generate output signals Specialized control logic 24 not only controls the write and read address pointers 14 and 16, respectively, as well as accsss to RAM 12, but also generates output control signals IR, OR and FLAG in response to input control signals WC, RC and MR.

The function of each of the above-described elements of the FIFO 10 will be discussed in greater detail hereinbelow.

Figure 2:
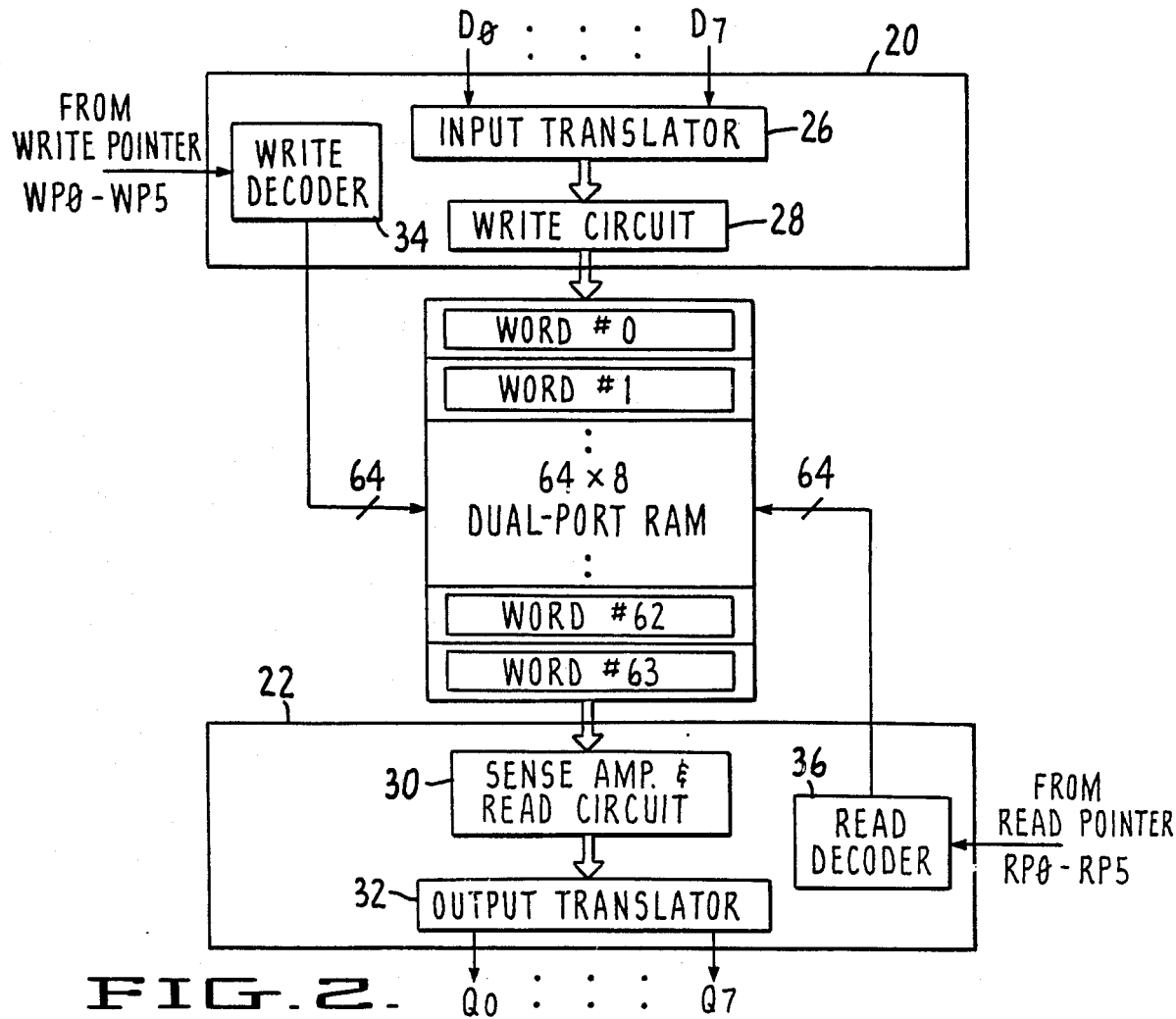
FIG. 2 is a schematic block diagram illustrating the basic layout of a dual-port random access memory of the type used in the FIFO of the present invention.
Figure 4:
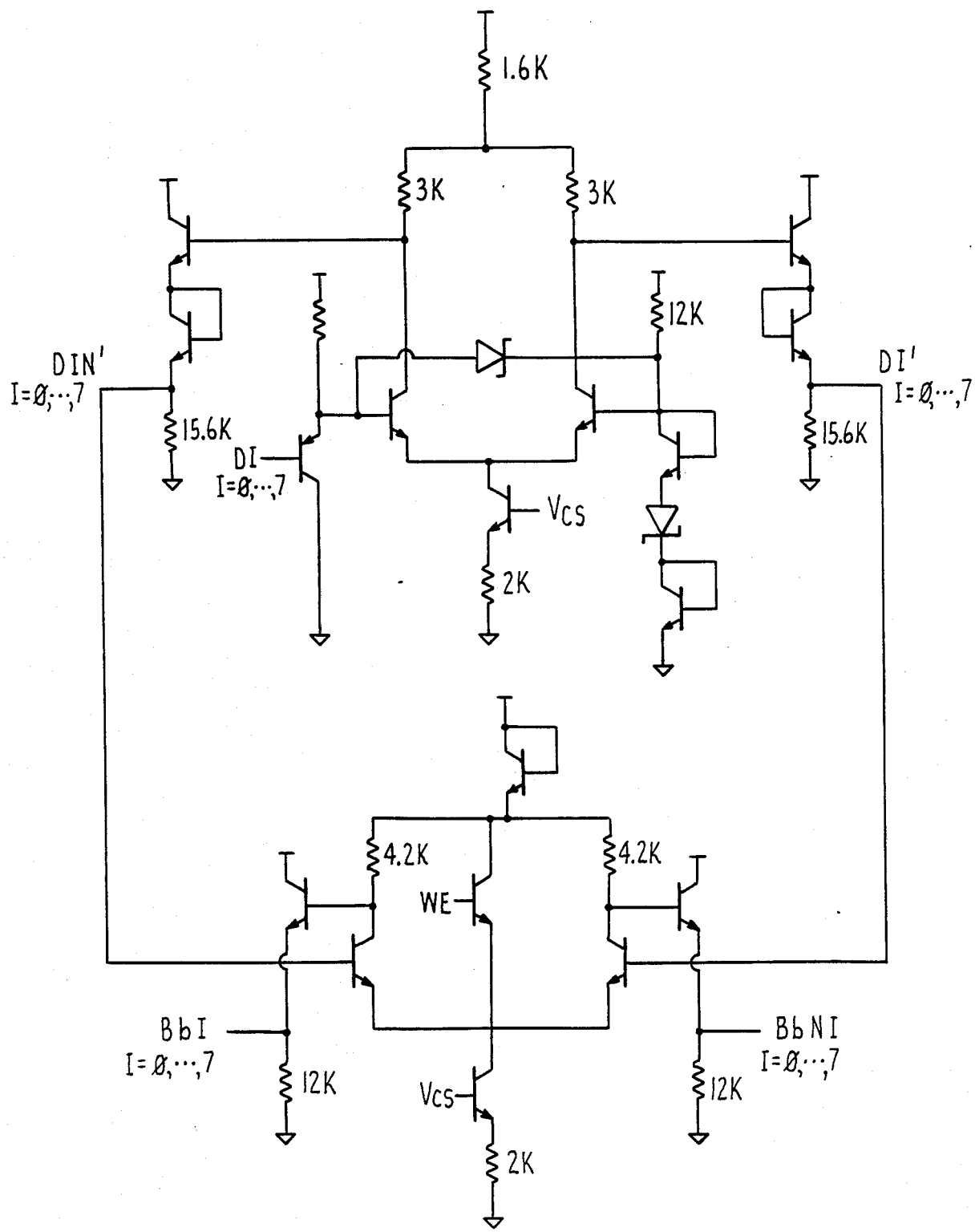
FIG. 4 is a schematic circuit diagram illustrating a data input translator and write circuit of the type used in the random access memory shown in FIG. 2.

As shown in FIG. 2, since the FIFO 10 of the present invention is internally an emitter-coupled logic (ECC) device, to provide the speed advantages associated with that technology, 8-bit data words $D_0$–$D_7$ are provided to an input translator 26 which converts the data words from more commonly-used transistor-transistor logic (TTL) to ECL logic levels. The translated ECL data words are then written into a word line of the storage section of the dual port RAM 12 by a write circuit 28. Circuit detail of a preferred embodiment of both the data input translator 26 and the write circuit 28 is shown in FIG. 4.

Figure 3C:
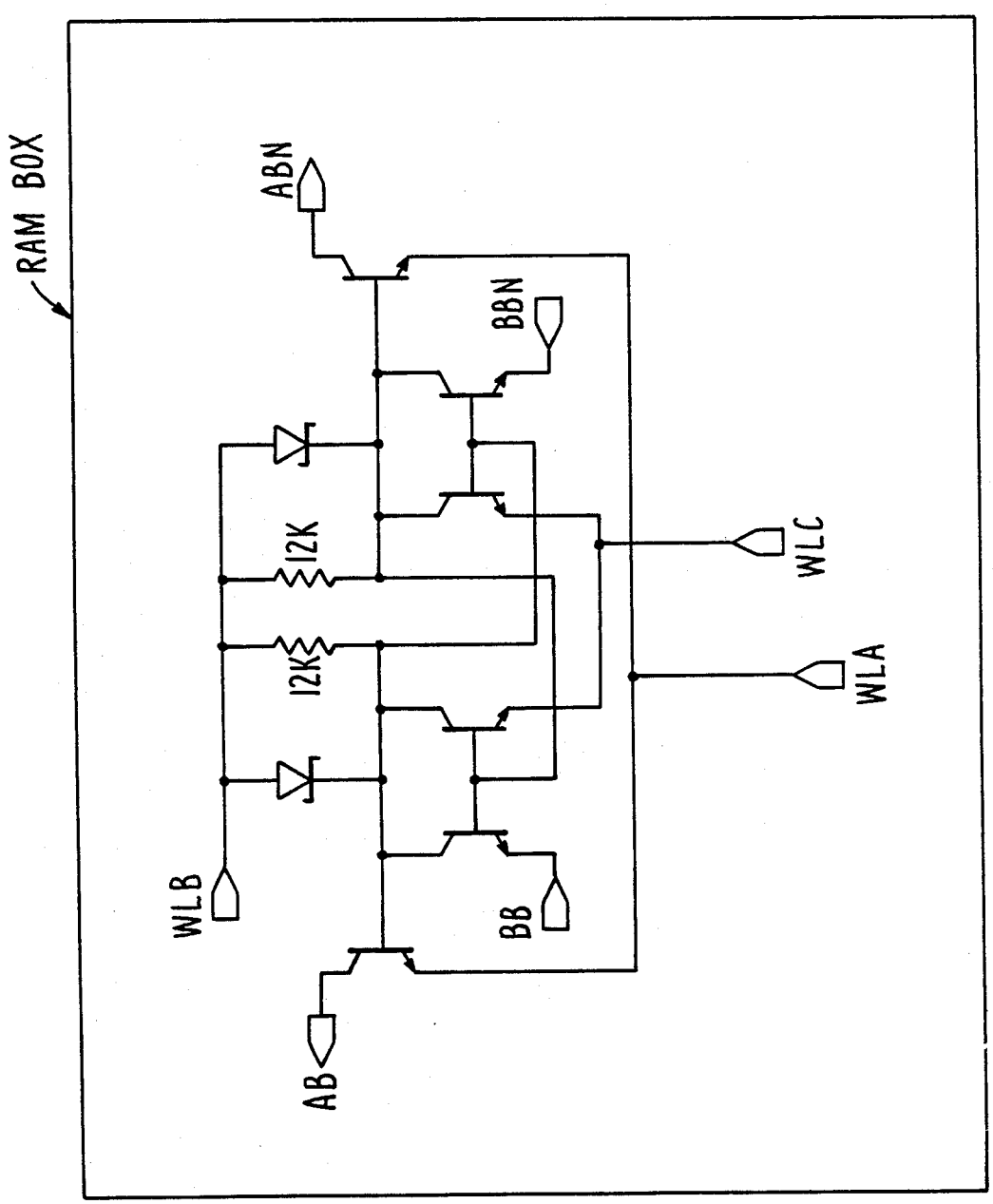
FIG. 3C is a schematic circuit diagram illustrating a meoory cell of the type used in the random access memory shown in FIGS. 3A and 3B.

The details of the RAM memory circuit are shown in FIG. 3A and 3B, with FIG. 3C providing circuit detail of a typical memory cell utilized within RAM 12.

Figure 5A:
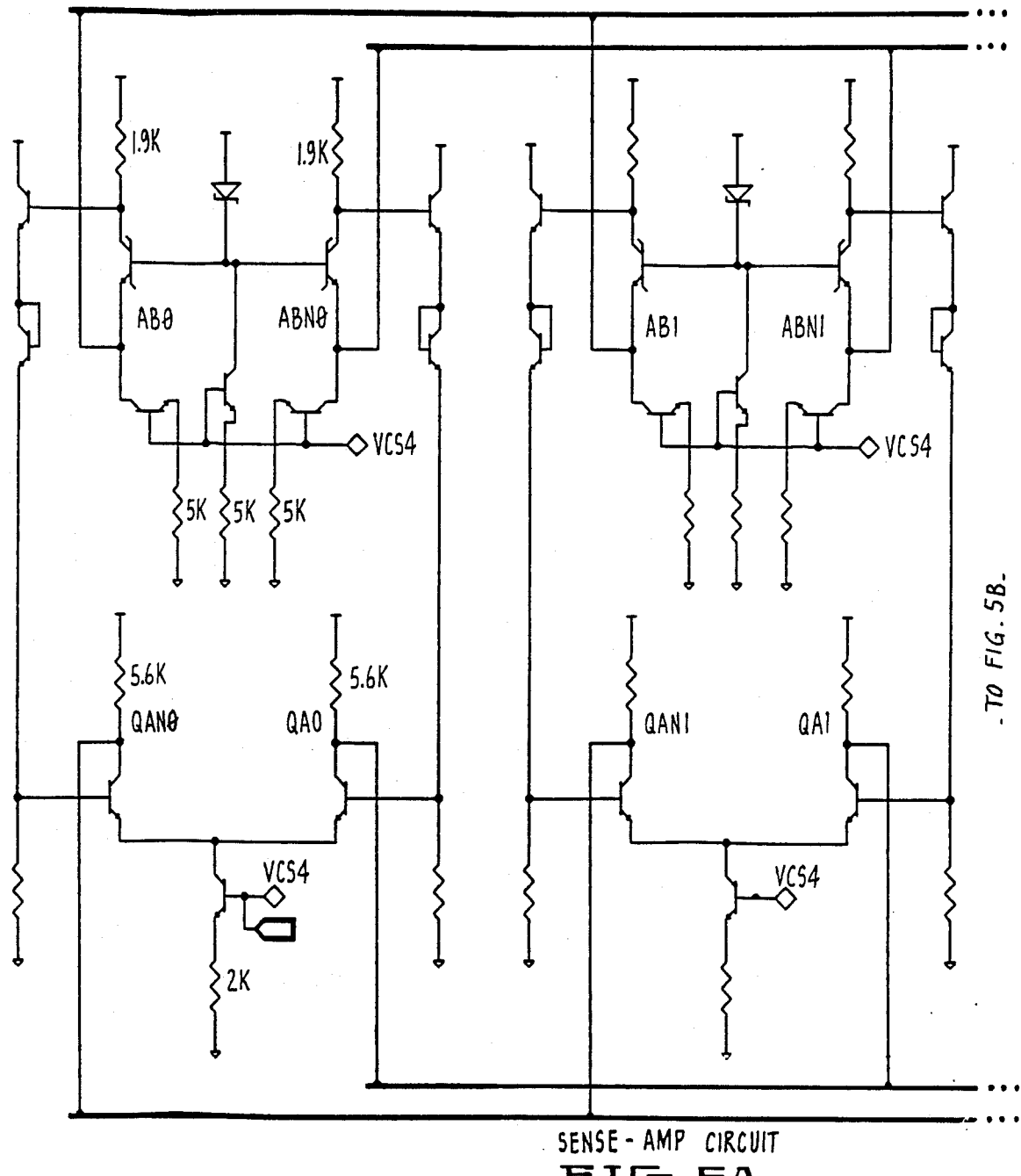
FIGS. 5A and 5B combine to provide a schematic circuit diagram illustrating a sense-amplifier and read circuit of the type used in the random access memory shown in FIG. 2.
Figure 5B:
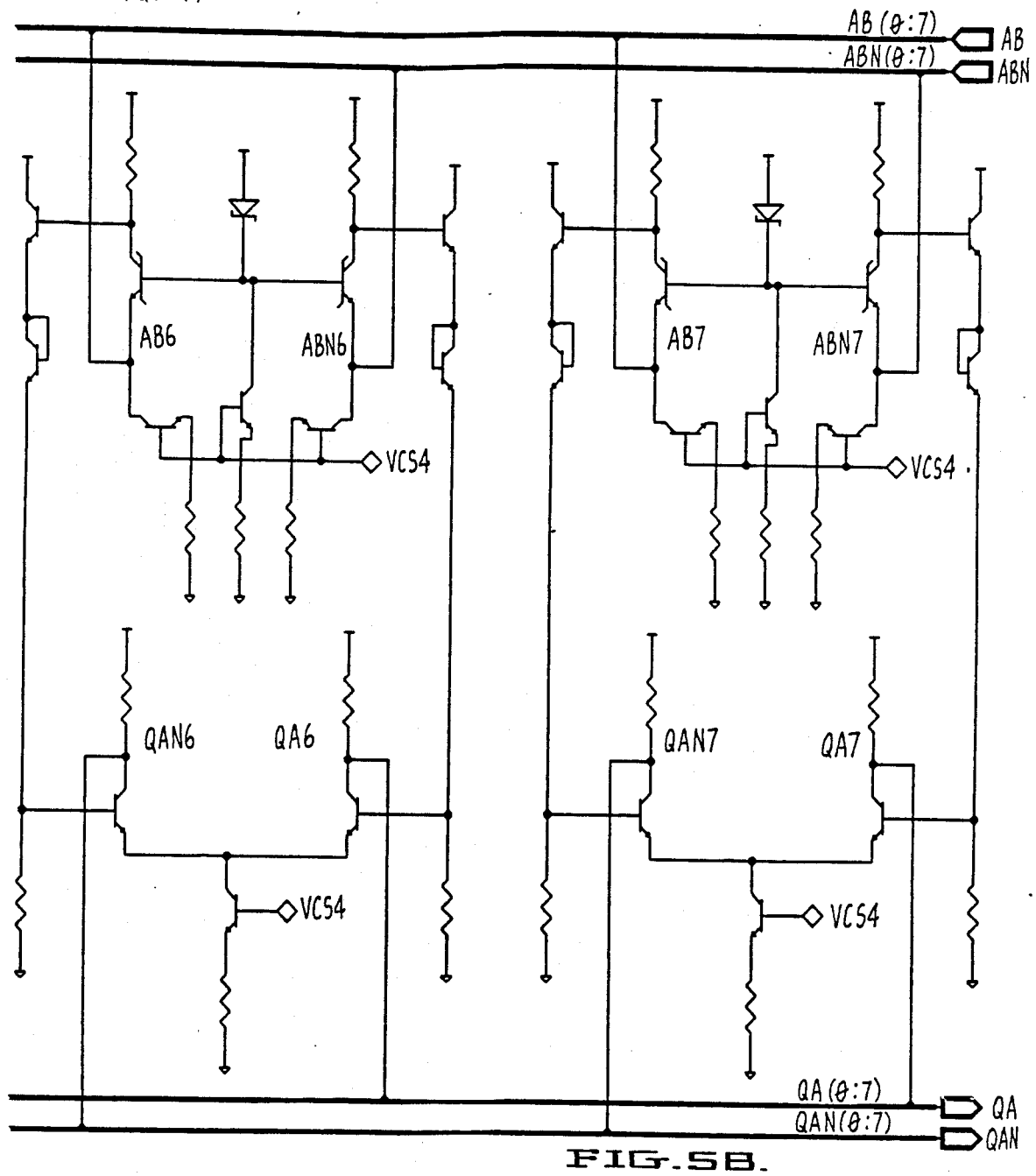
Figure 5C:
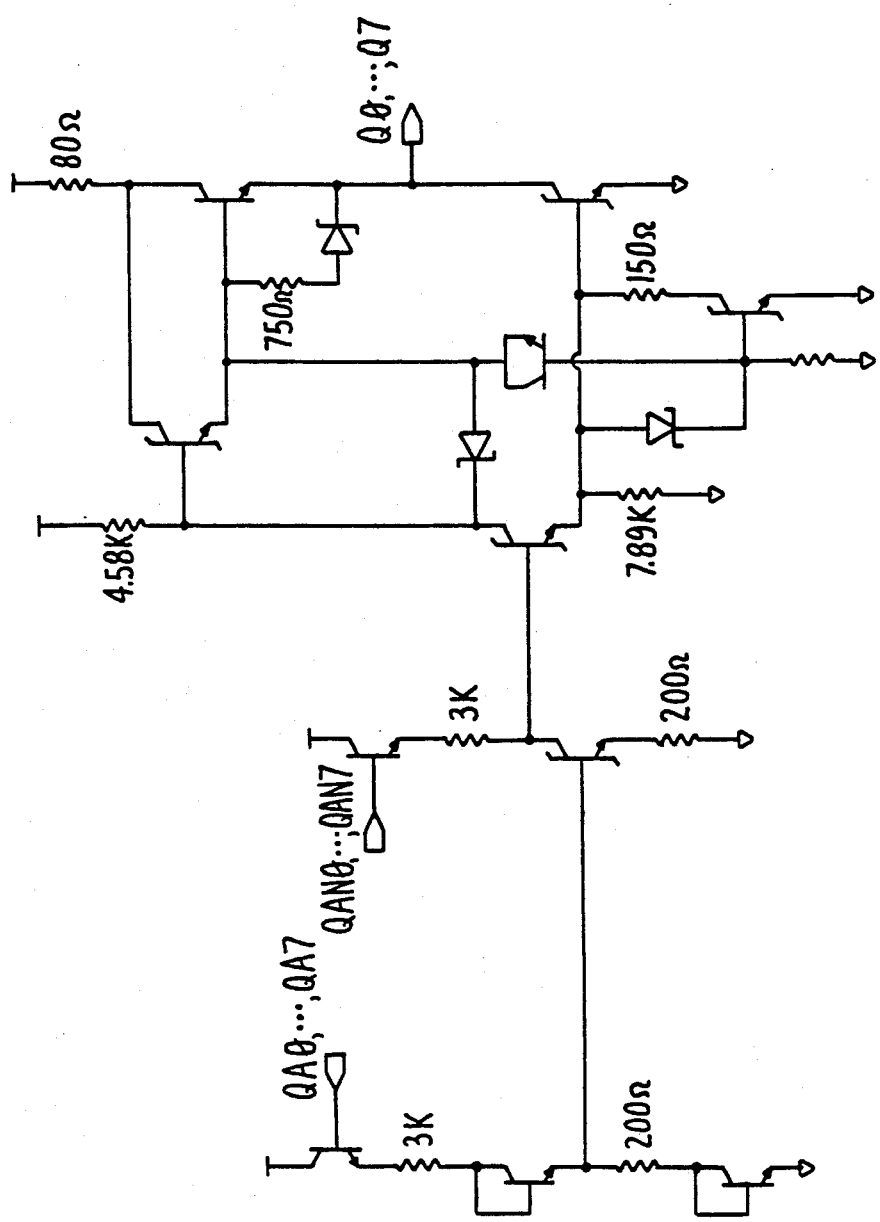
FIG. 5C is a schematic circuit diagram illustrating an output translator of the type used in the random access memory shown in FIG. 2.

Data words $Q_0$–$Q_7$ are read foom the storage section of RAM 12 through sense-amplifier and read circuit 30 which delivers the data words to an output translator 32. The output translator 32 converts the ECL output back to TTL logic levels. The circuit detail of a preferred embodiment of both the sense-amplifier and read circuit 30 and the output translator 32 are shown in FIG. 5A, 5B and FIG. 5C, respectively.

Figure 6B:
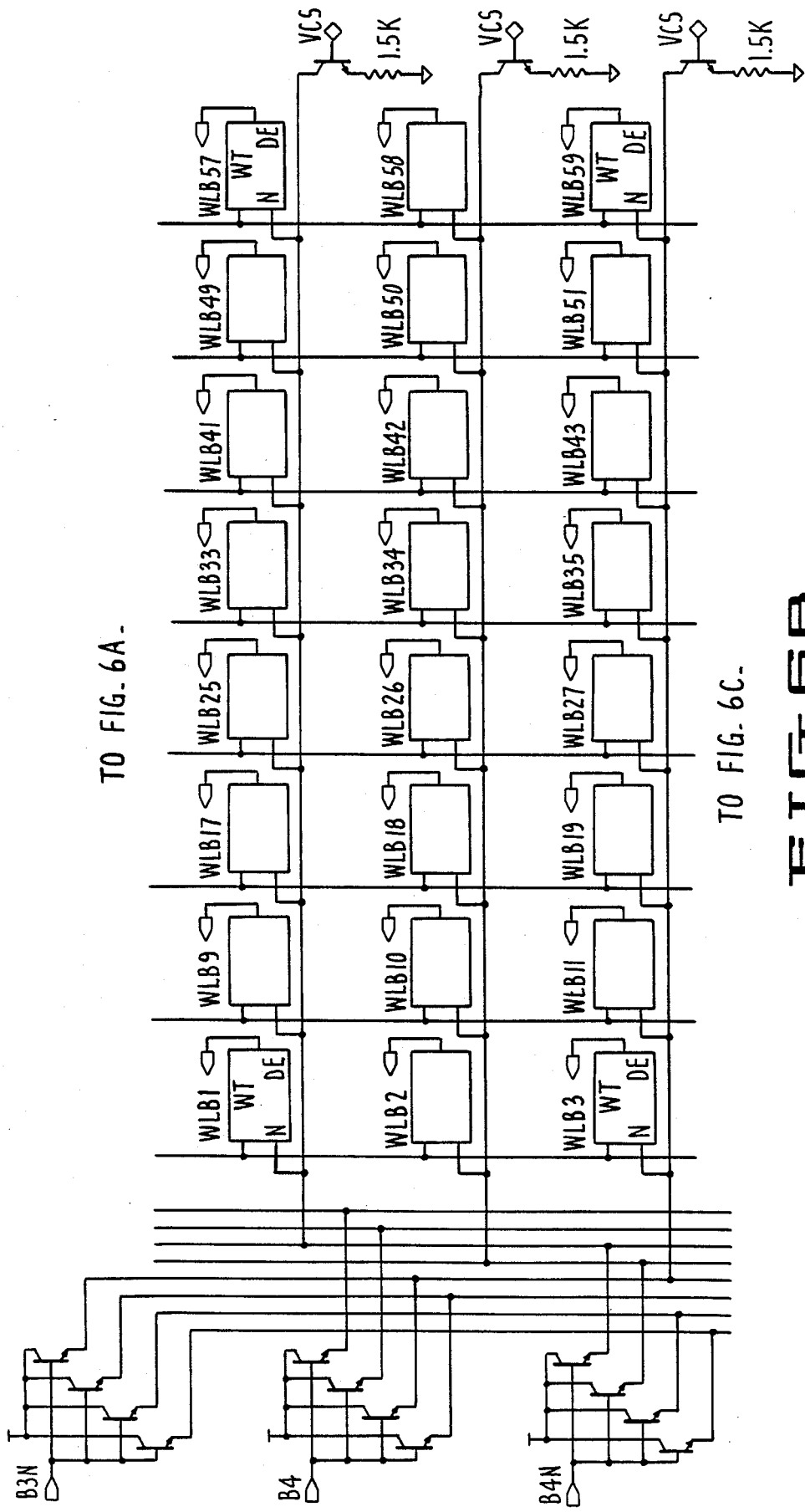
Figure 6C:
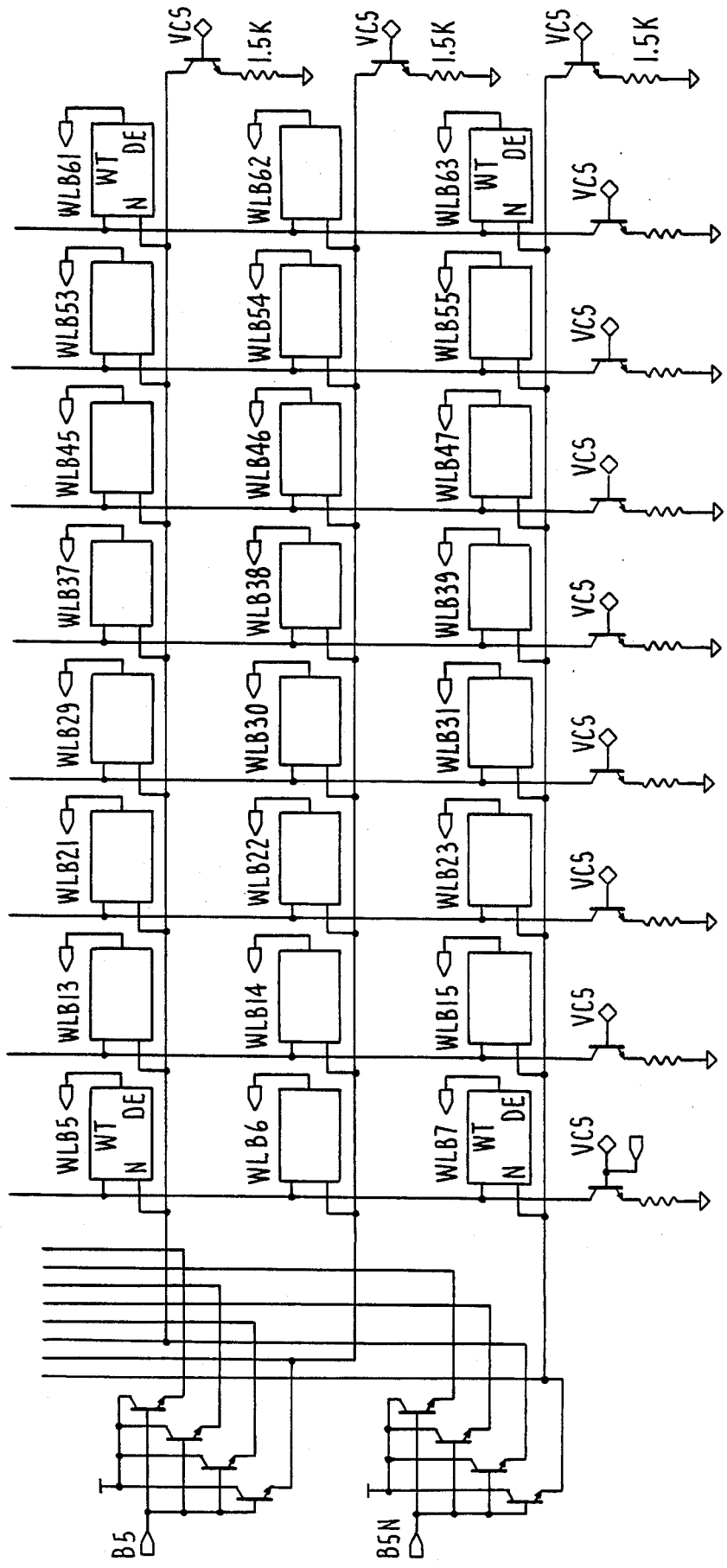
Figure 60:
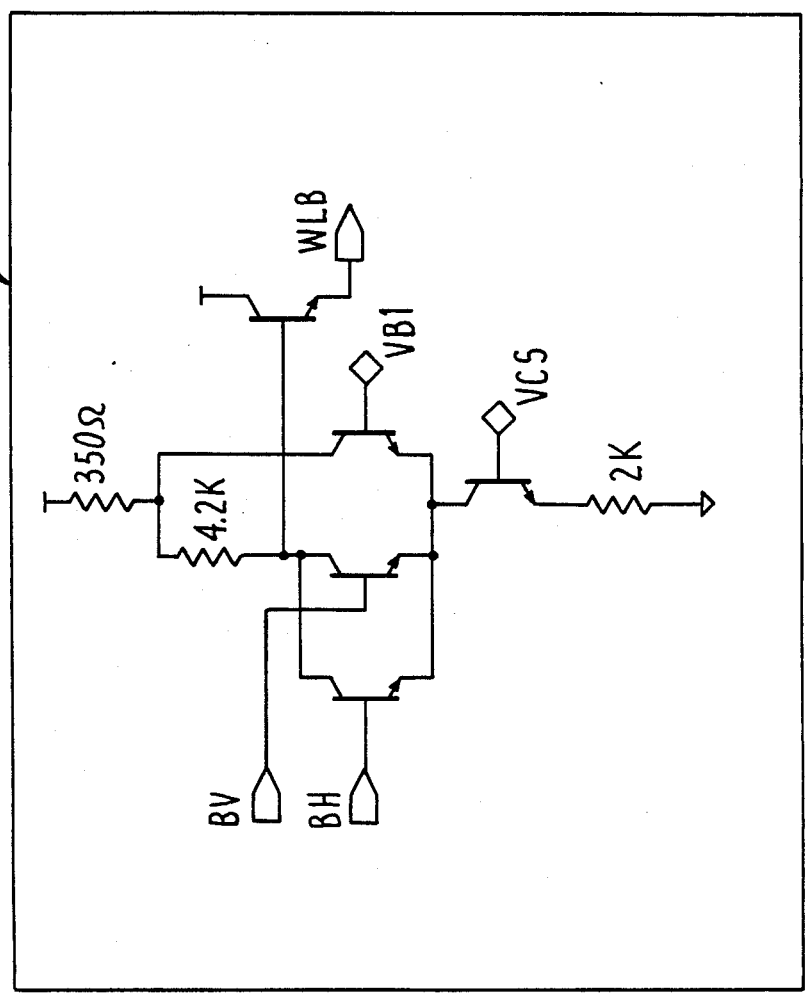

A write decoder 34 selects one of the sixty-four locations of RAM 12 into which data words are to be written based on the 6-bit binary value WP0–WP5 received from the write pointer 14. FIG. 6A and 6B combine to show the detailed circuitry of the write decoder 34; a typical write decode cell is shown in FIG. 6C.

Figure 7A:
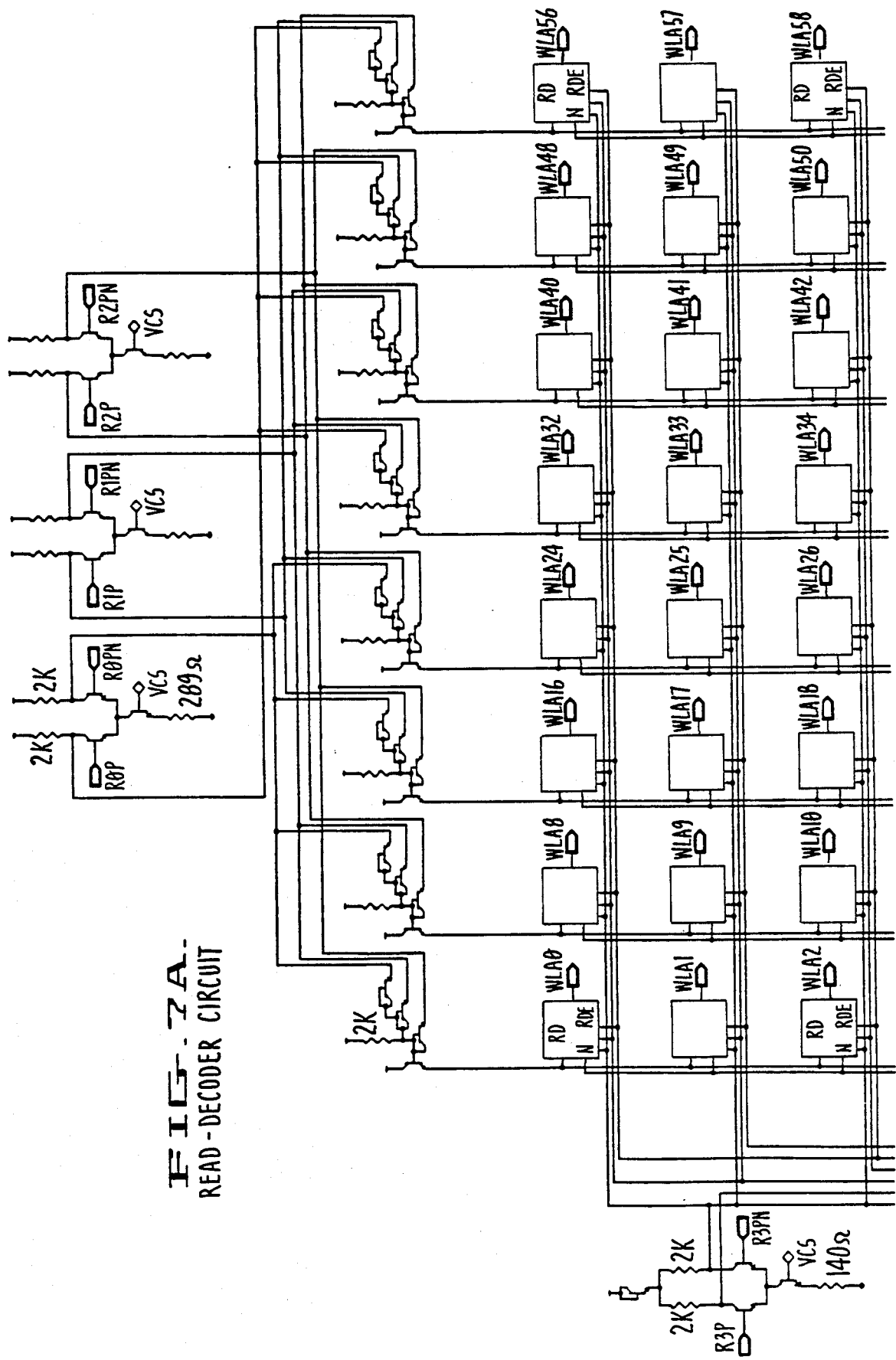
FIGS. 7A and 7B combine to provide a schematic circuit diagram illustrating a read decoder of the type used in the FIFO memory shown in FIG. 1.
Figure 7B:
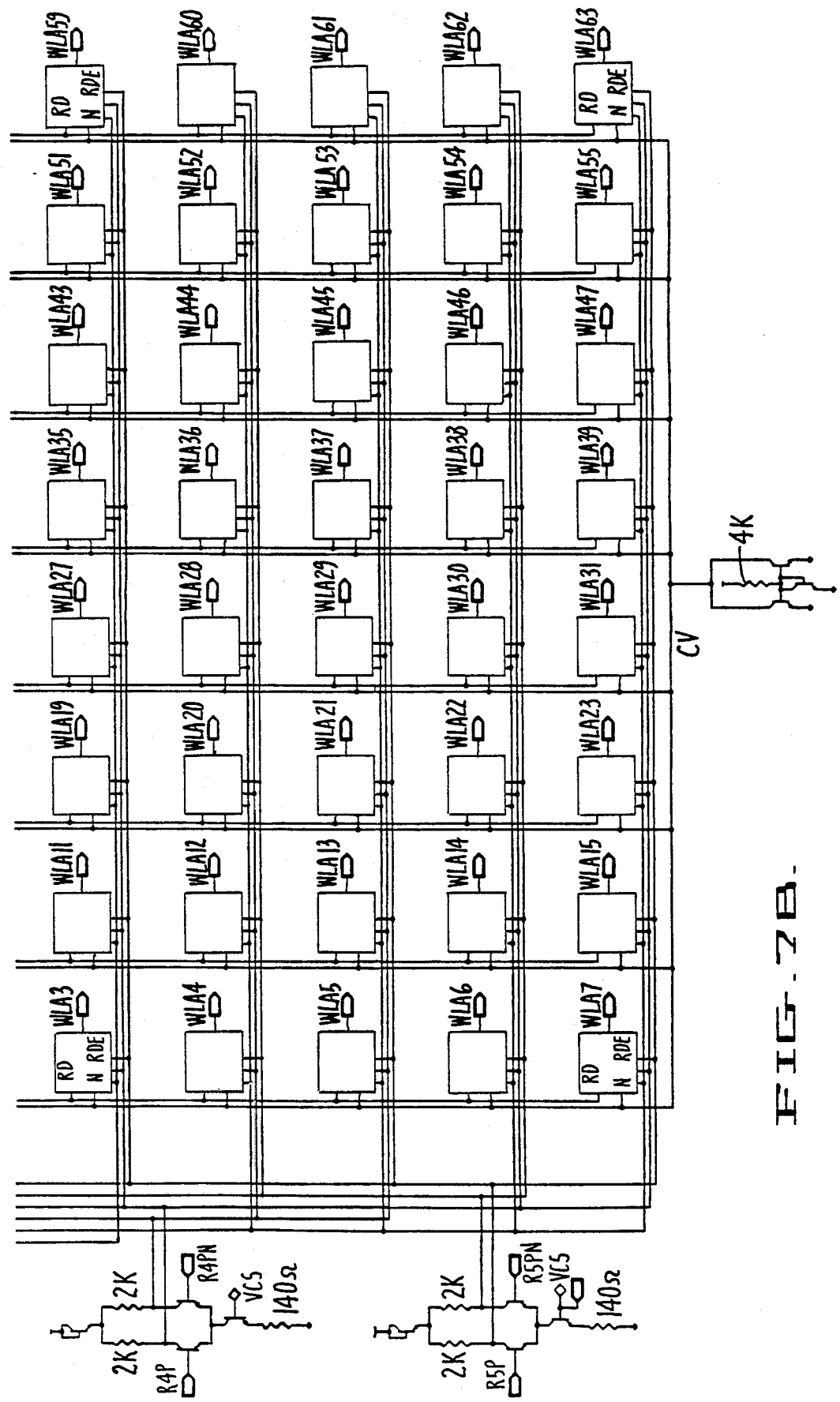
Figure 7C:
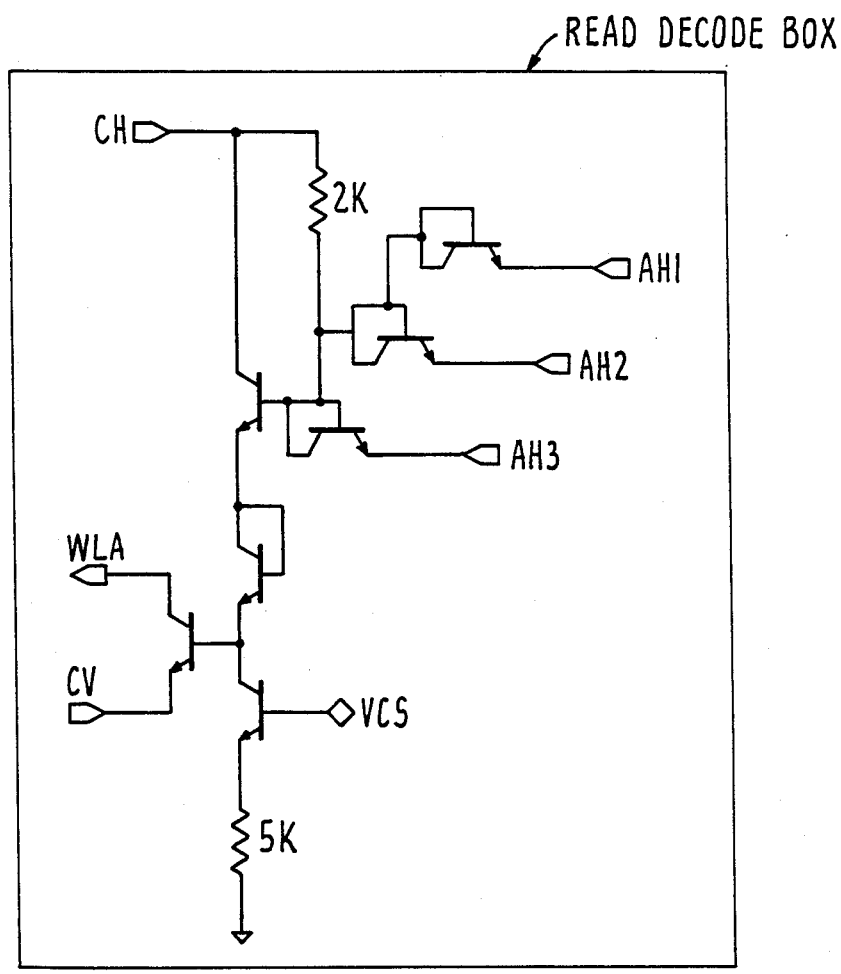
FIG. 7C is a schematic circuit diagram illustrating in detail a read decode box as shown in FIGS. 7A and 7B.

A read decoder 36 selects one of the sixty-four locations of RAM 12 from which data words are to be read based on the 6-bit binary value RP0–RP5 received from the read pointer 16. FIG. 7A and 7B combine to show the detailed circuitry of the read decoder 36; a typical read decode cell is shown in FIG. 7C.

Figure 8:
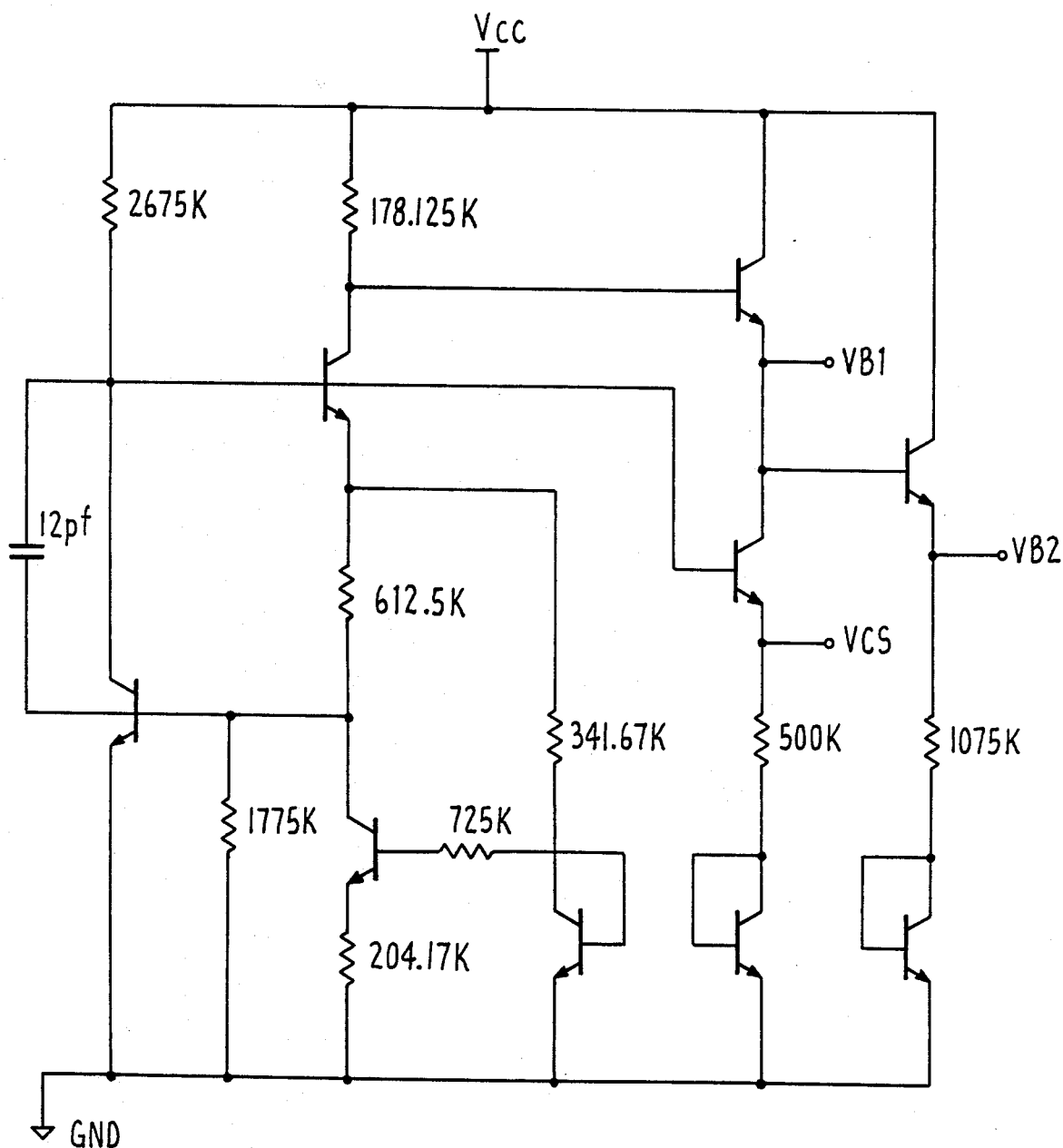
FIG. 8 is a schematic circuit diagram illustrating a bias driver circuit utilized in conjunction with the FIFO memory shown in FIG. 1.

FIG. 8 shows a bias driver circuit which provides the reference voltages VCS, VB1 and VB2 utilized throughout the FIFO 10 circuit as typically required to implement ECL circuitry.

The write and read ports 20, 22 of RAM 12 each have a separate address decoder and data bus. The independently timed, asynchronous write and read cycles may occur concurrently, or at any time, with respect to each other.

Figures 9, 9A:
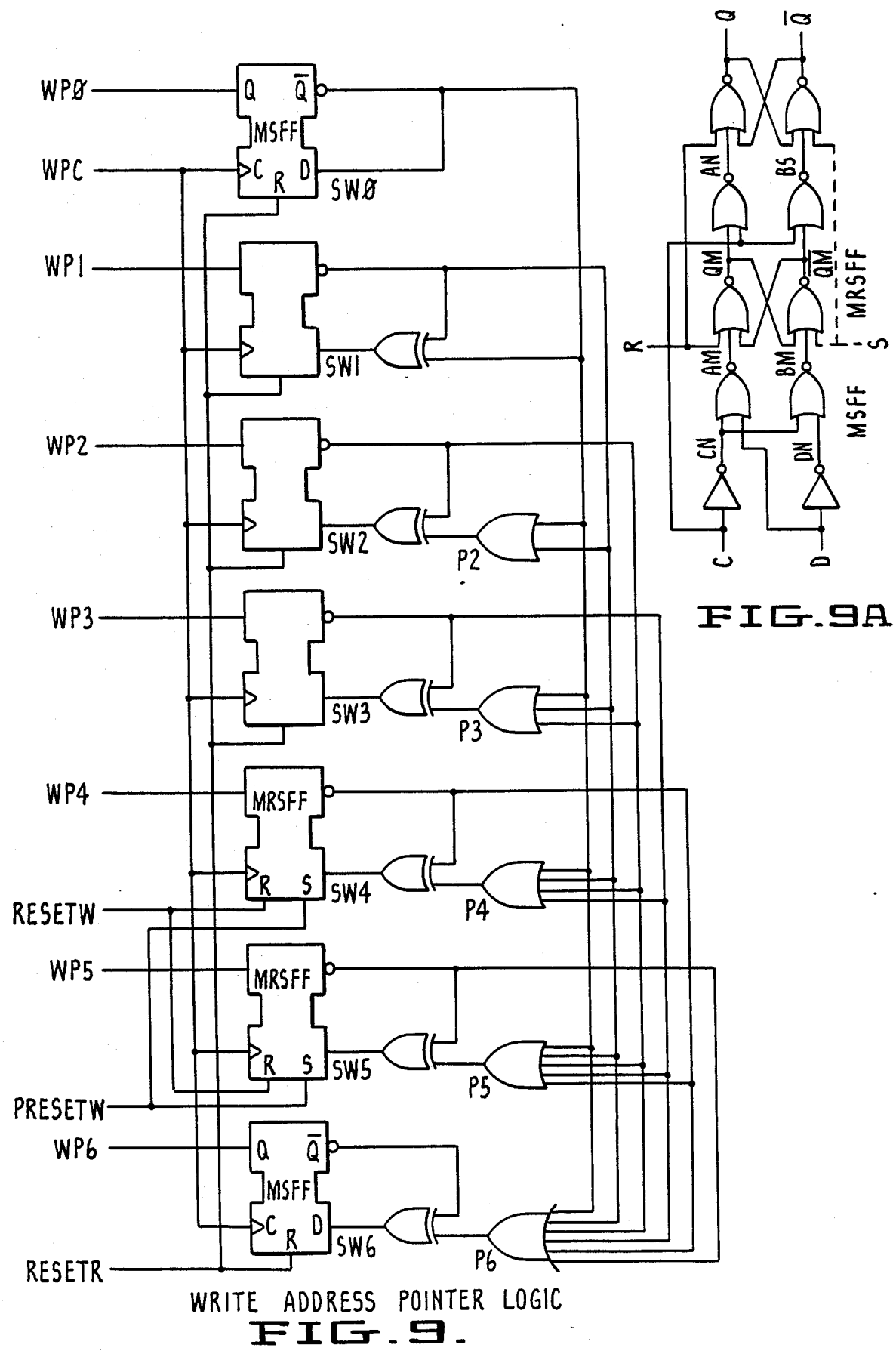
FIGS. 9 and 9A combine to provide a schematic diagram illustrating the write address pointer logic of the FIFO memory shown in FIG. 1.

Both the write address pointer 14 and the read address pointer 16, shown schematically in FIGS. 9/9A and 10, respectively, are synchronous binary incrementing counters. The write port address is taken from the low order six-bits WP0–WP5 of the write address pointer 14. The read port address is taken from the low-order six bits RP0–RP5 of the read address pointer 16.

Figure 11:
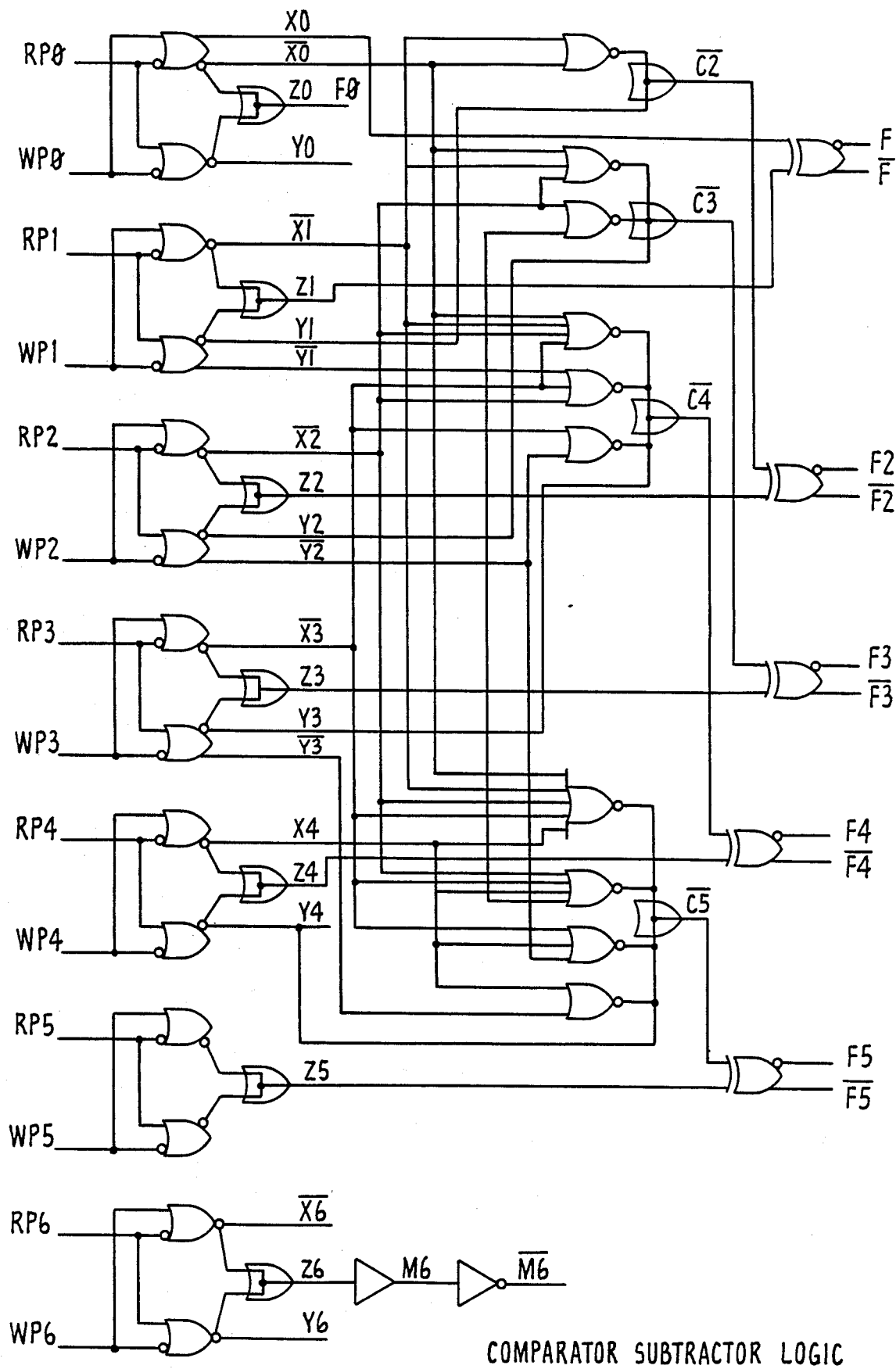
FIG. 11 is a schematic diagram illustrating the subtractor section of the comparator logic of the FIFO memory shown in FIG. 1.
Figure 12:
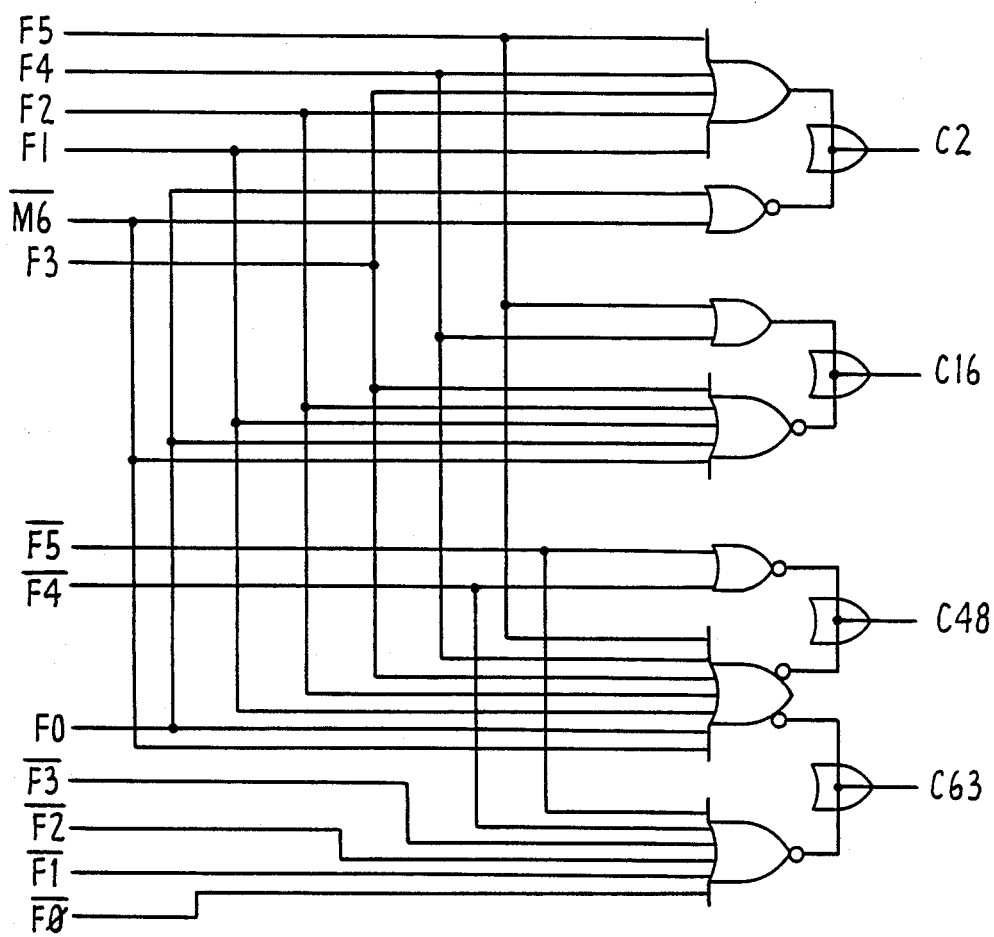
FIG. 12 is a schematic diagram illustrating the comparator's decode logic of the FIFO memory shown in FIG. 1.

The subtractor portion of the comparator 18, shown in FIG. 11, continuously generates an arithmetic difference F between the value WP of the write address pointer 14 and the value RP of the read address pointer 16, where $F = WP - RP + 1$. As shown in FIG. 12, these differences F, together with high order bits WP6 and RP6 from the write and read pointers, respectively, are utilized by the comparator's decode logic to generate four internal status signals C2, C16, C48 and C63. Signal C2 is high whenever the write address pointer value WP exceeds the read address oointer value RP by at least 2. Likewise, signals C16, C48 and C63 are each high whenever WP-RP is at least 16, 88 or 63, respectively.

Figure 13:
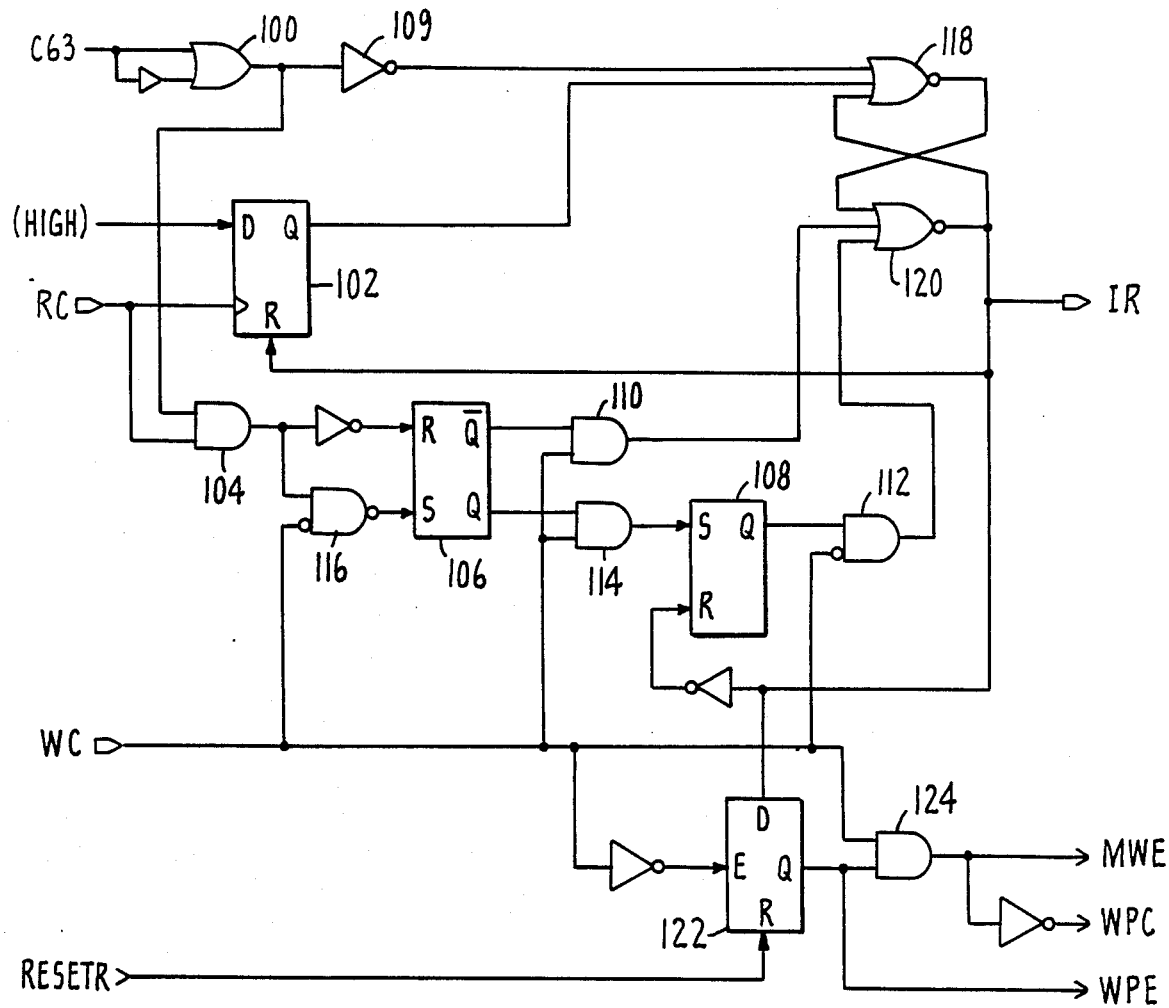
FIG. 13 is a schematic diagram illustrating the write cycle control logic of the FIFO memory shown in FIG. 1.
Figure 25:
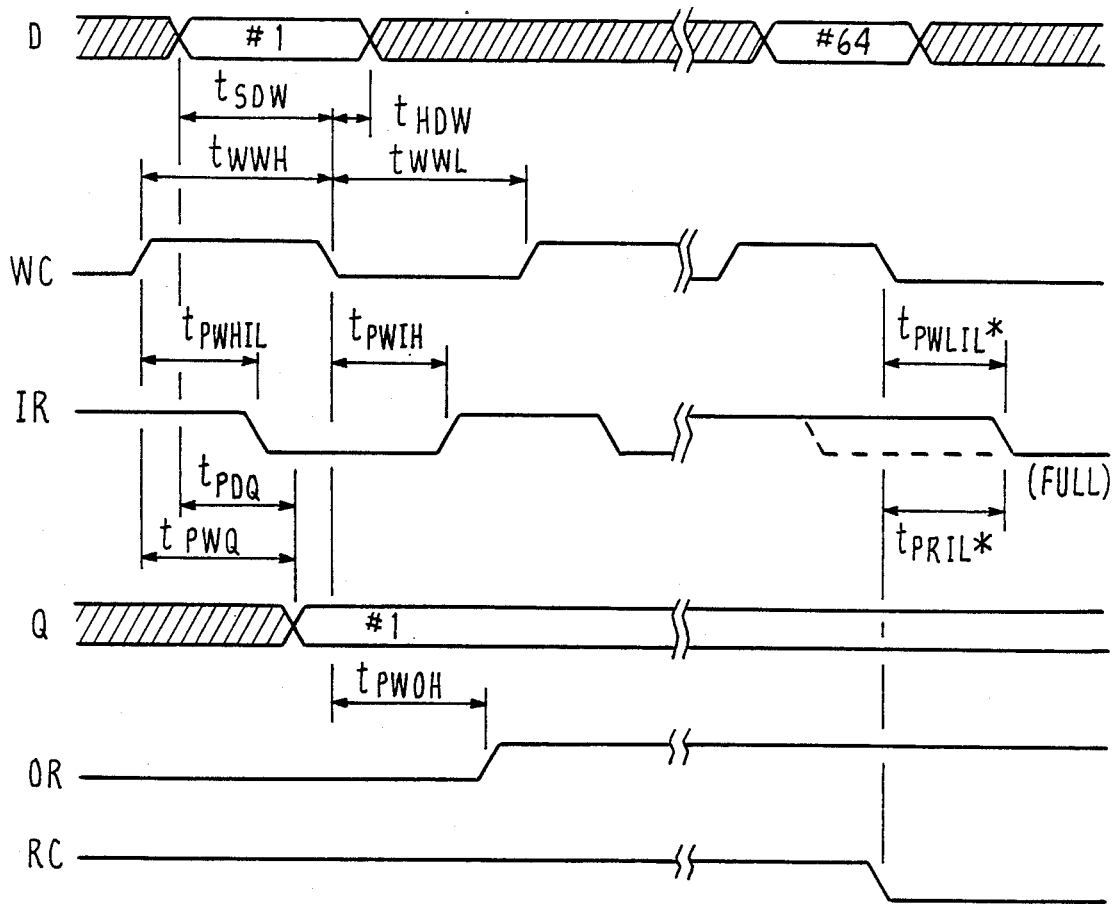
FIG. 25 is a timing diagram illustrating the write cycle timing waveform.

FIG. 13 shows the write cycle control logic for the FIFO 10; FIG. 25 shows the write cycle timing waveform. The write clock input WC latches in a data word on a high-to-low transition. That is, while the input control signal WC to the control logic 24 is high, a data word on an 8-bit data input bus $D_0$–$D_7$ is written into the storage section of RAM 12 via the write port 20 at an address specified by the write pointer 14. The value WP of the write pointer 14, which is initially at zero, is incremented on the falling edge of the WC input, thus concluding a write cycle.

Figure 14:
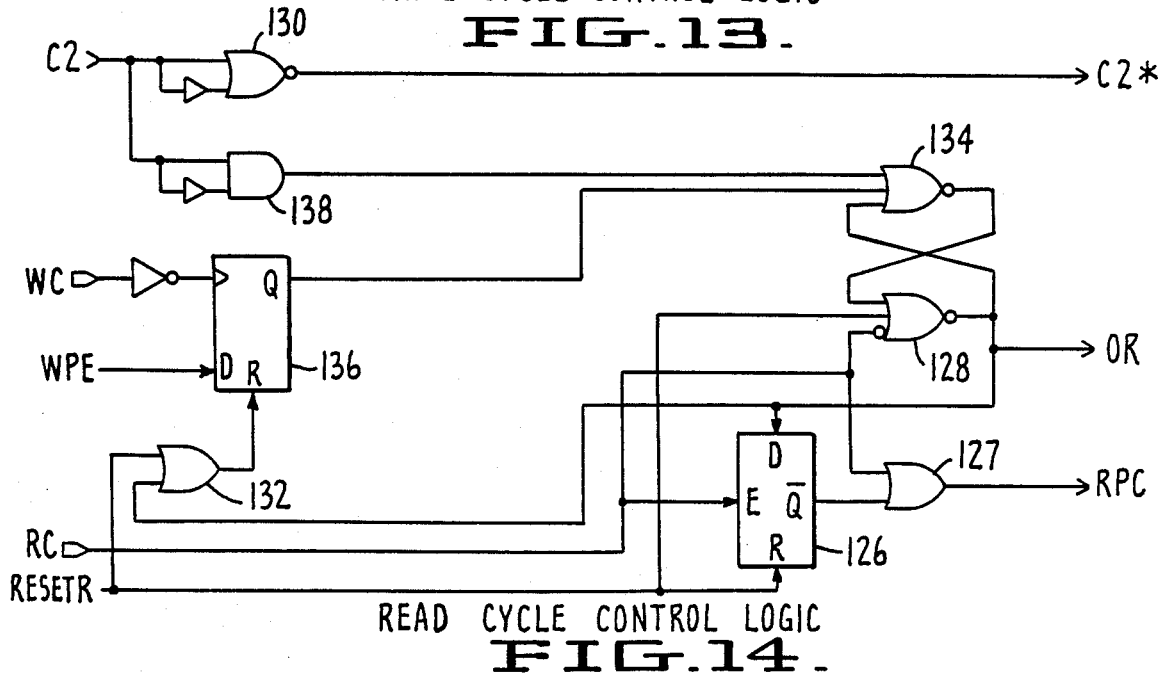
FIG. 14 is a schematic diagram illustrating the read cycle control logic of the FIFO memory shown in FIG. 1.
Figure 26:
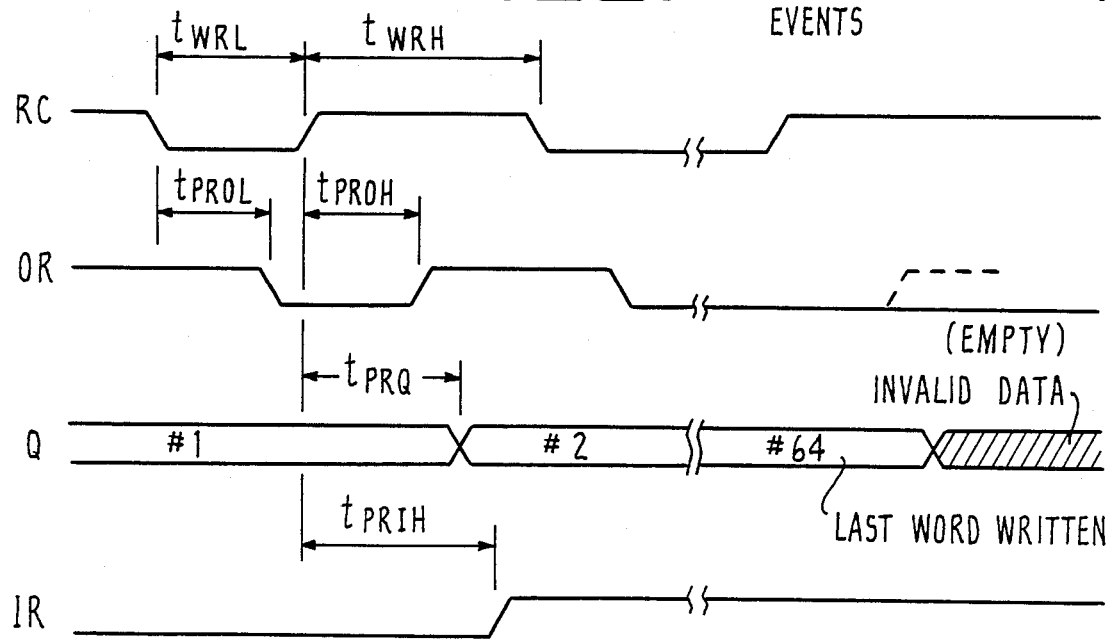
FIG. 26 is a timing diagram illustrating the read cycle timing waveform.

FIG. 14 shows the read cycle control logic for the FIFO 10; FIG. 26 shows the read cycle timing waveform. As described in detail below, a data word addressed by the read pointer 16, the value of which is initially at zero, is presented on the 8-bit data output bus $Q_0$–$Q_7$ of the read port 22. Thus, the first word written into RAM 12 appears on the Q outputs as it is being written because the write pointer value WP and the read pointer value RP are the saee, initially at zero. The rising edge of the read clock input signal RC increments the value RP of the read pointer 16, which allows the read pointer 16 to access the next data word from the RAM's read port 22.

Both the write pointer 14 and the read pointer automatically wrap around from 127 to 0.

When the value WP of the write pointer 14 equals the value RP of the read pointer 16, then the FIFO 10 is empty, i.e., any data words which have been written into the FIFO 10 have also been read out. When the value WP of the write pointer 14 exceeds the value RP of the read pointer 26 by 64, then the FIFO 10 is full, i.e., the next storage location of RAM 12 into which data should be written contains the oldest word that has not yet been read.

Figure 15:
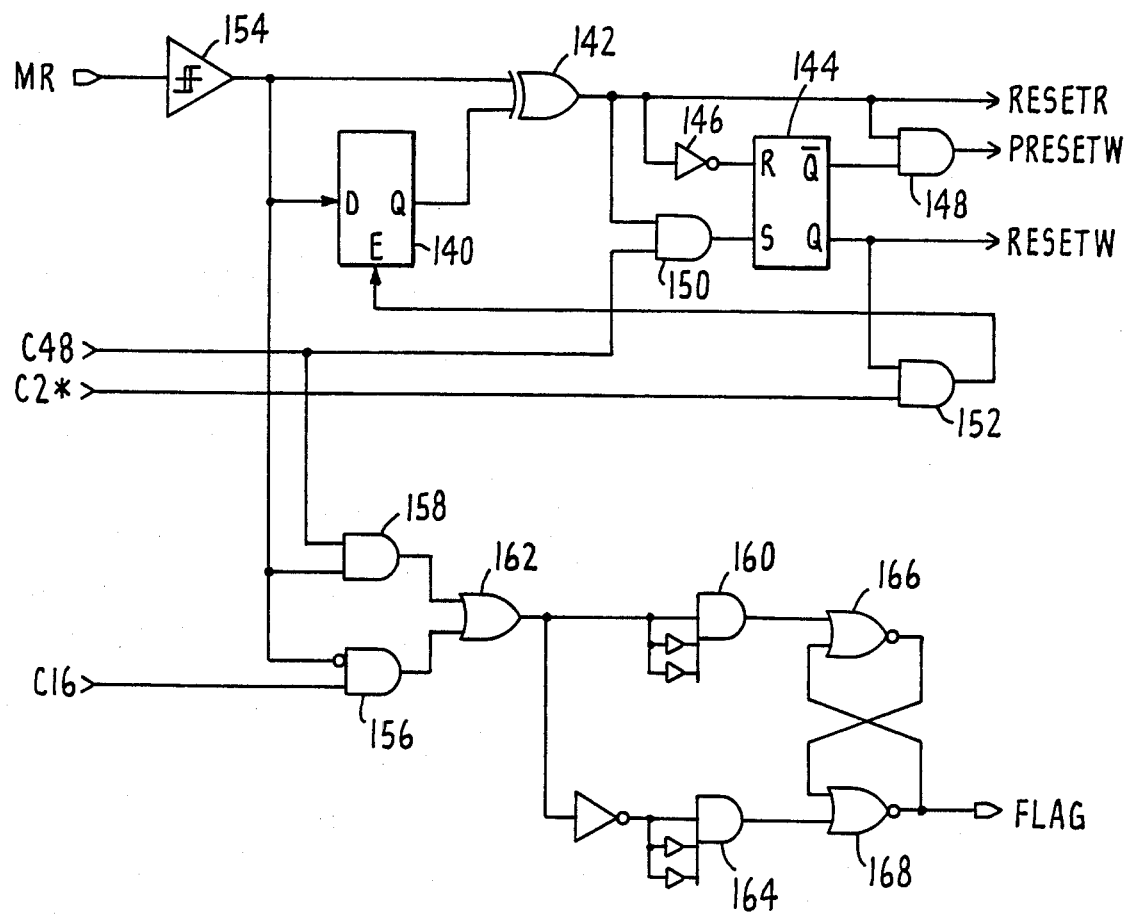
FIG. 15 is a schematic diagram illustrating the master reset and flag control logic of the FIFO memory shown in FIG. 1.
Figures 16A, 16B:
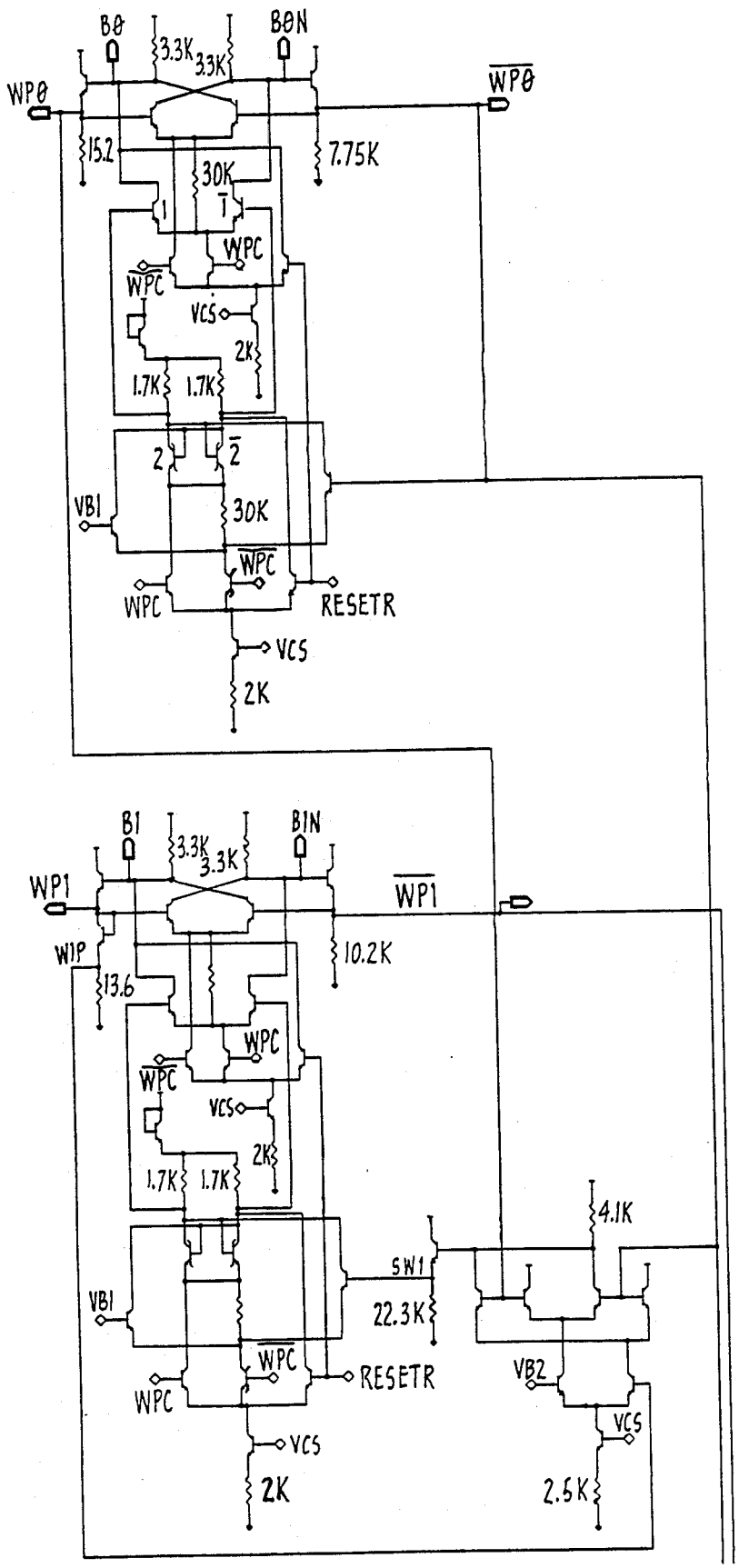
Figure 16B:
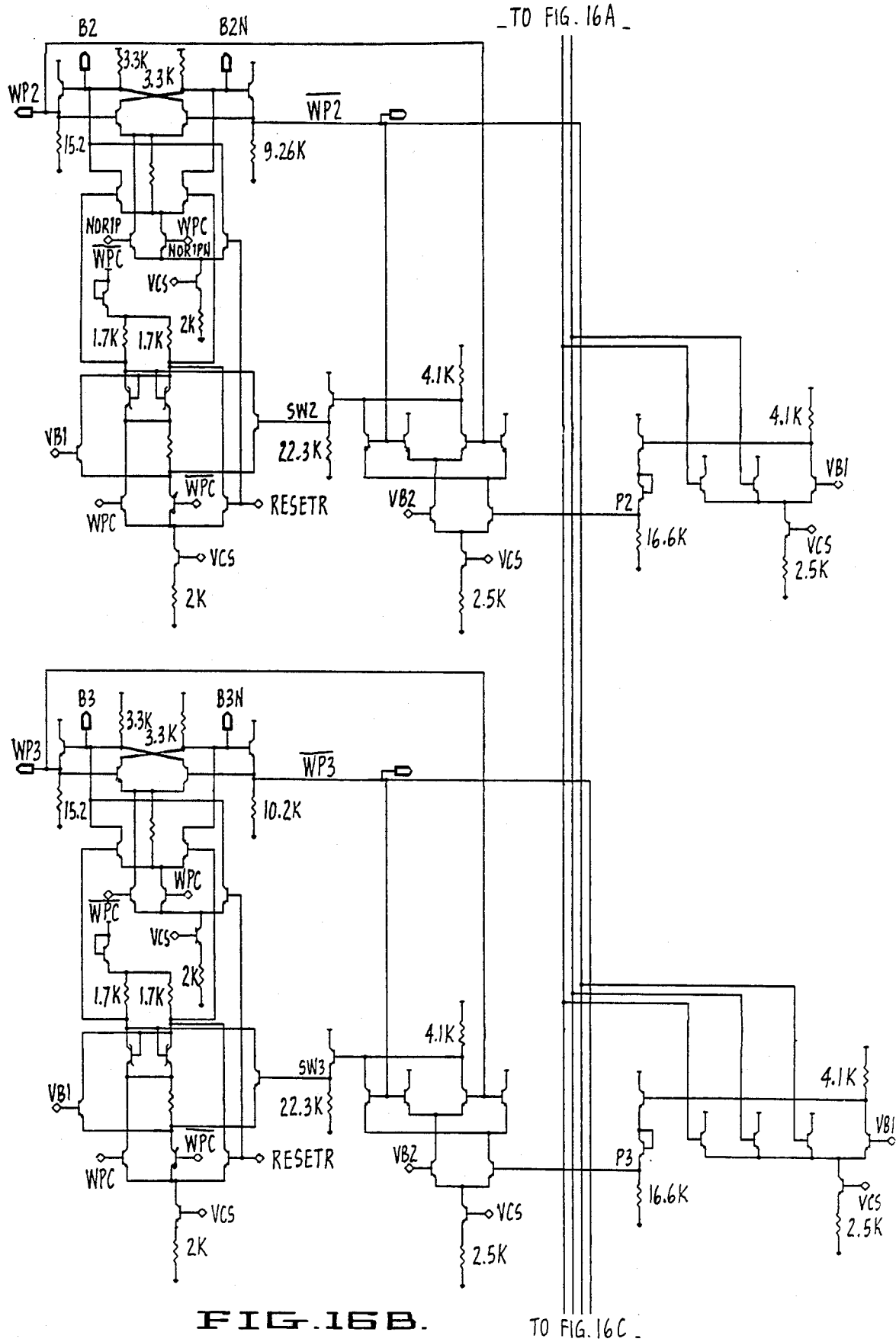
Figure 17A:
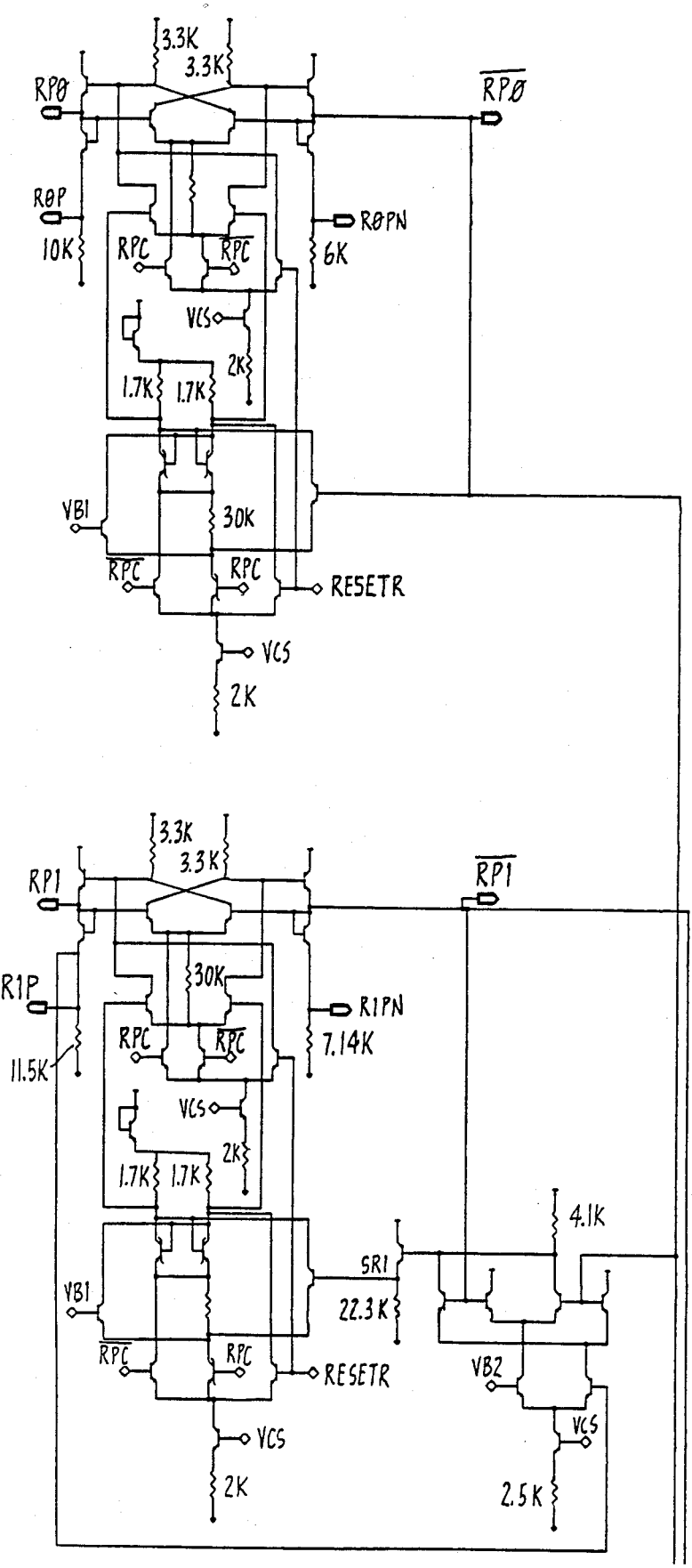
Figure 17D:
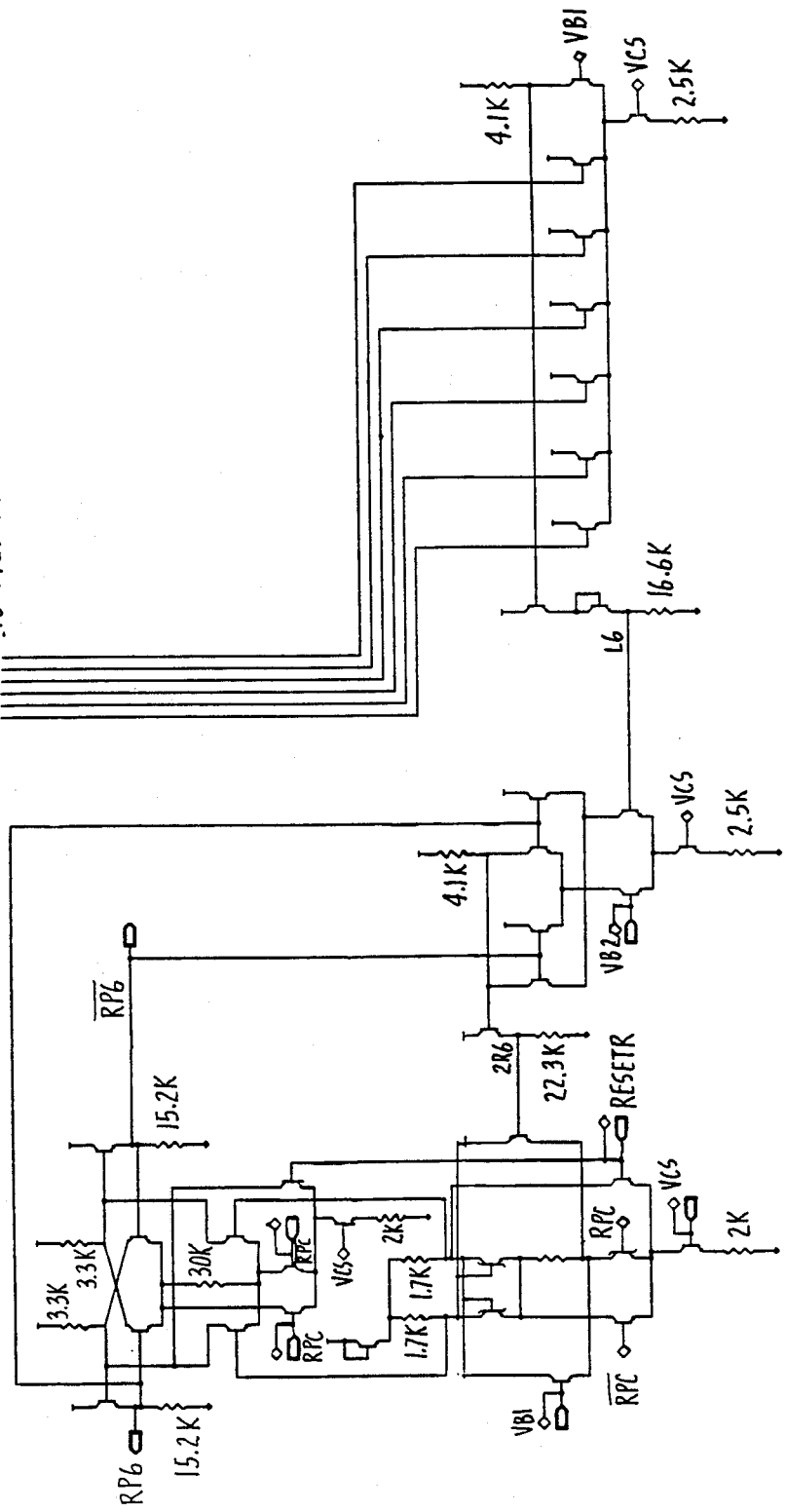
Figure 18A:
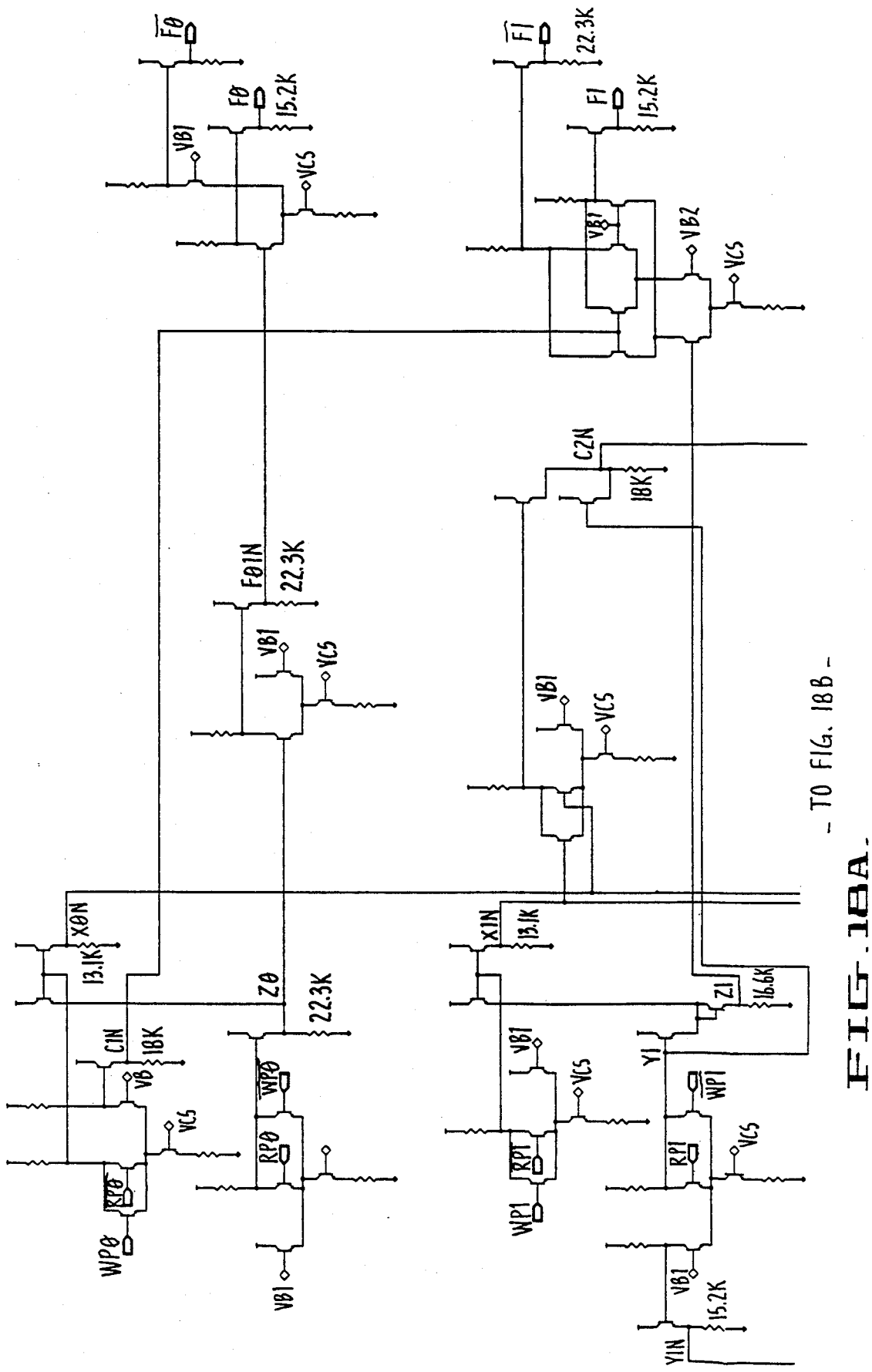
Figure 18B:
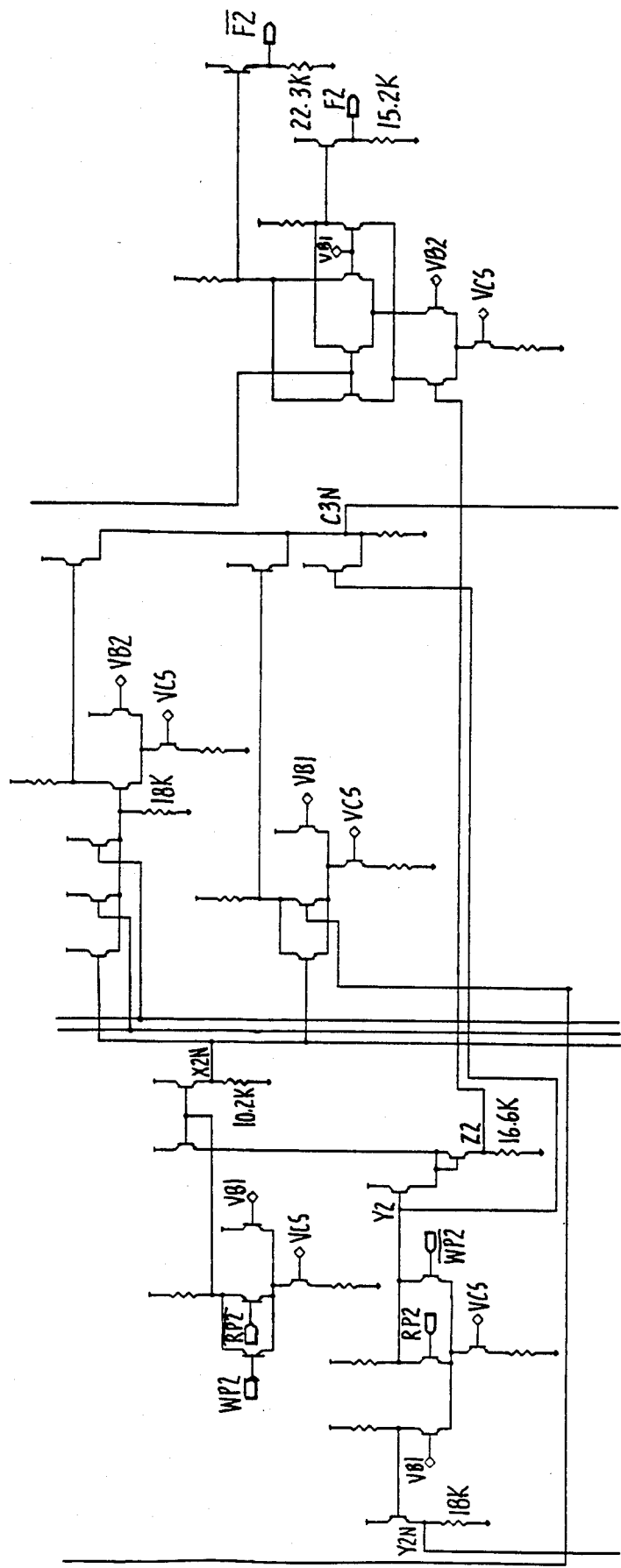
Figure 18C:
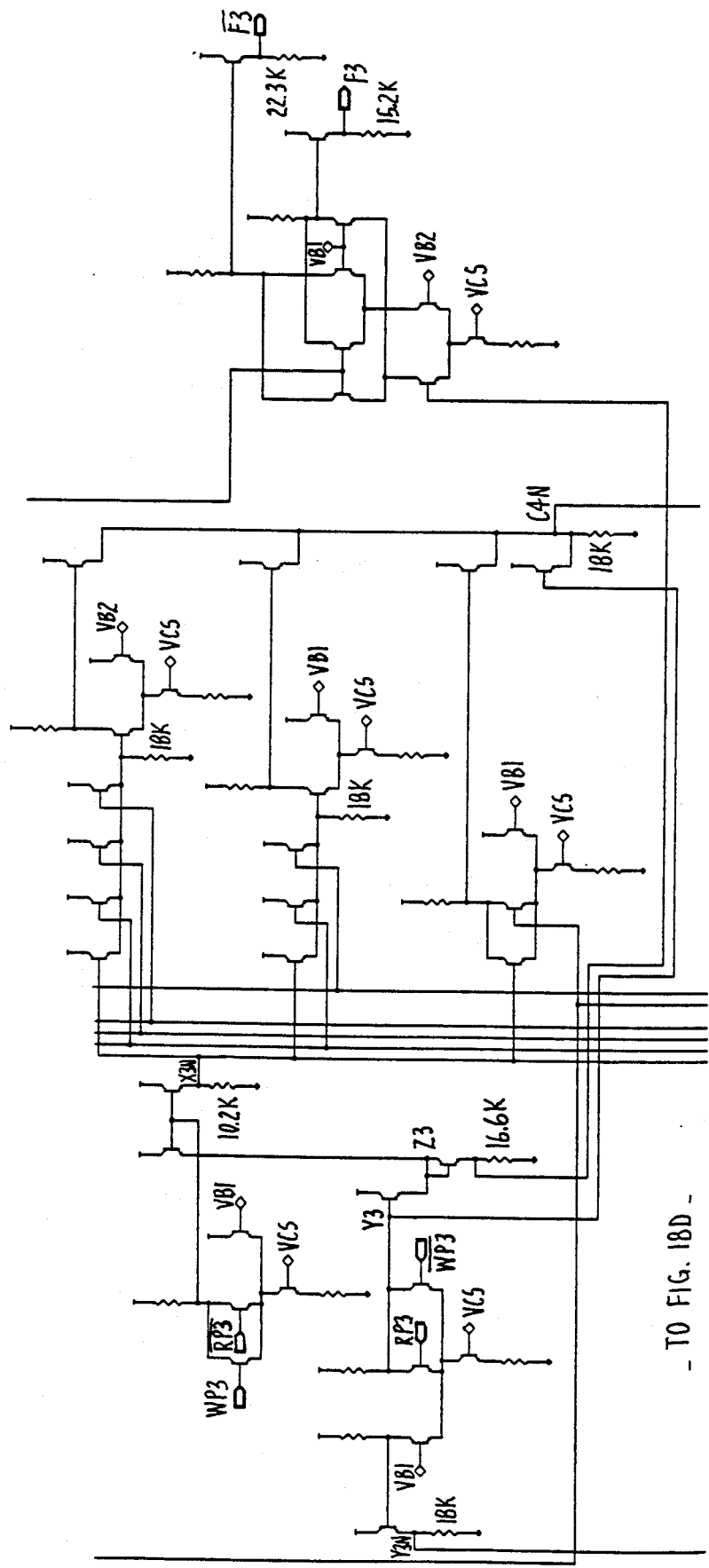
Figure 18E:
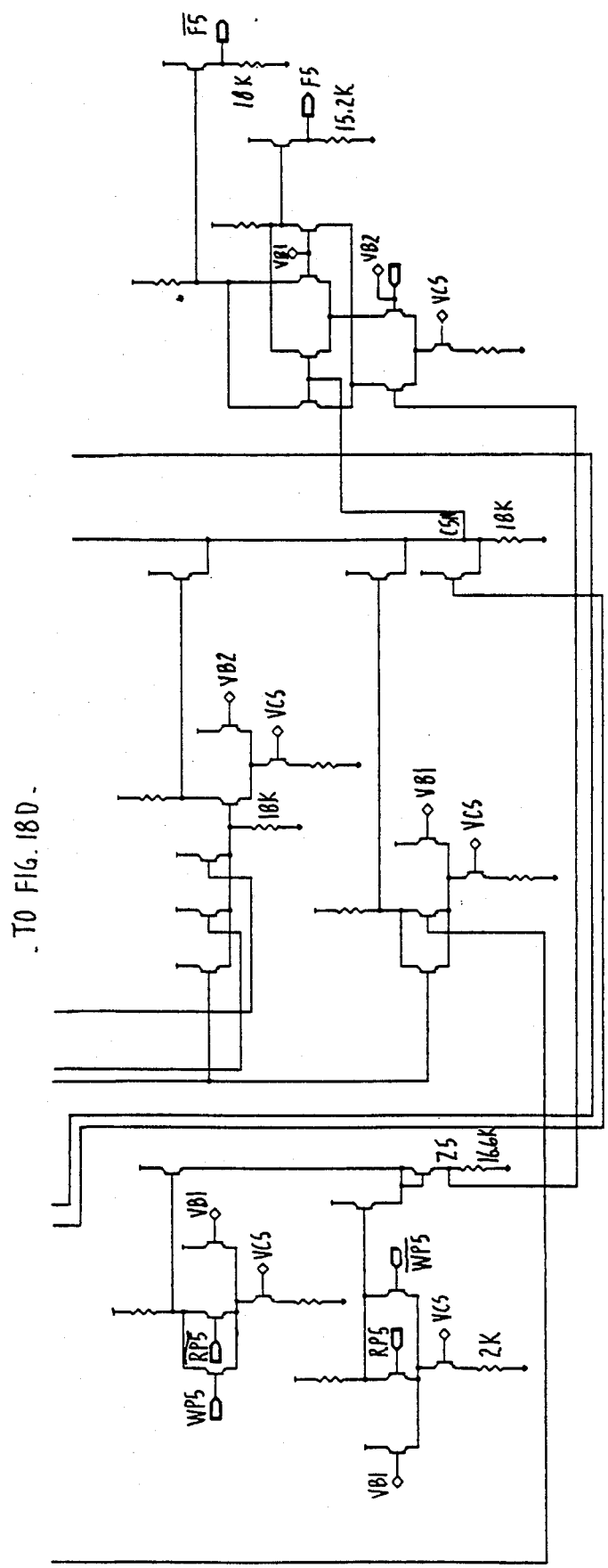
Figure 18F:
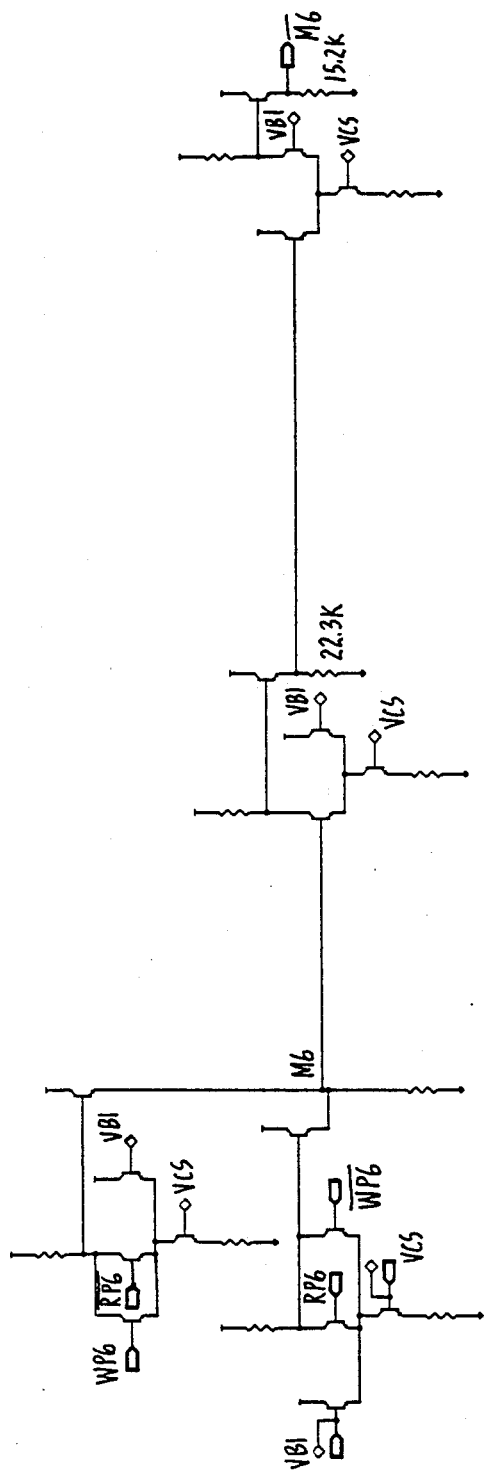

The master reset and intermediate status flag control logic 24 is shown in FIG. 15. Its primary objective is to ensure that all latches and pointers of FIFO 10 become reset to the zero state as a result of the edge transition on the externally-generated, master reset input MR, regardless of their initial state. As described below, to accomplish this, the pointer values WP and RP are first forced to different values, then both to zero until the comparator 18 detects a match.

As shown in FIG. 15, whenever the master reset input MR to the control logic 24 is in the opposite state to that of the output of latch 140, exclusive-OR gate 142 goes high, initiating a reset cycle. At the conclusion of the reset cycle, latch 140 becomes enabled so that it matches the state of the master reset input MR. This causes X-OR gate 142 to go low, which in turn causes latch 140 to become disabldd. A new reset cycle will commence, therefore, whenever the master reset input MR changes state. Thus, the FIFO 10 is reset upon either a low-to-high or high-to-low transition of the master reset input MR.

Figure 10:
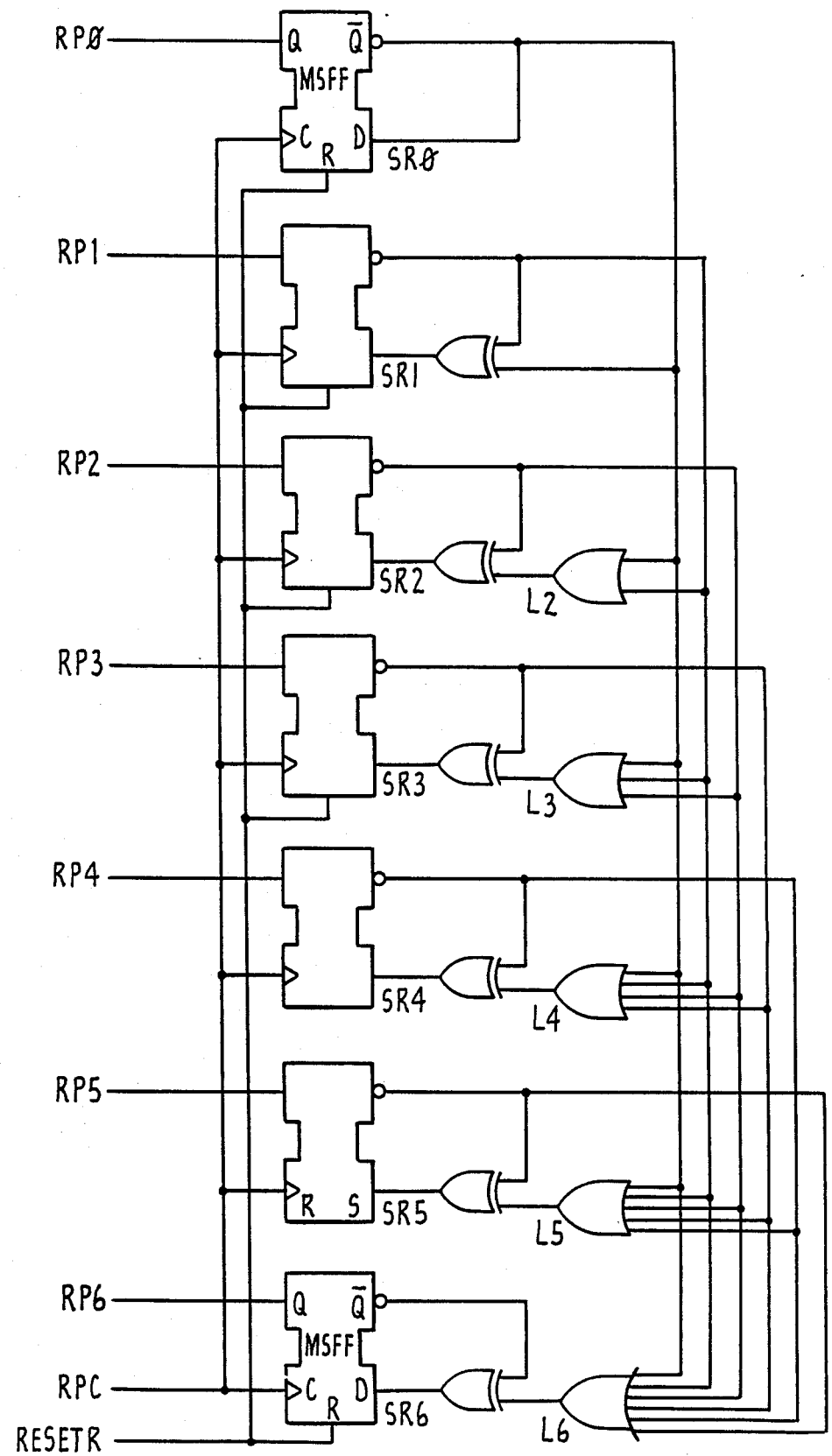
FIG. 10 is a schematic diagram illustrating the read address pointer logic of the FIFO memory shown in FIG. 1.

As shown in FIG. 10, the output "RESETR" of X-OR gate 142 is applied to all latches of the read pointer 16 to reset all output bits RP6-RP0 to zero. As shown in FIG. 9, the signal RESETR is also applied to the latches for the most significant bit WP6 and the low-order bits WP3-WP0 of the write pointer 14. As shown in FIGS. 13 and 14, the signal RESETR is also applied to latch 122, to latch 126 and to NOR gate 128 and NAND gate 132 of the write cycle and read cycle control logic. All latches and pointer bits to which the RESETR signal is applied are asynchronously reset to the zero state.

Returning to FIG. 15, before the beginning of a reset cycle, latch 144 is reset by gate 146. When the reset cycle begins, the RESETR signal goes high, causing AND gate 148 to go high. The PRESETW output of gate 148 is applied to the latches for the WP5 and WP4 bits of the write printer, causing these latches to asynchronously set to the "one" state. This results in a write pointer value WP of "48" being stored in the write pointer 14. When the comparator 18 detects that the write pointer value WP exceeds the read pointer value RP by at least 48, it raises signal C48. Signal C2 is also high since the comparator 18 detects that WP−RP is greater than 2. Signal C48 causes AND gate 150 to set latch 144, causing AND gate 148 to remove the PRESETW signal. The RESETW output of latch 144 is then applied to the latches for the WP5 and WP4 bits, causing them to asynchronously reset, thereby making the WP value "0".

When the comparator 18 detects that the value WP no longer exceeds the value RP by at least 2, it lowers signal C2. An inverted signal C2* is required at the input of gate 152 to signal the end of the reset cycle. As shown in FIG. 14, to eliminate any high-going spikes which may be generated by the comparator 18 due to pointers WP and RP changing value, a small delay is introduced across the inputs of NOR gate 130 of the read cycle control logic. After write pointer value WP has stabilized at zero (i.e., gate 130 delay has expired), signal C2* goes high causing AND gate 152 to go high, enabling latch 140 (FIG. 15). Latch 140 then changes to the new state of the master reset input MR which makes X-OR gate 142 and, thus, the RESETR signal, go low. Finally, AND gate 146 resets latch 144, removing the RESETW signal. AND gate 152 then goes low disabling latch 140, thereby concluding the reset cycle. With latch 140 disabled and containing the current state of master reset input MR, gate 142 is now ready to detect the next transition of input MR to begin a new reset cycle.

As shown in FIG. 13, the input ready status output IR is controlled by an "IR latch" formed by cross-coupled NOR gates 118 and 120. The IR output controls whether write cycles are allowed or inhibited via latch 122 and AND gate 124. The remaining logic shown in FIG. 13 is responsibleoonly for controlling the IR latch.

Following a reset cycle a described above, signal C63 is low and remains low until the FIFO 10 is almost full. This presents a continuous "set" input to the IR latch via gate 109, i.e., NOR gate 118 is held low. This allows the IR output to go high whenever gate 120 is not forced low by either gates 110 or 112. Flip-flop 102 is responsible for setting the IR latch as soon as a word is read out of the FIFO 10 when it is full. The state of flip-flop 102, however, does not matter during the time that C63 is low. AND gate 104 also remains low and latch 106 remains reset. As long as signal C63 is low, gate 120 and the IR output will be forced low via gate 110 whenever the write clock input WC is high and will return high whenever input WC returns to low.

Still referring to FIG. 13, latch 106 is responsible for extending the time the IR output is allowed to remain high during the write clock cycle in which WP is to be incremented to exceed RP. Latch 108 and gate 112 are responsible for resetting the IR latch at the end of the extended 64th write cycle WC.

The write inhibit latch 122 is reset during the FIFO's reset cycle, forcing AND gate 124 and the memory write enable control line MWE low. The write pointer clock WPC is held high (a low-to-high transition increments the write pointer value WP). The write clock input WC must be brought low to set latch 122 before the first write cycle can begin. When input WC goes high, gate 124 and, thus, the MWE output, go high to allow a data word to be written into the RAM 12 at the location addressed by the write pointer 14. Latch 122 is disabled to maintain a high input on gate 124, and the WPC output is brought low. At the falling edge of the WC input, signal MWE ends and signal WPC returns high to increment the write pointer 14. Writing continues in this manner until, after the falling edge of the write clock signal WC, write pointer value WP has advanced to the 63rd location past the read pointer value RP, causing, signal C63 to go low. By this time the IR latch has already been set. The high IR output signal maintains a reset on flip-flop 102. Both "set" inputs to NOR gate 118 are now low. The small delay across OR gate 100 suppresses any high-going spikes on gate 109 generated by hhe comparator 18 due to write or read pointers 14, 16 changing value.

While the write clock input signal WC is low, the state of latch 106 follows the read clock input RC via AND gates 104 and 116. Both outputs of latch 106, however, remain blocked by AND gates 110 and 114 as long as the write clock input signal WC is low. If the read clock input RC were low at the time the WC input goes high, while WP exceeds RP by 63, latch 106 would remain reset and gate 110 would reset the IR output as usual. However, the IR output would not return high at the end of the cycle when input WC return low, thus indicating a full condition. Otherwise, if input RC were high when the write cycle begins which fills the FIFO 10, latch 106 would be set and gate 110 would be held low allowing the IR output to remain high. Input WC going high while latch 106 is set causes gate 114 to set latch 108. When input WC returns low at the end of the cycle, AND gate 112 resets the IR latch, forcing the IR output low to indicate the full condition. The resulting low state of output IR resets latch 108, disabling gate 112 to allow the IR output to become set by the next read cycle.

If latch 108 were to "wake-up" in the high state, it would automatically reset, that is, if the write clock signal WC were high, AND gate 110 would force NOR gate 120 and the IR output signal low to reset latch 108. Otherwise, if write clock signal WC were low, AND gate 112 would force the IR output low to reset latch 108. Since AND gate 114 is held low by latch 106, latch 108 will not become set and AND gate 112 will remain low.

If, while input WC is high, input RC were to go low, latch 106 would be reset via gate 104 and output IR would be reset via gate 110. Latch 108 would also be reset by output IR going low. While output IR is low, the inhibit latch 122 remains reset preventing any further write cycles.

Any time after the final falling edge of output IR, the next rising edge of input RC (i.e., the end of a read cycle) sets flip-flop 102 which, in turn, applies a set input to the IR latch. Output IR goes high if input WC is low, or as soon as it returns low, indicating that a location has been vacated and that the FIFO 10 is no longer full. Output IR going high resets flip-flop 102.

As shown in FIG. 14, the output ready status output OR is controlled by an "OR latch" formed by cross-coupled NOR gates 134 and 128. The OR output signal determines whether read cycles are allowed or inhibited via latch 126 and OR gate 127.

The RESETR signal, which is generated as described above, resets the OR latch during a reset cycle. Flip-flop 136 is also reset via OR gate 132 so that it does not set the OR latch after removing the RESETR signal. Since signal C2 is low at the end of a reset cycle, AND gate 138 also does not set the OR latch. A low OR output indicates that the FIFO 10 is empty. The "read inhibit" latch 126 is also reset. As long as latch 126 is low, OR gate 127 holds the read pointer clock RPC high so that read cycles are inhibited. The read pointer value RP is incremented on the rising edge of output RPC.

When the first word is written into the empty FIFO 10, the falling edge of the WC input causes flip-flop 136 to be set. This, in turn, presents a set input to the OR latch, and will raise tee OR output if the read clock input RC is high or as soon as it returns high. The resulting high state of the OR output resets flip-flop 136. Latch 126 now becomes set. When input RC goes low to begin a read cycle, gate 127 brings read point clock RPC low. The next rising edge of input RC raises the RPC output and increments the read pointer value RP. The Q outputs of the read port 22 then change to present the contents of the next RA location.

As long as there are at least 2 words stored in the FIFO 10, signal C2 remains high, AND gate 138 continuously presents a "set" input to gate 134 of the OR latch. This allows the OR output to go high whenever gate 128 is not forced low by the RC input. When the rising edge of the RC input advances the read pointer value RP to the location just before the write pointer value WP, signal C2 goes low. By that time, the OR output latch is already set. The high OR output holds a reset on flip-flop 136 via OR gate 132. Both "set" inputs to NOR gate 134 are now low. The small delay across AND gate 138 suppresses any high-going spikes generated by the comparator 18 due to pointers 14, 16 changing value.

When input RC goes low to begin the read cycle in which RP is to be incremented to the same value as WP the OR latch is reset. When the RC input returns high, the OR output remains low, indicating the FIFO 10 is empty. Any time after the final falling edge of the OR output, a falling edge on input WC (i.e., the conclusion of a write cycle) sets flip-flop 136 which applies a "set" input to the OR latch. The OR output goes high if input RC is high, or as soon as input RC returns high, indicating that the FIFO 10 is no longer empty. The high state of the OR output resets flip-flop 136.

Figure 23:
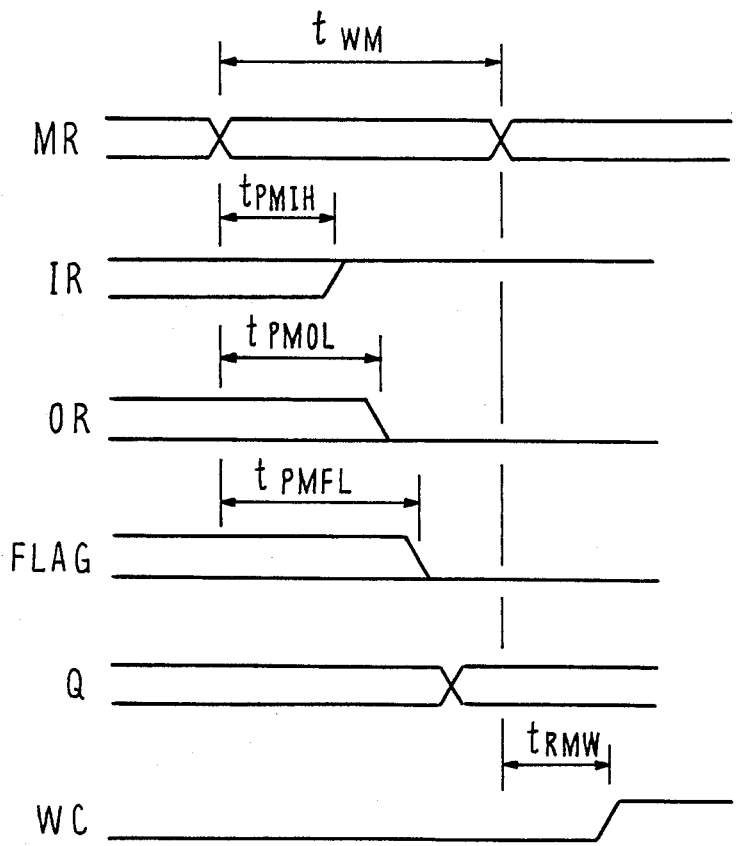
FIG. 23 is a timing diagram illustrating the master reset timingwwaveform.
Figure 24:
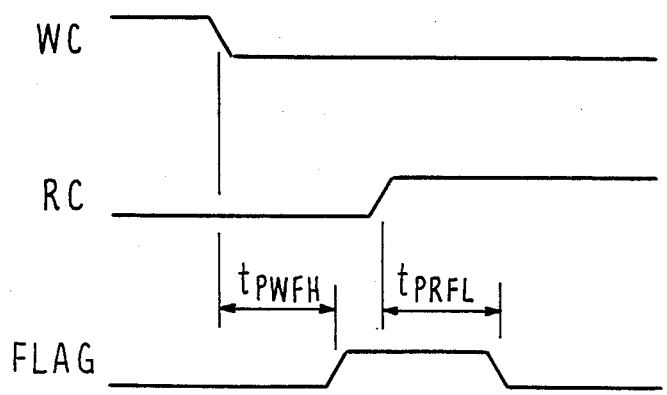
FIG. 24 is a timing diagram illustrating the FLAG output timing waveform.

Referring again to FIG. 15, the master reset input MR serves two functions. In addition to resetting appropriate counters and latches to the zero state (i.e., the FIFO 10 is empty) on either a low-to-high or a high-to-low transition, as shown in FIGS. 23 and 24, the DC logic level on the MR input during operation of the FIFO 10 selects one of two waveforms to appear on the FLAG intermediate status output, i.e., the intermediate threshold value. Therefore, input MR could be connected to either a normally low or normally high system reset signal in order to select the desired FLAG waveform during operation.

The MR input, which, as shown in FIG. 15, is taken from the output of gate 154, selects between signal C16 via AND gate 156 when input MR is low, and signal C48 via AND gate 158 when input MR is high. If the FIFO 10 is operated while input MR is low, the FLAG output would be high whenever the FIFO is at least one quarter filled, i.e., when the write pointer value WP exceeds the read pointer value RP by 16 or more; otherwise the FLAG output is low. If input MR is high during FIFO operation, then the FLAG output would be high whenever the FIFO 10 is at least three quarters filled, i.e, when the write pointer value WP exceeds the read pointer value RP by 48 or more; otherwise the FLAG output is low.

The C16 and C48 signals may experience a brief spike, either high-going from the low state or low-going from the high state, when either pointer value WP or RP changes value due to timing skews between parallel paths through the comparator 18 circuit. These spikes may occur at pointer transitions which would not normally change the intended state of signal C16 or C48. Since pointer values WP and RP may change at any time with respect to each other (asynchronously), then the worst-case noise situation experienced by signals C16 or C48 would be two brief spikes separated by an arbitrary time delay. As shown in FIG. 15, to prevent these spikes from appearing on the FLAG output, AND gate 160 samples the output of OR gate 162 after two different time delays. The delays are separated from the original signal and from each other by at least the pulse width of the longest single spike (maximum skew between comparator paths). If OR gate 162 were initially low, then AND gate 160 would only go high after OR gate 162 goes high and remains stable throughout both delays. Therefore, any combination of two high-going spikes on gate 162 cannot produce a high-going spike on the output of gate 160 as long as each spike is no wider than each delay time.

AND gate 164 suppresses low-going double spikes from the complement of gate 162 using the same technique. Gate 164 only goes high after gate 162 goes low and remains stable throughout both of its time delays. The stabilized outputs of gates 160 and 164 are used to set and reset the cross-couple latch consisting of NOR gates 166 and 168. The output of gate 168, therefore, presents a clean, spike-free rendition of either signal C16 or C48, as selected by the MR input.

FIG. 16A–16D combine to show a detailed circuit embodiment of the write address pointer 14.

FIGS. 17A–17D combine to provide a detailed circuit embodiment of the read address pointer 16.

FIGS. 18A–18F combine to provide a detailed circuit embodiment of the subtrcctor portion of the comparator 18.

Figure 19A:
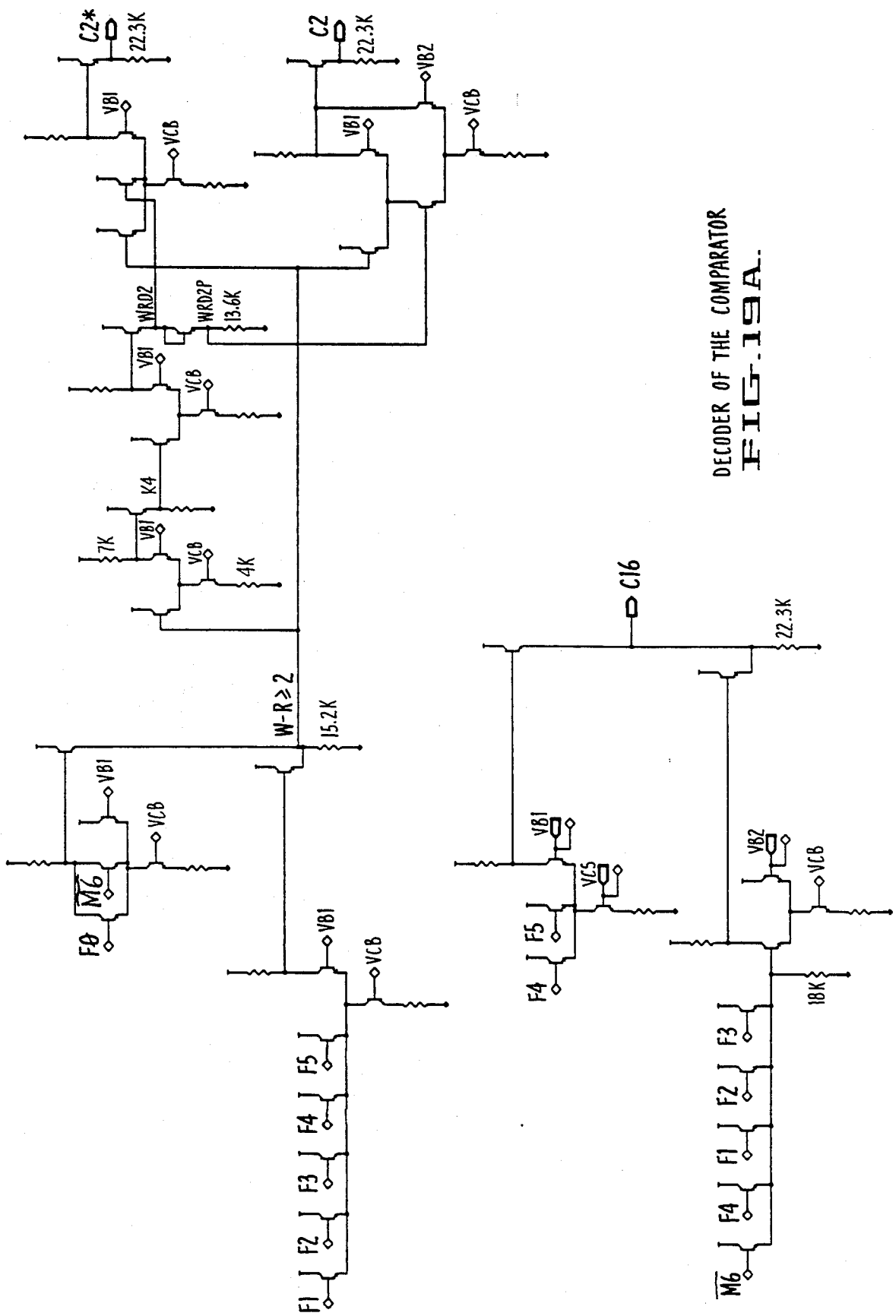
FIGS. 19A and 19B combine to provide a schematic diagram illustrating the circuit detail of the decoder section of the comparator logic shown in FIG. 12.
Figure 19B:
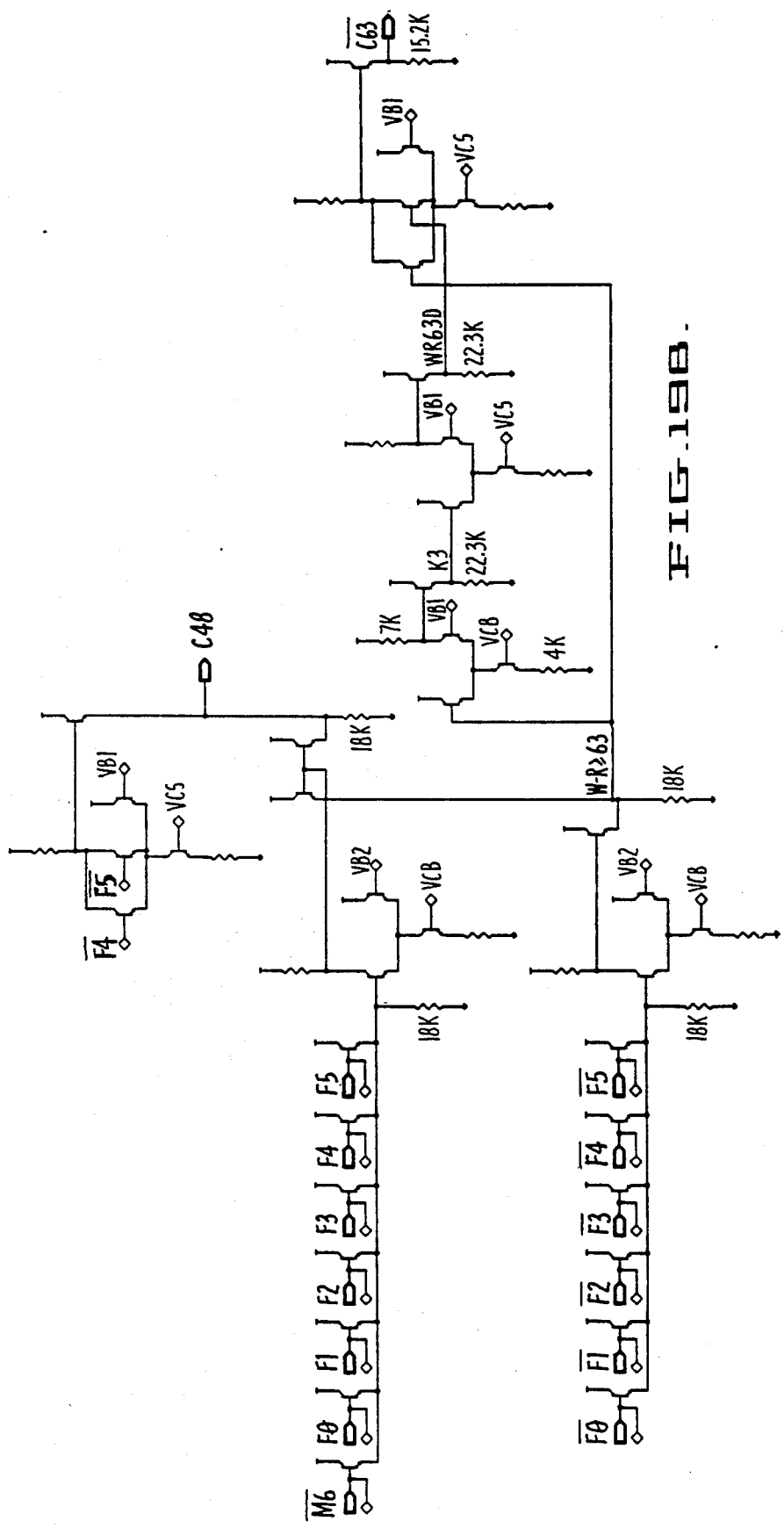
Figure 20B:
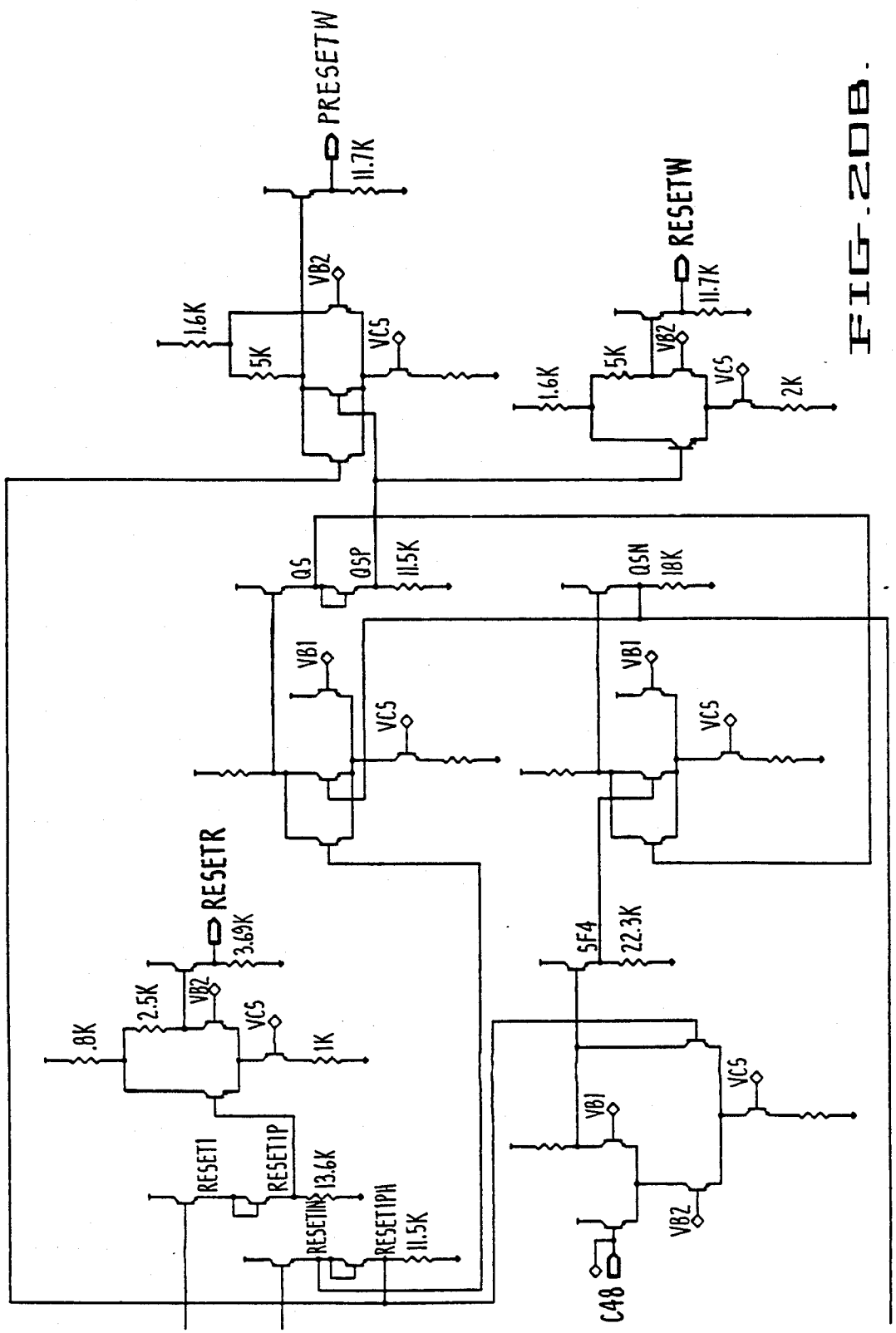
Figure 200:
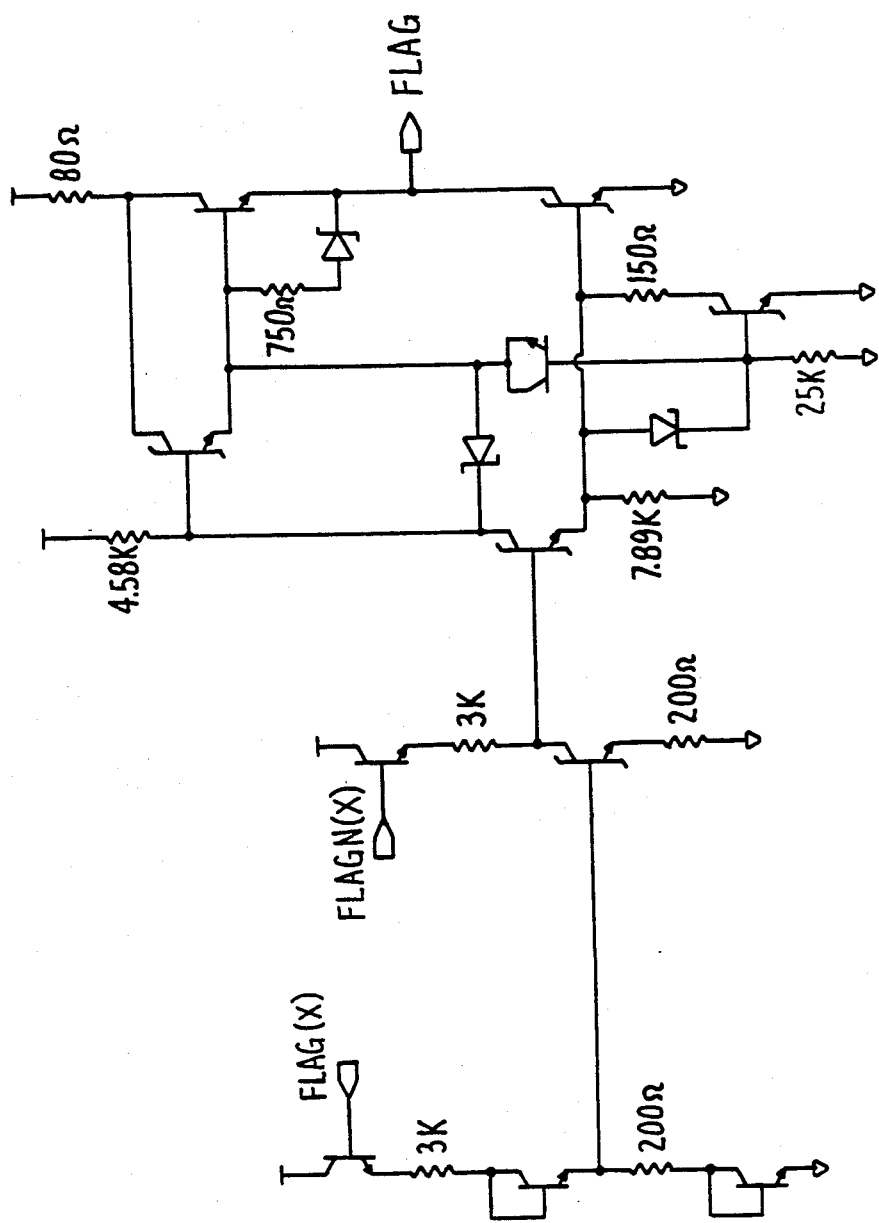
Figure 21A:
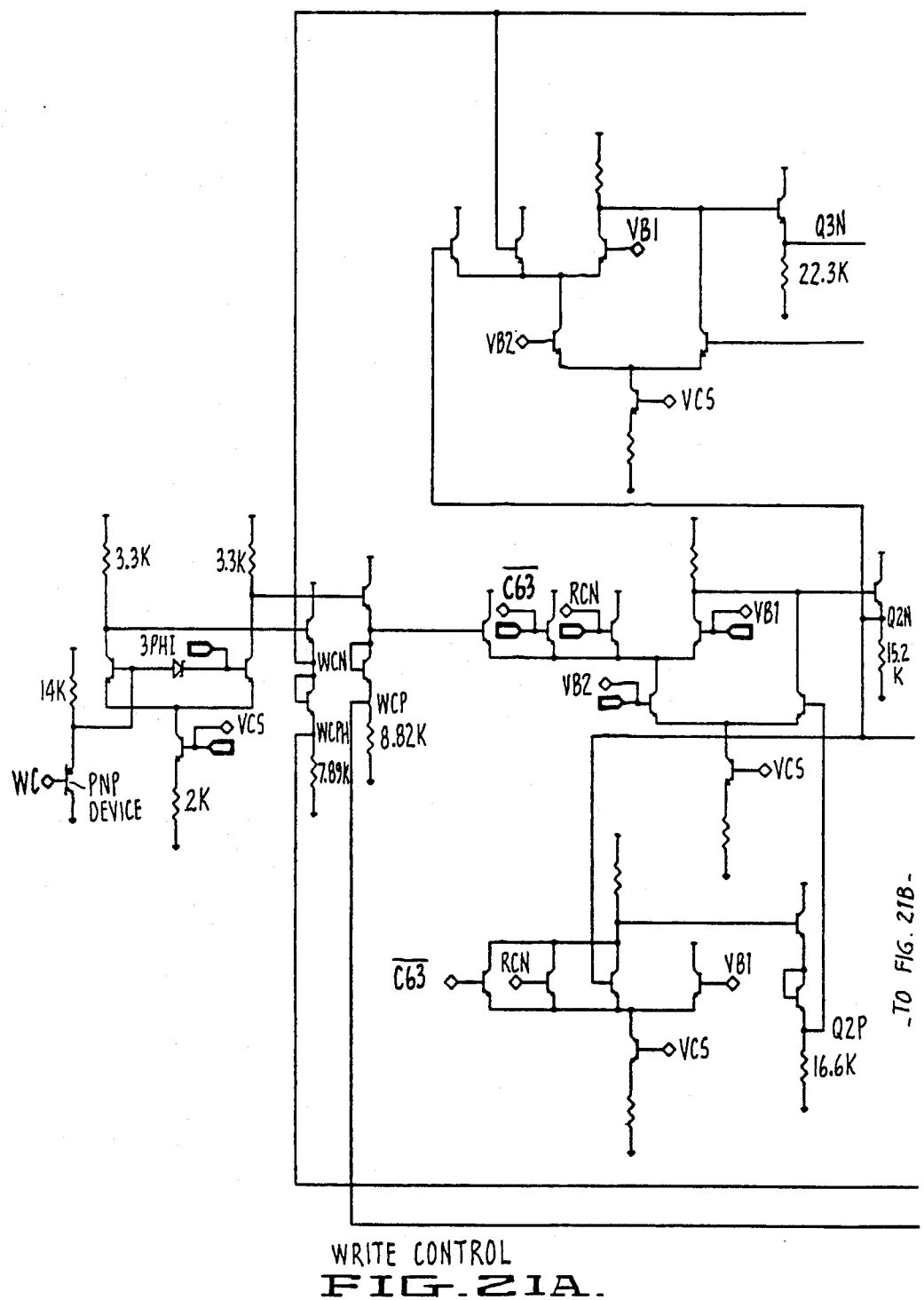
Figure 21B:
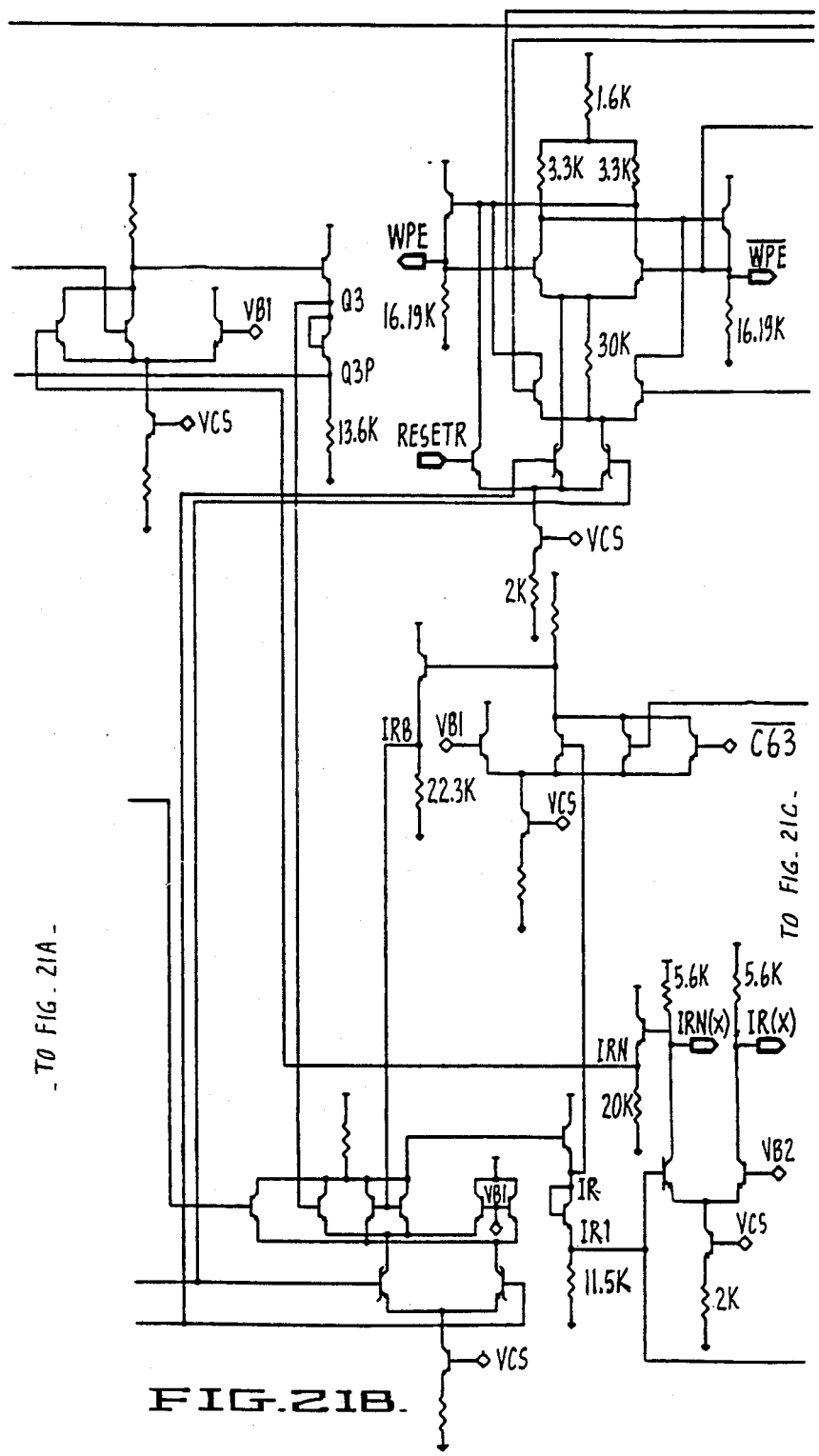
Figure 21C:
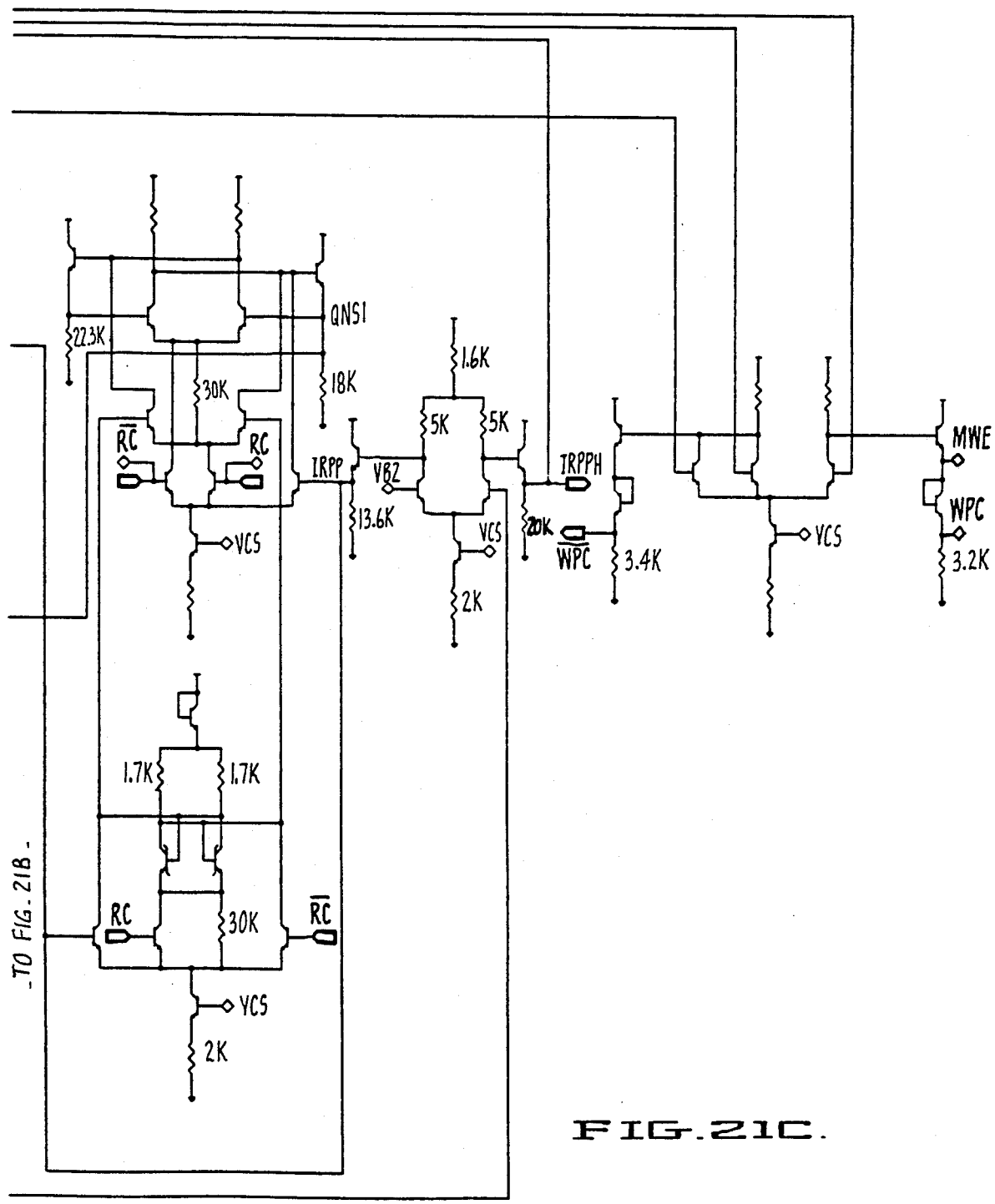
Figure 210:
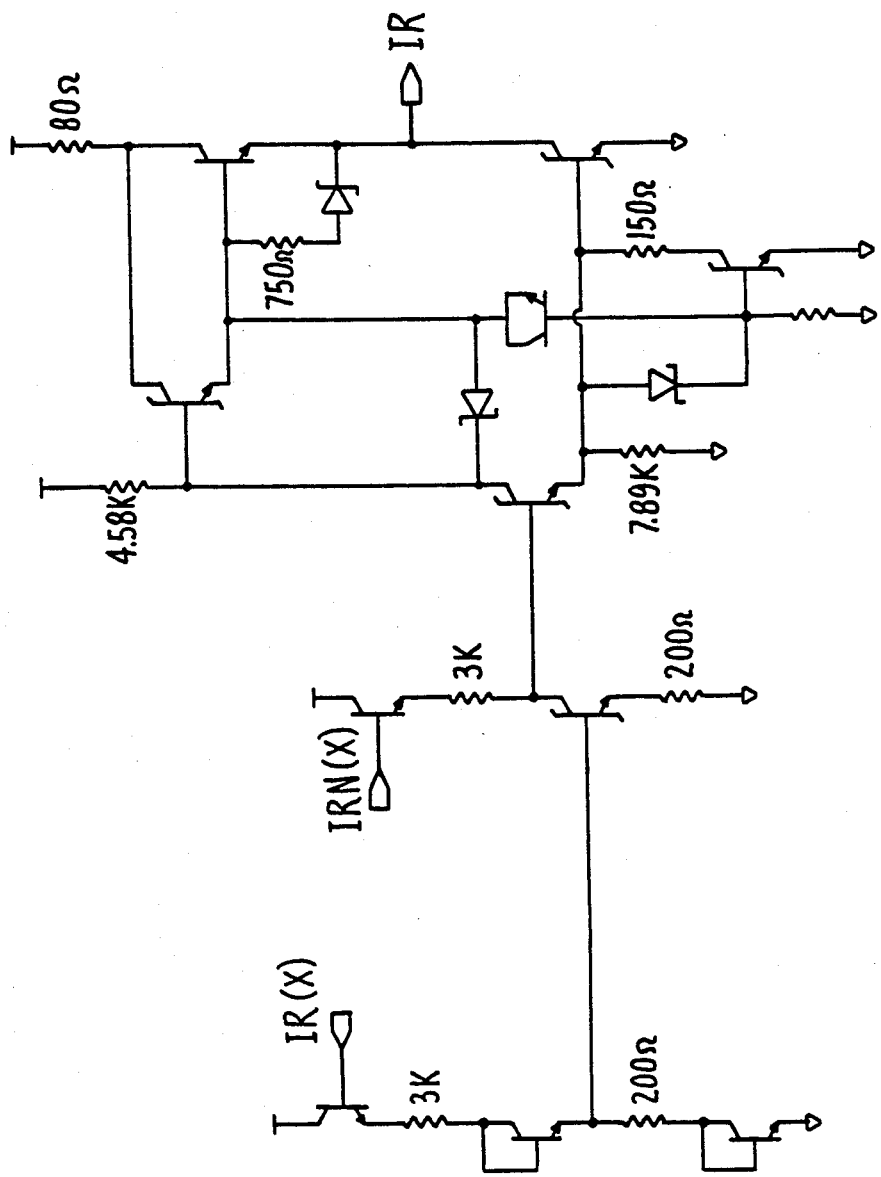

FIGS. 19A and 19B combine to provide a detailed circuit embodiment of the decoder portion of the comparator 18.

FIGS. 20A–20D combine to provide a detailed circuit embodiment of the master reset and flag control logic section 24.

FIGS. 21A–21D combine to provide a detailed circuit embodiment of the write cycle control logic shown in FIG. 13.

Figure 22A:
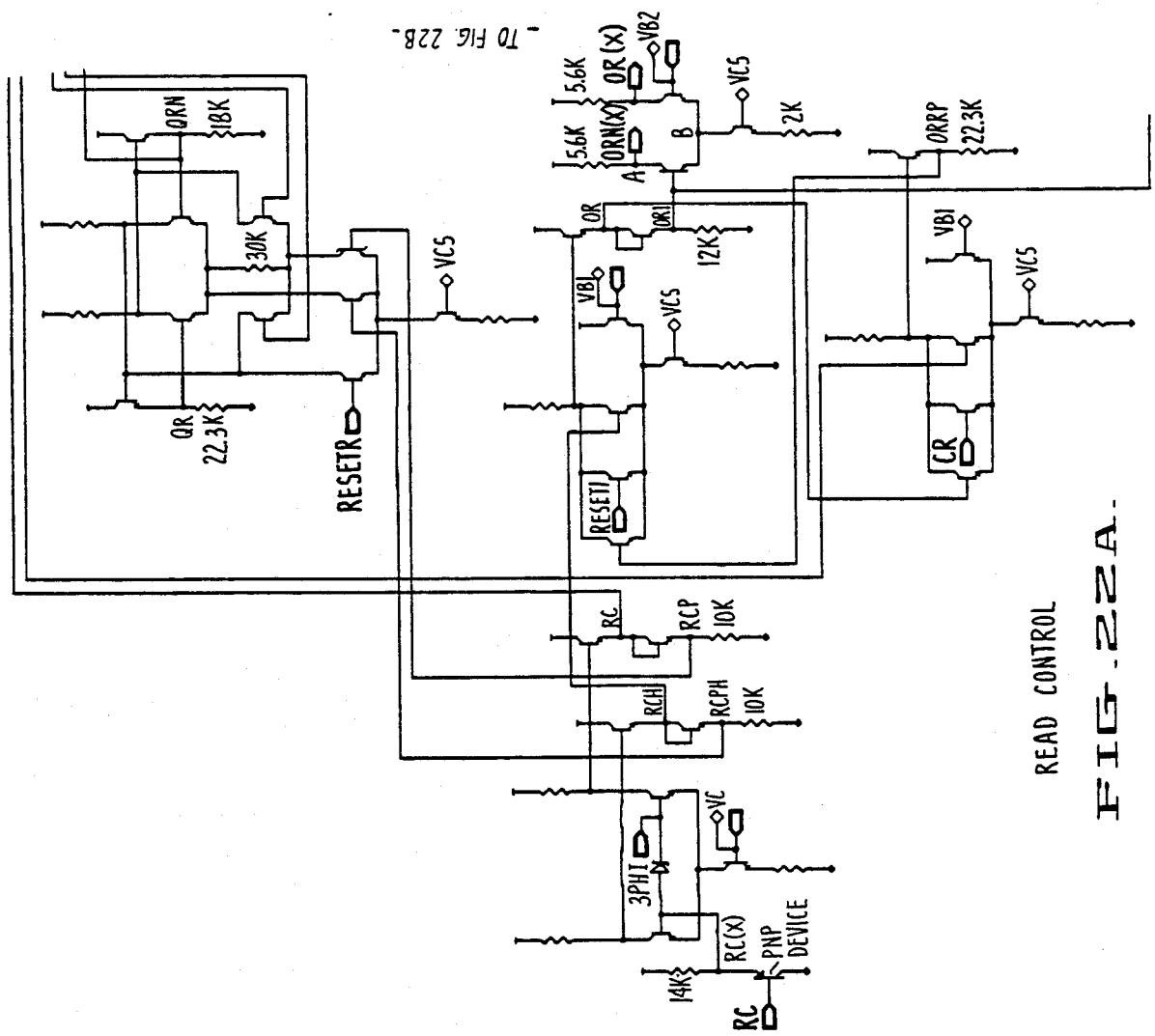
Figure 22B:
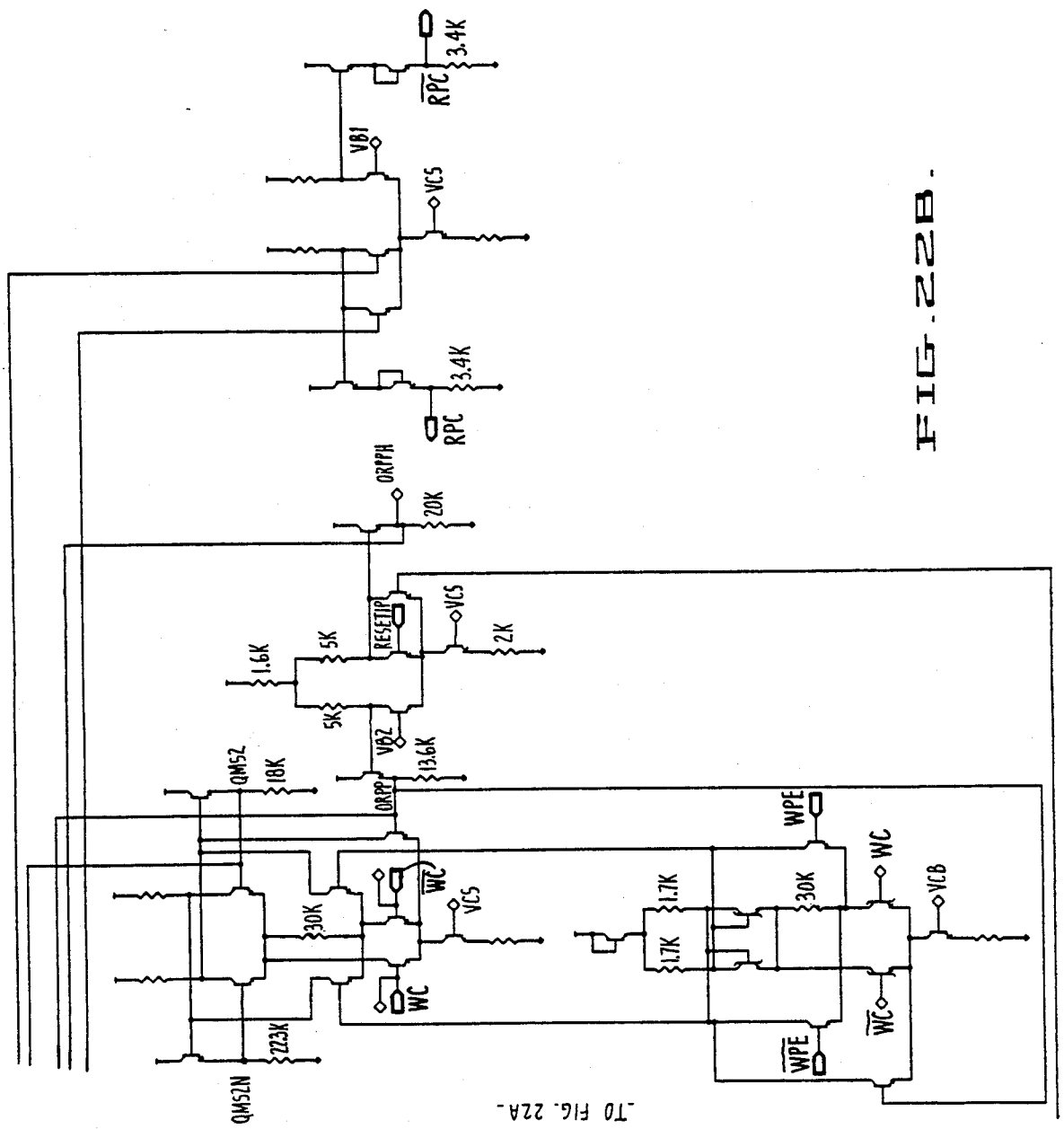

FIGS. 22A–22C combine to provide a detailed circuit embodiment of the read cycle control logic shown in FIG. 14.

FIFO memory systems wider than 8 bits can be implemented by connecting n multiple FIFOs 10, of the type described above, in parallel. For 64×8 n configurations, the IR, OR and FLAG output status information can be taken from any one of the parallel-connected FIFOs, since there is no fall-through delay which might otherwise cause output skew between devices.

Figure 27:
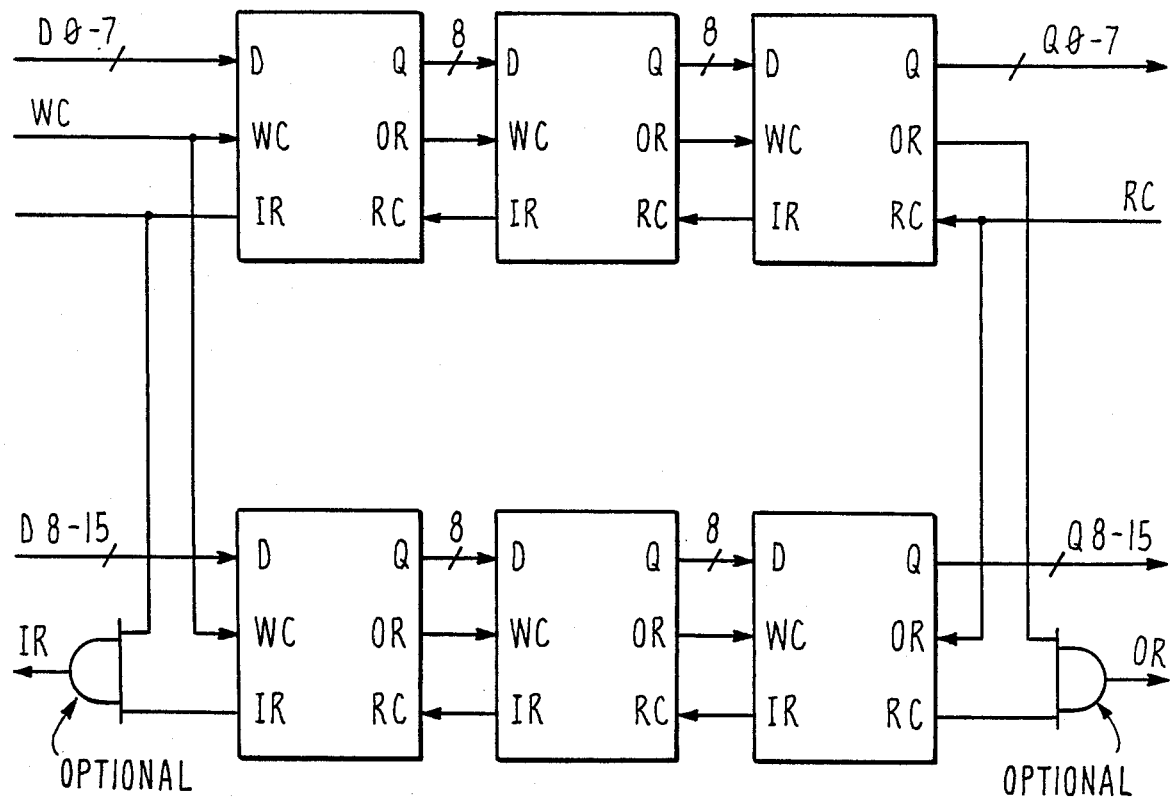
FIG. 27 is a schematic block diagram illustrating a number of FIFO memories of the type shown in FIG. 1 arranged in cascaded configuration.

As shown in FIG. 27, FIFO memory systems deeper than 64 words can also be implemented by connecting m multiple FIFOs 10, of the type described above, in series. To do this, the Q, OR and RC lines of one FIFO 10 are coneected to the D, WC and IR lines, respectively, of the next FIFO 10 in the series. When the first word is written into the first FIFO 10, the resulting rising edge of its OR output initiates a write cycle into the second FIFO 10, which in turn produces a read cycle from the first FIFO 10.

Figure 28:
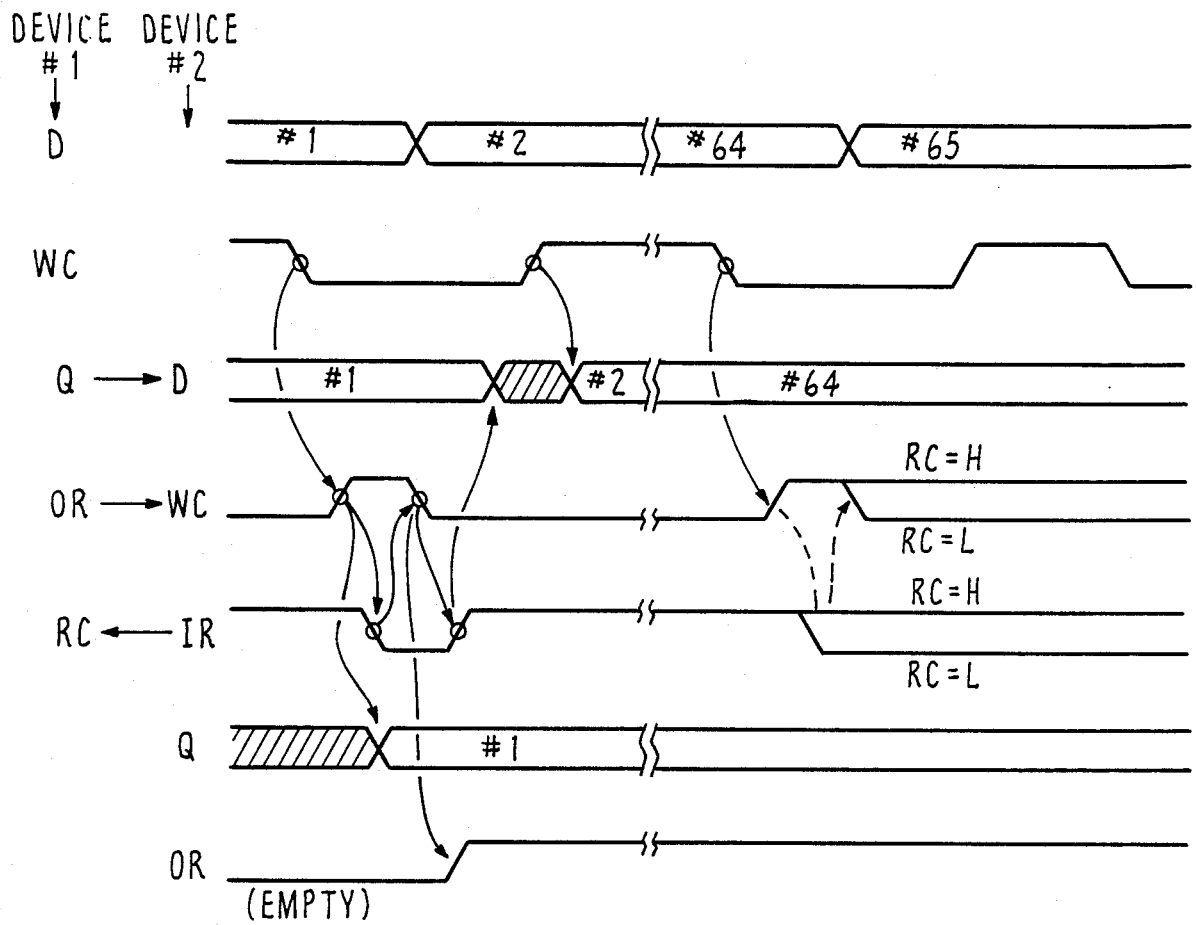
FIG. 28 is a timing diagram illustrating a write cycle waveform for two FIFO memories of the type shown in FIG. 1 cascaded serially.
Figure 29:
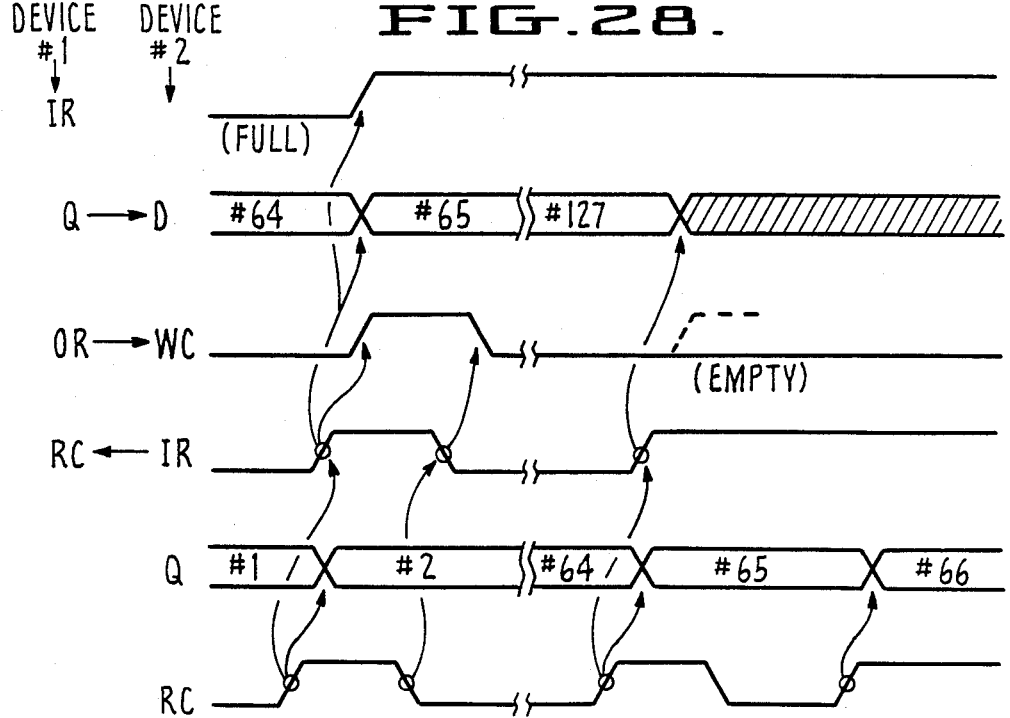
FIG. 29 is a timing diagram illustrating a read cycle waveform for two FIFO memories of the type shown in FIG. 1 cascaded serially.

As shown in FIGS. 28 and 29, the handshaking signals passed over the OR/WC and RC/IR connections between each adjacent pair of FIFOs cause the data word to be passed from one FIFO 10 to the next until it settles onto the output of the last FIFO 10 in the series.

FIG. 28 shows two FIFOs 10 cascaded serially. Utilizing the FIG. 28 configuration as nn example, when writing data into a serially-cascaded system when the first device is empty, the sequence of control signal transitions is as follows: the OR output of the first ddevice raises the WC input of the subsequent device; this in turn results in the IR output of the second device lowering the RC input of the first device; when the RC input of the first device goes low, the OR output of the first device lowers hhe WC input of the second device; this results in the IR output of the second device raising the RC input of the first device.

It is safe for the above-described sequence to proceed automatically (i.e., self-timed) based on each device's internal propagation delays because the input data being latched by the falling edge of the WC input to the second device begins to propagate directly through the first device before this sequence is initiated. That is, it must be ensured that hhe subsequent device in the series receives the data before the falling edge of WC.

As shown in FIG. 29, however, when reading data out of a serially cascaded system which is full, a completely self-timed sequence of aandshakes, such as described above, would not be acceptable because the data output from the first device would not be presented to the second device early enough to ensure successful writing of the data.

Therefore, a unique waveform is implemented whereby the IR output of the second device raises the RC input of the first device which, in turn, causes the OR output of the first device to raise the WC input of the second device. However, due to the special control circuitry in the write cycle control section, the rising edge of the WC input in the second device does no result in a high-to-low transition on its IR output. Only after the falling edge of the RC input to the second device does its IR output bring low the RC input of the first device. This allows sufficient time for the new data output from the first device to stabilize on the data inputs of the second device before the OR output of the first device brings low the WC input of the second device.

As the cascaded assemblage of FIFOs fills, each individual FIFO 10, beginning with the last, becomes full. An assemblage of m cascaded FIFOs 10 connected in series can store a maximum of 63m+1 words. This is because the last word written into each full FIFO 10, except the first in the series, remains on the outputs of the previous FIFO 10. Each time a word is read from the last FIFO 10 in the series, one word is transferred down from each of the previous FIFOs, or until an empty FIFO is encountered.

Since the control signals and data are passed from FIFO to FIFO in a cascaded series, some fall-through delay is introduced betweentthe input of the first FIFO and the output of the last FIFO. The delay increases with the number of FIFOs 10 cascaded serially.

As stated above, FIFOs can be cascaded both serially and in parallel to produce deeper and wider memory systems, as shown in FIG. 27. However, due to the resulting device-level fall-through delays, it may be necessary to AND-gate the IR uutputs of the first level of devices as well as the OR outputs of the final level.

Table 1 below provides a key between the symbols utilized in the timing diagrams shown in FIGS. 23–26 and the corresponding parameter.

TABLE 1

| Symbol | Parameter |
| --- | --- |
| $t_{WWH}$ | WC Pulse Width High |
| $t_{WWL}$ | WC Pulse Width Low |
| $t_{SDW}$ | Input Data Setup |
| $t_{HDW}$ | Input Data Setup |
| $t_{WRH}$ | RC Pulse Width High |
| $t_{WRL}$ | RC Pulse Width Low |
| $t_{WM}$ | Master Reset Pulse Width |
| $t_{RMW}$ | Reset Recovery Time |
| $t_{PRQ}$ | RC to Data Output |
| $t_{PWOH}$ | WC to OR High |
| $t_{PWIH}$ | WC Falling to IR High |
| $t_{PWHIL}$ | WC Rising to IR Low |
| $t_{PWLIL}$ | WC Falling to IR Low |
| $t_{PRIH}$ | RC to IR High |
| $t_{PROH}$ | RC to OR High |
| $t_{PROL}$ | RC to OR Low |
| $t_{PRIL}$ | RC Rising to IR Low |
| $t_{PWFH}$ | WC to FLAG High |
| $t_{PRFL}$ | RC to FLAG Low |
| $t_{PDQ}$ | Transparent D to Q |
| $t_{PWQ}$ | WC Rising to Q |
| $t_{PMIH}$ | MR to IR High |
| $t_{PMOL}$ | MR to OR Low |
| $t_{PMFL}$ | MR to FLAG Low |

It should be understood that various alternatives to the embodiment of the invention described herein may be employed in practicing the present invention. It is intended that the following claims define the invention, and that the structure and methods within the scope of these claims and their equivalents be covered thereby.

What is claimed is:

1. A no-fall-through, first-in-first-out (FIFO) memory device wherein data words written into the memory device from an input bus during write clock cycles are read from an output bus during read clock cycles in the same order as previously written, the no-fall-through FIFO memory device comprising:
   (a) a storage section that includes a plurality of storage locations for storing data words written into the storage section during corresponding write cycles;
   (b) a write pointer connected to the storage section for maintaining a write pointer value indicative of the number of data words that have been written into the storage section;
   (c) a read pointer connectedtto the storage section for maintaining a read pointer value indicative of the number of data words that have been read from the storage section;
   (d) a comparator for comparing the write pointer value and the read pointer value and for generating a comparator output signal representative of the difference between the write pointer value and the read pointer value; and
   (e) means for making a data word written into the storage section during a corresponding write cycle when the comparator output signal indicttes that the write pointer value equals the read pointer value available to be read from the storage section before the end of the corresponding write cycle.

2. A no-fall-through, first-in-first-out (FIFO) memory device comprising:
   (a) a storage section that includes a plurality of storage locations for storing data words, a write port which receives data words from an external source and writes the data words into the storage section during a corresponding write cycle in response to an externally-supplied write signal, and a read port which reads data words from the storage section, in the same sequence as previously written, in response to an externally-supplied read signal and delivers the read data words to an external destination;
   (b) a write pointer connected to the write port for maintaining a write pointer value indicative of the number of data words that have been written into the storage section;
   (c) a read pointer connected to the read port for maintaining a read pointer value indicative of the number of data words that have been read from the storage section;
   (d) a comparator that receives the write pointer value and the read pointer value and generates a comparator output signal which is representative of the difference between the write pointer value and the read pointer value; and
   (e) means for making a data word written into the storage section during a corresponding write cycle when the comparator output signal indicates that the write pointer value equals the read pointer value available to be read from the storage section before the end of the corresponding write cycle.

3. A no-fall-through, first-in-first-out (FIFO) memory device comprising:
   (a) a storage section that includes a plurality of storage locations for storing data words, a write port that receives data words from an external source and writes the data words into the storage section during a corresponding write cycle in response to an externally-supplied read signal and delivers the read data words to an external destination;
   (b) a write pointer connected to the write port for maintaining a write pointer value indicative of the number of data words that have been written into the storage section;
   (c) a read pointer connected to the read port for maintaining a read pointer value indicative of the number of data words that have been read from the storage section;
   (d) a comparator that receives that write pointer value and the read pointer value and generates a comparator output signal representative of the difference between the write pointer value and the read pointer value; and
   (e) control means, connected to receive the comparator output signal and external signals as inputs, for generating status output signals, the control means including means for predictigg transitions in the status output signals.

4. A no-fall-through FIFO memory device as in claim 3 wherein the external signals include clock signals, the memory device further including maans for propagating the status output signals directly from the clock signals.

5. A no-fall-through FIFO memory device as in claim 3 and further including means for interlocking the external signals and the status output signals such that the memory device is connectable to a second memory device of the type recited in claim 3 above in a cascaded configuration.

6. A no-fall-through FIFO memory device as in claim 3 wherein the control means includes means for protecting against erroneous logic states.

7. A no-fall-through FIFO memory device as in claim 3 wherein the control means includes means for protecting against corruption of data.

8. A no-fall-through FIFO memory device as in claim 3 wherein the control section includes means for removing spikes on the status output signals.

9. A no-fall-through FIFO memory device as in claim 8 wherein the means forrremoving spikes includes means for removing combinations of single or double spikes on the status output signals in either a high or low direction.

10. A no-fall-through FIFO memory device as in claim 3, wherein the external signals include a multi-purpose signal, the memory device further comprising means responsive to the multi-purpose signal for generating a change in the state of the memory device in response to a transition of the multi-purpose signal.

11. A no-fall-through FIFO memory device as in claim 10 wherein the change of state is the initialization of the memory device.

12. A no-fall-through FIFO memory device as in claim 10 wherein the external signals include a multi-purpose signal, the memory device further comprising means responsive to the multi-purpose signal for selecting from among alternate functions to be executed by the memory device based upon the logic level of the multi-purpose signal.

13. A no-fall-through FIFO memory device as in claim 11 wherein the alternate functions include selection of a threshold value for determining the waveform of the status output signal.

* * * * *

UNITED STATES PATENT AND TRADEMARK OFFICE
CERTIFICATE OF CORRECTION

PATENT NO. : 4,833,651

DATED : May 23, 1989

INVENTOR(S) : Jeffrey H. Seltzer and Hassan M. Hanjani

It is certified that error appears in the above - identified patent and that said Letters Patent is hereby corrected as shown below:

In Column 13, Line 18, "connectedtto" should be
--connected to--.

In Column 14, Line 3, after the word "supplied" should read
--write signal, and a read port that reads data words from the storage section, in the same sequence as previously written, in response to an externally-supplied--.

In Column 14, Line 21, "predictigg" should be
--predicting--.

In Column 14, Line 25, "maans" should be
--means--.

In Column 14, Line 44, "forrremoving" should be
--for removing--.

In Column 14, Line 46, after "or" should be inserted an
--a--.

In Column 14, Line 49, after "3" delete --.--.

Signed and Sealed this

Thirteenth Day of February, 1990

*Attest:*

JEFFREY M. SAMUELS

*Attesting Officer*  *Acting Commissioner of Patents and Trademarks*